(12) United States Patent
Kemeny

(10) Patent No.: US 11,554,606 B2
(45) Date of Patent: Jan. 17, 2023

(54) OFF-HIGHWAY VEHICLE INCLUDING FRAME COUPLED GAS SPRING WHEEL ASSEMBLIES

(71) Applicant: GACW Incorporated, Chandler, AZ (US)

(72) Inventor: Zoltan Kemeny, Chandler, AZ (US)

(73) Assignee: GACW INCORPORATED, Chandler, AZ (US)

( * ) Notice: Subject to any disclaimer, the term of this patent is extended or adjusted under 35 U.S.C. 154(b) by 339 days.

(21) Appl. No.: 16/896,726

(22) Filed: Jun. 9, 2020

(65) Prior Publication Data

US 2020/0369079 A1    Nov. 26, 2020

Related U.S. Application Data

(63) Continuation-in-part of application No. 16/886,065, filed on May 28, 2020, which is a continuation-in-part
(Continued)

(51) Int. Cl.
*B60B 9/24* (2006.01)
*B60B 9/18* (2006.01)
(Continued)

(52) U.S. Cl.
CPC ................... *B60B 9/24* (2013.01); *B60B 9/18* (2013.01); *B60B 2900/313* (2013.01);
(Continued)

(58) Field of Classification Search
CPC .... B60B 9/18; B60B 9/24; B60B 9/26; B60B 9/28; B60B 2900/313; B60K 5/00;
(Continued)

(56) References Cited

U.S. PATENT DOCUMENTS 816,666 A    4/1906 Kimball
829,037 A    8/1906 Screpel et al.
(Continued)

FOREIGN PATENT DOCUMENTS

BR    9702701    2/1999
CH    154977    4/1931
(Continued)

OTHER PUBLICATIONS

"Caterpillar 797B Mining Truck Specifications," XP002301348, Jan. 2003, pp. 1-28.
(Continued)

*Primary Examiner* — Kip T Kotter
(74) *Attorney, Agent, or Firm* — Allen, Dyer, Doppelt, + Gilchrist, P.A. Attorneys at Law

(57) ABSTRACT

An off-highway vehicle may include an off-highway vehicle frame and a motor carried by the off-highway vehicle frame. The off-highway vehicle may also include wheel assemblies rotatably coupled to the off-highway vehicle frame without an intervening vehicle suspension and at least some of the wheel assemblies being driven by the motor. Each of the wheel assemblies may include an inner rim coupled to the hub, an outer rim surrounding the inner rim, and gas springs coupled between the inner rim and the outer rim to provide a gas suspension for relative movement between the inner and outer rims.

27 Claims, 69 Drawing Sheets

Related U.S. Application Data of application No. 16/596,302, filed on Oct. 8, 2019, now Pat. No. 11,135,871, which is a continuation-in-part of application No. 16/383,169, filed on Apr. 12, 2019, now Pat. No. 10,987,971, which is a continuation-in-part of application No. 16/237,478, filed on Dec. 31, 2018, now Pat. No. 11,173,744, said application No. 16/886,065 is a continuation-in-part of application No. 16/865,231, filed on May 1, 2020, now Pat. No. 11,325,417, which is a continuation-in-part of application No. 16/596,302, filed on Oct. 8, 2019, now Pat. No. 11,135,871, which is a continuation-in-part of application No. 16/383,169, filed on Apr. 12, 2019, now Pat. No. 10,987,971, which is a continuation-in-part of application No. 16/237,478, filed on Dec. 31, 2018, now Pat. No. 11,173,744.

(60) Provisional application No. 62/764,138, filed on Jul. 19, 2018, provisional application No. 62/850,240, filed on May 20, 2019.

(51) Int. Cl.

| | | |
|---|---|---|
| B60K 5/00 | (2006.01) | |
| B62D 33/06 | (2006.01) | |
| B60K 17/04 | (2006.01) | |
| B62D 33/02 | (2006.01) | |
| B60P 1/04 | (2006.01) | |
| B62D 65/10 | (2006.01) | |
| B62D 65/12 | (2006.01) | |
| B62D 21/09 | (2006.01) | |

(52) U.S. Cl.
CPC .............. *B60K 5/00* (2013.01); *B60K 17/04* (2013.01); *B60P 1/04* (2013.01); *B62D 21/09* (2013.01); *B62D 33/02* (2013.01); *B62D 33/0617* (2013.01); *B62D 65/10* (2013.01); *B62D 65/12* (2013.01)

(58) Field of Classification Search
CPC ........... B60K 17/04; B60P 1/04; B62D 21/09; B62D 33/02; B62D 33/0617; B62D 65/10
See application file for complete search history.

(56) References Cited

U.S. PATENT DOCUMENTS

| | | | |
|---|---|---|---|
| 910,396 A | 1/1909 | Larson | |
| 911,975 A | 2/1909 | Gustafson | |
| 945,468 A | 1/1910 | Langton | |
| 967,515 A | 8/1910 | Gruss et al. | |
| 973,054 A | 10/1910 | Langton | |
| 997,668 A | 7/1911 | Haines | |
| 1,041,182 A | 10/1912 | Simpson | |
| 1,055,835 A | 3/1913 | Tighe | |
| 1,060,860 A | 5/1913 | Sauvert | |
| 1,078,916 A | 11/1913 | Gerard | |
| 1,081,237 A | 12/1913 | Kolby et al. | |
| 1,122,890 A | 12/1914 | Fahrney | |
| 1,129,654 A | 2/1915 | Dysart | |
| 1,135,779 A | 4/1915 | Dove-Smith | |
| 1,158,567 A | 11/1915 | Scholtz | |
| 1,188,861 A | 6/1916 | Ubezzi | |
| 1,195,148 A | 8/1916 | Newman | |
| 1,203,024 A | 10/1916 | McCartey | |
| 1,210,357 A | 12/1916 | Persone | |
| 1,235,621 A | 8/1917 | Weiner | |
| 1,242,759 A | 10/1917 | Bender | |
| 1,245,910 A | 11/1917 | Hathaway | |
| 1,249,438 A | 12/1917 | McCaffrey | |
| 1,249,678 A | 12/1917 | Shumway | |
| 1,257,433 A | 2/1918 | Whale et al. | |
| 1,292,305 A | 1/1919 | Gilpatric | |
| 1,295,378 A | 2/1919 | Smith | |
| 1,295,379 A | 2/1919 | Smith et al. | |
| 1,299,876 A | 4/1919 | Van Noort et al. | |
| 1,387,077 A | 8/1921 | Short | |
| 1,392,813 A | 10/1921 | Bush et al. | |
| 1,436,840 A | 11/1922 | Weirich | |
| 1,454,974 A | 5/1923 | Marchetti | |
| 1,455,180 A | 5/1923 | Warner | |
| 1,460,446 A | 7/1923 | Schultz | |
| 1,462,128 A | 7/1923 | Stolz | |
| 1,601,518 A | 9/1926 | Weston | |
| 1,650,609 A | 11/1927 | Cravens | |
| 1,650,611 A | 11/1927 | Cravens | |
| 1,808,886 A | 6/1931 | Courtney | |
| 1,918,032 A | 7/1933 | Gray | |
| 1,935,488 A | 11/1933 | Vaughn | |
| 1,979,935 A | 11/1934 | Henap | |
| 2,208,567 A | 7/1940 | Bartho | |
| 2,317,323 A | 4/1943 | Betke | |
| 2,323,502 A | 7/1943 | Wann | |
| 2,715,930 A | 8/1955 | Bixby et al. | |
| 3,672,458 A | 6/1972 | Mackerle | |
| 3,747,658 A | 7/1973 | Hall | |
| 3,896,868 A | 7/1975 | Molitor | |
| 4,428,567 A | 1/1984 | Fournales | |
| 4,561,641 A | 12/1985 | Deyoung et al. | |
| 4,706,770 A | 11/1987 | Simon | |
| 5,053,095 A | 10/1991 | Hill | |
| 5,486,018 A | 1/1996 | Sakai | |
| 6,039,321 A | 3/2000 | Jo | |
| 6,041,838 A | 3/2000 | Al-Sabah | |
| 6,698,480 B1 | 3/2004 | Cornellier | |
| 9,399,370 B2 | 7/2016 | Kemeny | |
| 9,834,036 B2 | 12/2017 | Winshtein et al. | |
| 2003/0076968 A1 | 4/2003 | Rast | |
| 2005/0083186 A1 | 4/2005 | Hayes | |
| 2007/0057480 A1 | 3/2007 | Tada et al. | |
| 2009/0095389 A1 | 4/2009 | Moyna et al. | |
| 2009/0211675 A1 | 8/2009 | Louden | |
| 2009/0259365 A1 | 10/2009 | Rohlfs et al. | |
| 2009/0302514 A1 | 12/2009 | Grabarz et al. | |
| 2010/0000402 A1 | 1/2010 | Egolf | |
| 2011/0036485 A1 | 2/2011 | Rey et al. | |
| 2012/0132331 A1 | 5/2012 | Collette et al. | |
| 2013/0340902 A1 | 12/2013 | Kemeny | |
| 2014/0137997 A1 | 5/2014 | Mayni | |
| 2014/0300037 A1 | 10/2014 | Winshtein et al. | |
| 2015/0090379 A1 | 4/2015 | Kemeny | |
| 2015/0107734 A1 | 4/2015 | Rey et al. | |
| 2016/0068016 A1 | 3/2016 | Winshtein et al. | |
| 2017/0349003 A1 | 12/2017 | Joso et al. | |
| 2018/0354317 A1 | 12/2018 | Benevelli et al. | |
| 2020/0002367 A1 | 1/2020 | Kemeny et al. | |
| 2020/0023675 A1 | 1/2020 | Kemeny et al. | |
| 2020/0023676 A1 | 1/2020 | Kemeny | |
| 2020/0023677 A1 | 1/2020 | Kemeny | |
| 2020/0023678 A1 | 1/2020 | Kemeny et al. | |
| 2020/0023679 A1 | 1/2020 | Kemeny et al. | |
| 2020/0023680 A1 | 1/2020 | Kemeny et al. | |
| 2020/0023681 A1 | 1/2020 | Kemeny | |
| 2020/0023682 A1 | 1/2020 | Kemeny et al. | |
| 2020/0114682 A1 | 4/2020 | Kemeny | |
| 2020/0384801 A1 | 12/2020 | Kemeny | |

FOREIGN PATENT DOCUMENTS

| | | |
|---|---|---|
| CN | 1802271 | 7/2006 |
| CN | 101007489 | 8/2007 |
| CN | 101223042 | 7/2008 |
| CN | 201109350 | 9/2008 |
| CN | 202029639 | 11/2011 |
| CN | 102490554 | 6/2012 |
| CN | 202368269 | 8/2012 |
| CN | 102795337 | 11/2012 |
| CN | 104691601 | 6/2015 |
| CN | 105730149 | 7/2016 |
| CN | 105805223 | 7/2016 |
| CN | 106915203 | 7/2017 |

(56) References Cited

FOREIGN PATENT DOCUMENTS

| | | |
|---|---|---|
| CN | 107139643 | 9/2017 |
| CN | 107521282 | 12/2017 |
| CN | 107650570 | 2/2018 |
| CN | 207000034 | 2/2018 |
| DE | 202005010928 | 10/2005 |
| DE | 202005010968 | 10/2005 |
| DE | 102005032442 | 1/2007 |
| DE | 102015122840 | 6/2017 |
| DE | 102016008280 | 1/2018 |
| EP | 0214356 | 3/1987 |
| EP | 1627750 | 2/2006 |
| EP | 1932687 | 6/2008 |
| EP | 3142868 | 3/2017 |
| GB | 190921556 | 6/1910 |
| GB | 191220541 | 10/1912 |
| GB | 191315910 | 1/1914 |
| GB | 103615 | 2/1917 |
| GB | 119019 | 9/1918 |
| GB | 121898 | 1/1919 |
| GB | 125853 | 5/1919 |
| GB | 155910 | 12/1920 |
| GB | 219098 | 7/1924 |
| GB | 760676 | 11/1956 |
| JP | 58053502 | 3/1983 |
| JP | 63269778 | 11/1988 |
| JP | 2002316502 | 10/2002 |
| JP | 2002370503 | 12/2002 |
| KR | 20100052990 | 5/2010 |
| WO | 2007041181 | 4/2007 |
| WO | 2012057847 | 5/2012 |
| WO | 2018/018868 | 2/2018 |
| WO | WO-2018018868 A1 * | 2/2018 ............ B60K 17/04 |
| WO | 2018125902 | 7/2018 |

OTHER PUBLICATIONS

"Air Suspension Wheels by Global Air Cylinder Wheels," Installation and Maintenance Manual, Global Air Cylinder Wheels, Sep. 16, 2016, pp. 1-23.

Kemeny, U.S. Appl. No. 16/886,065, filed May 28, 2020.

Kemeny, U.S. Appl. No. 16/865,231, filed May 1, 2020.

* cited by examiner

OFF-HIGHWAY VEHICLE INCLUDING FRAME COUPLED GAS SPRING WHEEL ASSEMBLIES

RELATED APPLICATIONS

The present application is a continuation-in-part of application Ser. No. 16/886,065 filed May 28, 2020, which is a continuation-in-part of application Ser. No. 16/596,302 filed Oct. 8, 2019, which is a continuation-in-part of application Ser. No. 16/383,169 filed Apr. 12, 2019, which is a continuation-in-part of application Ser. No. 16/237,478 filed Dec. 31, 2018, which claims the priority benefit of provisional application Ser. No. 62/764,138 filed on Jul. 19, 2018, the entire contents of all of which are herein incorporated by reference. Application Ser. No. 16/886,065 filed May 28, 2020 is also a continuation-in-part of application Ser. No. 16/865,231 filed May 1, 2020 which claims the priority benefit of provisional application Ser. No. 62/850,240 filed on May 20, 2019. Application Ser. No. 16/865,231 filed May 1, 2020 is also a continuation-in-part of application Ser. No. 16/596,302 filed Oct. 8, 2019 which is a continuation-in-part of application Ser. No. 16/383,169 filed Apr. 12, 2019, which is a continuation-in-part of application Ser. No. 16/237,478 filed Dec. 31, 2018, which claims the priority benefit of provisional application Ser. No. 62/764,138 filed on Jul. 19, 2018, the entire contents of all of which are herein incorporated by reference.

TECHNICAL FIELD

The present invention relates to the field of vehicles, and more particularly, to wheel assemblies for an off-highway vehicle and related methods.

BACKGROUND

A typical wheel may include a rim and tire surrounding the rim. The tire transfers a load of a vehicle from the axle through the wheel to the ground. Tires, for example, those found on most vehicles are pneumatic tires. In other words, a typical tire is pneumatically inflated, for example, with air or other gas, such as nitrogen. More particularly, air is injected into the space between the rim and the inside of the tire to inflate it.

During operation, being pneumatically inflated, a tire absorbs the forces as the vehicle travels over the road surface. The tire and associated inflation pressure may be selected to absorb the above-noted forces while reducing any deformation. However, in many instances, excessive forces placed on the tire may cause the tire and/or rim to deform, puncture, or blowout. Typical forces also cause tread wear of the tire, while excessive forces may also cause rapid tread wear that may lead to a shortened lifespan of the tire and decreased structural integrity of the wheel.

To address the shortcomings of pneumatic-based wheels, non-pneumatic wheels have been developed. By non-pneumatic, it is meant that air or other gas is not injected to inflate an interior volume of a tire. One approach to a non-pneumatic wheel uses mechanical springs. For example, U.S. Pat. No. 911,975 to Gustafson discloses a spring wheel. Secondary spokes are arranged in pairs between pairs of main spokes and the members of each of the secondary spokes therefore pass upon opposite sides of a corresponding pair of intersecting braces. Each of the secondary spokes includes a pair of telescoping members that are pivotally connected at its outer end to ears formed on the hub and extends at its opposite end into a corresponding member.

U.S. Pat. No. 1,601,518 to Weston discloses a resilient wheel that includes radial arms. Connection between a hub and rim members may be provided by pivot pins in outer ends of these arms that have links journaled thereon. The links are pivotally articulated with bent levers, which are in turn pivoted on bracket arms that extend inwardly from the part-circular plates, which are mounted on an inner periphery of a tire holding rim.

Another approach includes a disc between a wheel hub and outer rim. For example, U.S. Pat. No. 1,808,886 to Courtney also discloses a disc or sidewall between a wheel hub and a rim. The disc is engaged by studs that project from the wheel hub and extends from an outer flange obliquely to the wheel hub. The disc assists the wheel tire and rim by resisting any tendency to become displayed laterally as a result of stresses occurring while the wheel is turning.

U.S. Pat. No. 1,979,935 to Henap discloses a hydraulic spoke wheel. Each of the hydraulic spokes include telescoping sections in the form of an outer section and an inner section. The outer section has the stud projecting from one end. The inner section extends from the outer section and is equipped at its extended end with the stem.

U.S. Pat. No. 6,041,838 to Al-Sabah discloses a wheel that includes spokes positioned in a spaced apart relation to each other. Each of the spokes has a first end connected to a rim and a second end connected to a plate member tip of a hub plate member in an offset position from the respective radial axis thereof. The offset position of each of the spokes is further defined by each of the spokes being connected to a respective one of the plate member tips at a predetermined angle (e.g., less than 90-degrees) from the radial axis thereof and defining an operative offset spoke axis, which intersects the radial axis of the plate member tips at the predetermined angle.

U.S. Pat. No. 6,698,480 to Cornellier discloses shock absorbing spokes each having a central cylindrical tube. Each tube has an interior cap having an aperture and an exterior cap having an aperture. Each spoke has an interior piston, a rod with an aperture and a pin. The pin pivotally couples one of the spokes to the hub. Each spoke has an exterior piston, a rod with an aperture and a pin. The pin pivotally couples one of the spokes to the rim assembly. The interior pistons and exterior pistons divide the space within each tube into an interior chamber, an exterior chamber, and a central chamber.

Despite advances in pneumatic tire wheels, and non-pneumatic tire wheels, there is still a need for improvements in wheel technology, particularly, for large construction vehicles, or mining vehicles, for example. The expense of wheel replacement, and the downtime experienced during wheel replacement may add significant expenses to the construction or mining projects.

SUMMARY

An off-highway vehicle may include an off-highway vehicle frame and a motor carried by the off-highway vehicle frame. The off-highway vehicle may also include a plurality of wheel assemblies rotatably coupled to the off-highway vehicle frame without an intervening vehicle suspension and at least some of the wheel assemblies being driven by the motor. Each of the plurality of wheel assemblies may include an inner rim coupled to the off-highway vehicle frame, an outer rim surrounding the inner rim, and a plurality of gas springs coupled between the inner rim and the outer rim to provide a gas suspension for relative movement between the inner and outer rims.

The off-highway vehicle may also include an operator cab carried by the off-highway vehicle frame. The motor may include a diesel engine and a transmission coupled thereto, for example.

The off-highway vehicle may also include a truck bed carried by the off-highway vehicle frame to haul material. The truck bed may be pivotally coupled to the off-highway vehicle frame to permit dumping of the material, for example. The truck bed may have capacity of at least 100 tons.

Each wheel assembly may include an outer ring coupled to the outer rim and extending radially inward therefrom, and an inner ring coupled to the inner rim, extending radially outward from the inner rim and defining a closeable gap with adjacent portions of the outer ring to define a mechanical stop to limit relative movement of the inner rim and outer rim. Each of the plurality of gas springs may have an operating stroke permitting the outer ring and inner ring to define a mechanical stop.

The off-highway vehicle may also include a plurality of hydraulic dampers operatively coupled between the inner rim and the outer rim. The plurality of gas springs may diverge outwardly from the inner rim to the outer rim.

A method aspect is directed to a method of making an off-highway vehicle. The method may include coupling a motor to an off-highway vehicle frame. The method may also include rotably coupling a plurality of wheel assemblies to the off-highway vehicle frame without an intervening vehicle suspension with at least some of the wheel assemblies to be driven by the motor. Each of the plurality of wheel assemblies may include an inner rim coupled to the off-highway vehicle frame, an outer rim surrounding the inner rim, and a plurality of gas springs coupled between the inner rim and the outer rim to provide a gas suspension for relative movement between the inner and outer rims.

DETAILED DESCRIPTION

Figure 1:
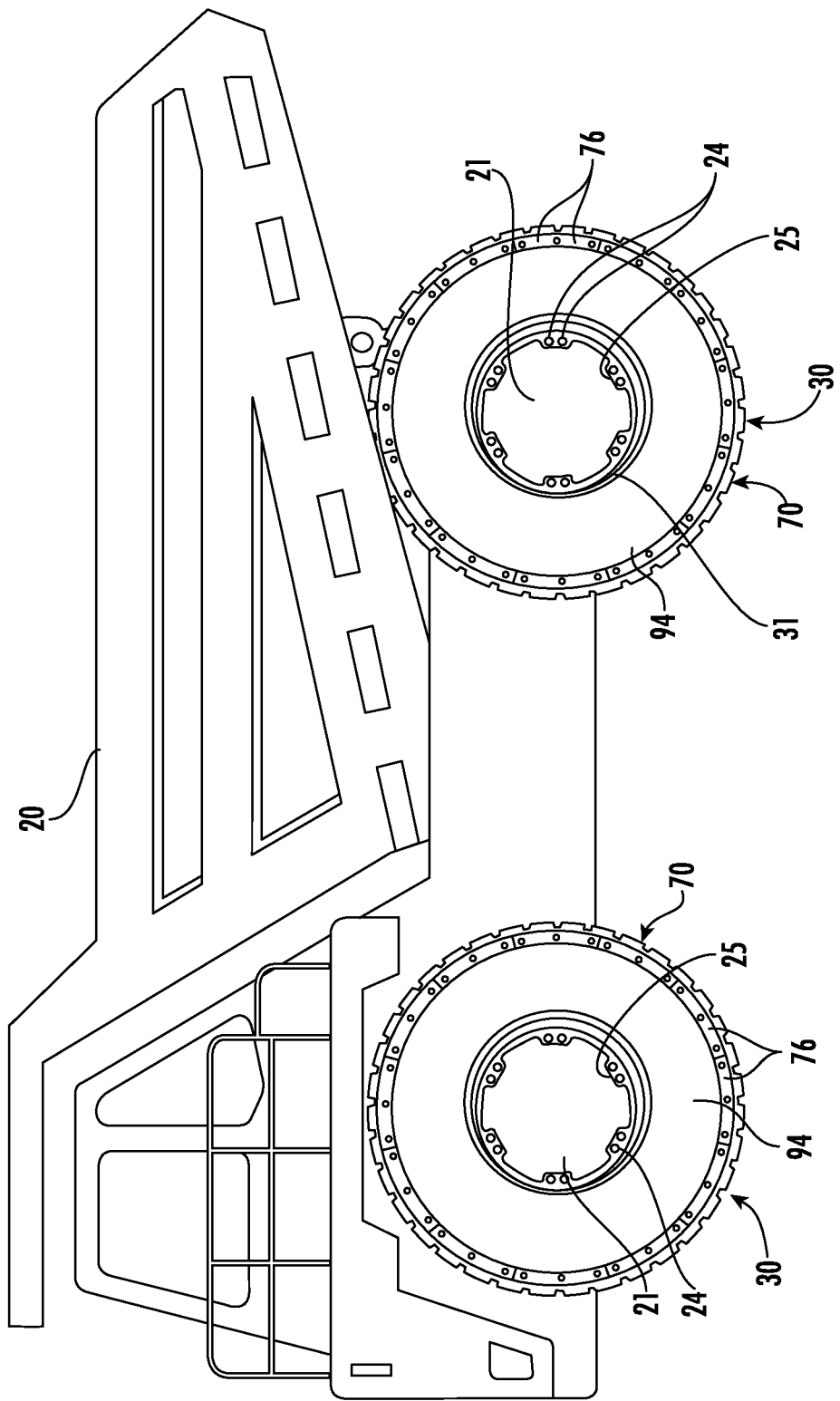
FIG. 1 is a side view of a vehicle having wheel assemblies according to an embodiment.
Figure 2:
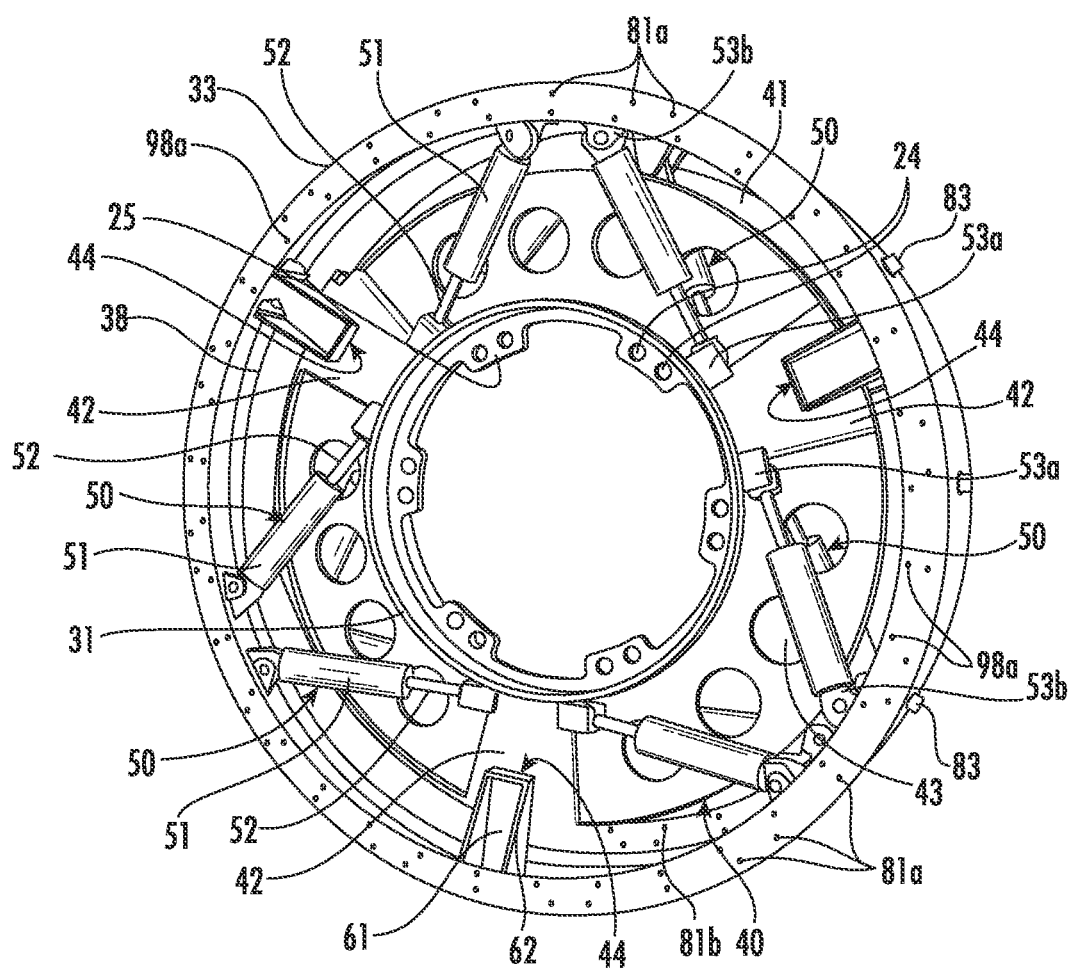
FIG. 2 is a perspective view of a wheel assembly according to an embodiment.
Figure 3:
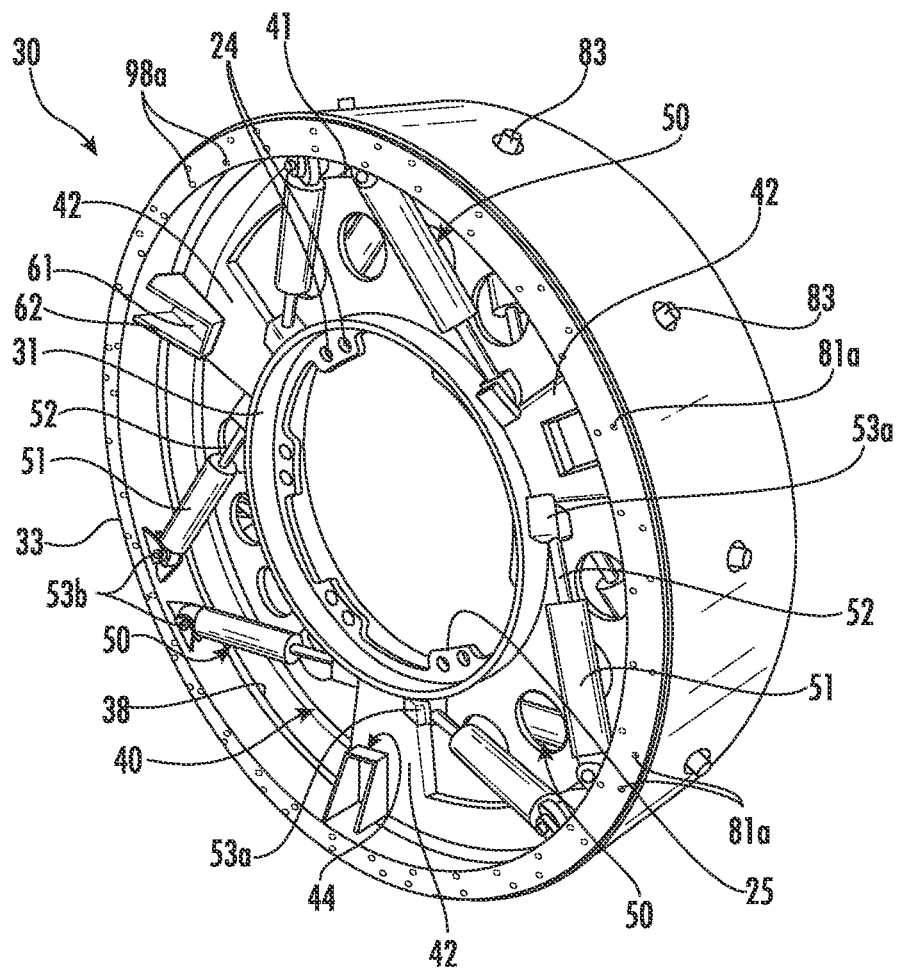
FIG. 3 is another perspective view of the wheel assembly of FIG. 2.
Figure 4:
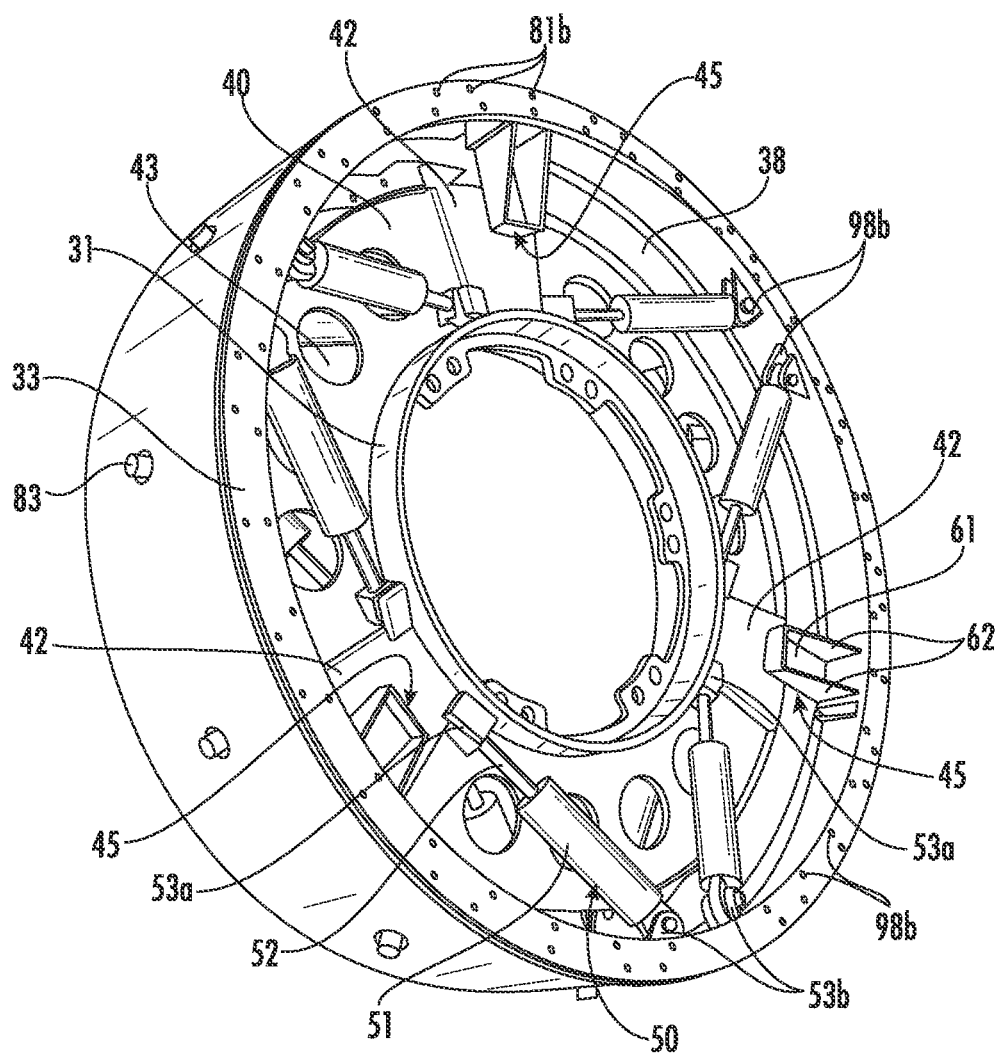
FIG. 4 is another perspective view of the wheel assembly of FIG. 2.
Figure 5:
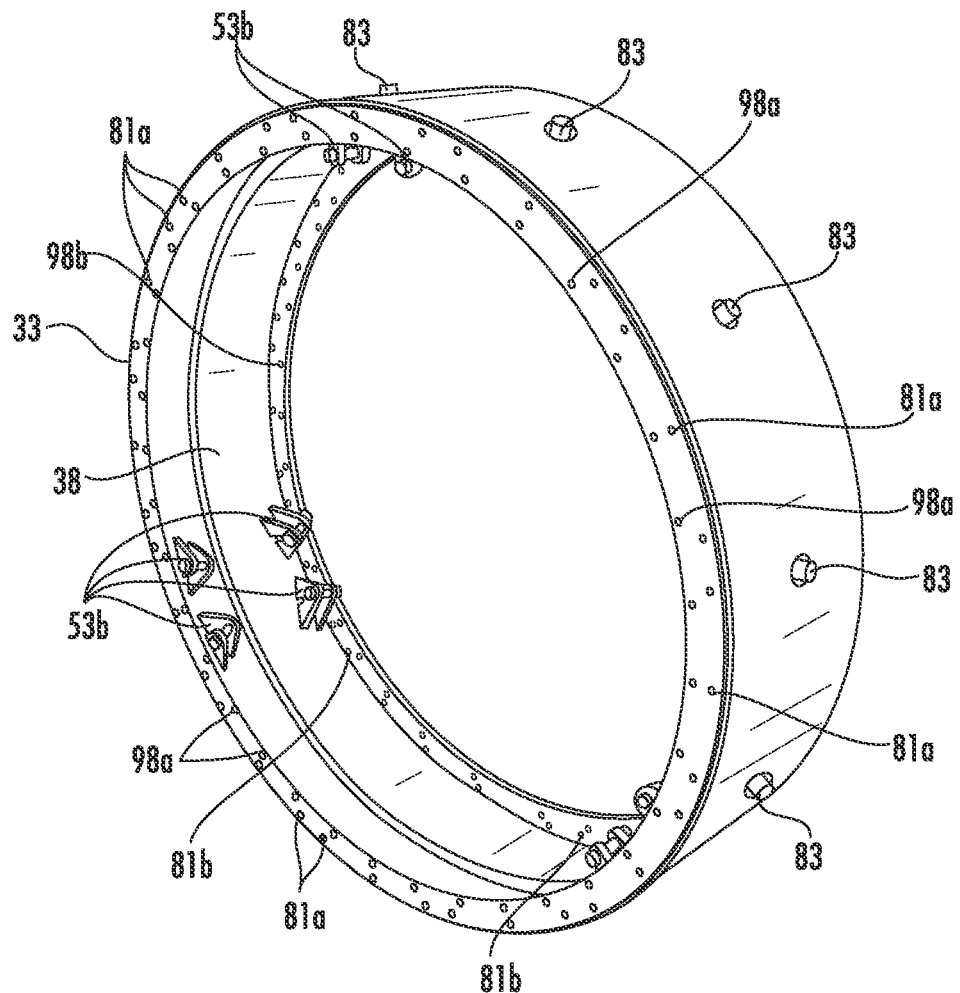
FIG. 5 is a perspective view of a portion of the wheel assembly of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-5, a wheel assembly 30 to be coupled to a hub 21 of a vehicle 20 includes an inner rim 31 to be coupled to the hub of the vehicle. The inner rim 31 may be coupled to the hub 21 of the vehicle 20 with fasteners through fastener receiving passageways 24 within an inwardly extending flange ring 25. Illustratively, the flange ring 25 is centered laterally within the inner rim 31, but may be positioned in another arrangement based upon a desired mounting arrangement with the hub 21. Other coupling arrangements may be used to couple the inner rim 31 to the hub 21.

The wheel assembly 30 also includes an outer rim 33 surrounding the inner rim 31. The outer rim 33 may have a diameter of at least 3.5 feet, and more particularly, at least 4 feet. Those skilled in the art will appreciate that with a diameter of at least 3.5 feet, the wheel assembly 30, and more particularly, the outer rim 33 may be particularly advantageous for relatively large or heavy machinery, such as, for example, earth excavation equipment and mining equipment. A typical overall outer diameter of such a wheel assembly is 100 inches or greater. The outer rim 33 may have an increased thickness portion 38 along an inner circumference thereof. The increased thickness portion 38 may be provided by welding a separate reinforcing ring in position or it may be integrally formed with the outer rim 33, for example.

Figure 6:
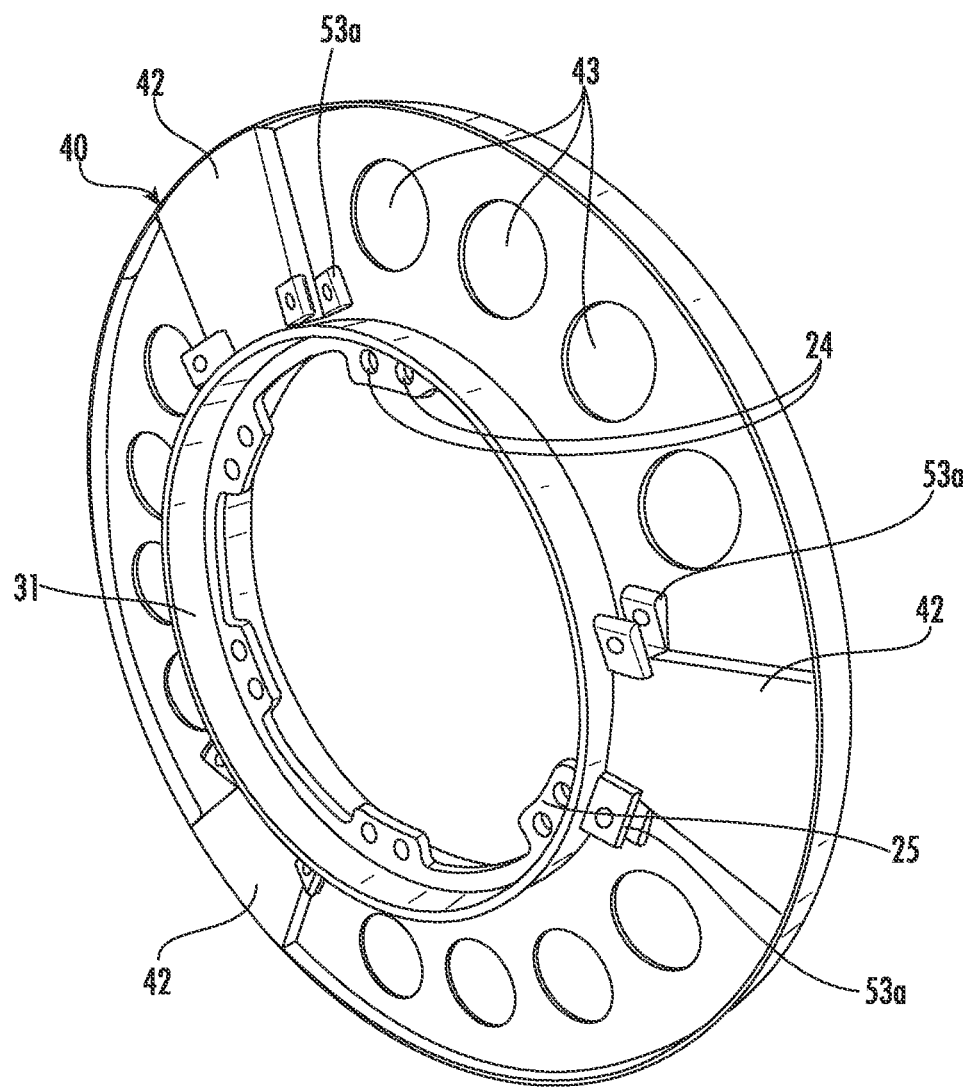
FIG. 6 is a perspective view of the inner rim, disk, and attachment brackets of the wheel assembly of FIG. 2.

Referring additionally to FIG. 6, a disk 40 is coupled to the inner rim 31 and defines a closeable gap 41 with adjacent interior portions of the outer rim 33. The disk 40 also includes weight-reduction openings 43 therein. The weight-reduction openings 43 each illustratively have a generally round or circular shape. The weight-reduction openings 43 may have another shape, such as oblong, hexagonal, and/or contoured for stress reduction, for example. Those skilled in the art will appreciate that having a reduced weight may increase the fuel efficiency of the vehicle 20 and/or may increase the lifespan of wheel assembly 30.

The disk 40 also includes spaced apart thickened wall portions 42. The spaced apart thickened wall portions 42 may be on both the inboard and outboard surfaces of the disk 40. Each thickened wall portion 42 may provide increased strength or support as a coupling or attachment point, and/or to accept increased stresses thereat as will be described in further detail below. The thickened wall portions 42 may be provided by welding an additional metal body in position, for example, or they may be integrally formed with the disk 40. Those skilled in the art will appreciate that the thickened wall portions 42 may be in the form of solid extensions (i.e., integrally formed with and/or a build-up of) of the disk 40, and/or discrete bodies, for example, that function as mechanical stiffeners.

The inner rim 31, outer rim 33, and disk 40 may be formed of a high strength and rugged material, such as steel. As will be appreciated by those skilled in the art other materials may also be used.

Gas springs 50 are operatively coupled between the inner rim 31 and the outer rim 33. Each gas spring 50 may be a double-acting gas spring, for example, and include a double-acting gas cylinder 51 and an associated piston 52. Of course, in some embodiments, each gas spring 50 may be a single-acting gas spring. More than one type of gas spring may be used. The gas springs 50 may be air springs and/or nitrogen springs, for example. The gas springs 50 may include other gasses as well.

Illustratively, the gas springs 50 are arranged in pairs on opposite sides of the disk 40. More particularly, the gas springs 50 diverge outwardly from the inner rim 31 to the outer rim 33. A respective attachment bracket 53a for each gas spring 50 is coupled to a respective thickened wall portion 42 of the disk 40, for example, adjacent the inner rim 31. Each attachment bracket 53a may include a generally U-shaped or V-shaped base bracket that receives an end of the piston 52 therein (e.g., between the arm of the U- or V-shaped bracket). A fastener fastens the end of the piston 52 of the gas spring 50 to the base bracket and thus, each gas spring is coupled adjacent the respective thickened wall portion 42 of the disk 40 and adjacent the inner rim 31. A similar attachment bracket 53b is coupled to the outer rim 33 adjacent inboard and outboard surfaces. Accordingly, the gas springs 50 are pivotably coupled between the inner and outer rims 31, 33.

As will be appreciated by those skilled in the art, the gas springs 50 provide a gas suspension for relative movement between the inner rim 31 and the outer rim 33. The gas springs 50 have an operating stroke the permits the disk 40 to define a mechanical stop. In other words, the gas springs 50 maintain the outer rim 33 spaced apart from the inner rim 31. However, if pressure on any gas spring 50 causes the gas spring to reach its limit under load or the gas spring fails, the disk 40 may act as a mechanical stop to limit relative movement of the inner and outer rims 31, 33. In other words, the disk 40 and gas springs 50 may considered as providing a run-flat capability.

Initial charge pressures of the gas springs 50, for example, when the gas springs are in the form of double-acting gas springs, will now be described, for example, with respect to initial pressures in the wheel assembly 30 when there are little or no external loads applied thereto (i.e., free-wheel). In particular, the chamber associated with the piston-side of the cylinder 51 is typically smaller (e.g., by about 10%) than the chamber associated with the full-bore side of the cylinder. Thus, when the piston 52 is centered within the cylinder 51 so that there is a relatively equal stroke in tension and compression, the piston-side chamber pressure is higher (e.g., by about 10%) than the full-bore side chamber pressure.

Thus, while equal pressure charging of the double-acting gas cylinder 51 may be convenient, it results in an offset piston 52, which, in turn, results in an offset force to be applied to assemble the gas springs 50 within the wheel assembly 30. To accomplish this, the inner and outer rims 31, 33 may be temporarily fixed in a rigid jig. However, using a rigid jig may make replacement of the gas springs 50 in the field increasingly difficult. Thus, to address increased ease of in-field replacement of the gas springs 50, weld-on rings may be coupled to the inner and outer rims 31, 33 and to turn-buckles to temporarily lock the inner and outer rims in place. A similar arrangement may be used in-shop as well, as will be appreciated by those skilled in the art.

Accordingly, the result is a pre-stressed inner rim 31 suspension to the outer rim 33. The pre-stressing may ensure that the lateral stops 44, 45 (described below) are not active or under pressure. With different charge pressures, the suspension can be pre-compressed. While tension suspension and compression suspension may be considered equivalent, tension suspension may be particularly advantageous over compression suspension, as will be appreciated by those skilled in the art.

Another assembly technique may include applying a higher charge pressure (e.g., about 10% more) at the piston-side to center the piston 52 at about the half-stroke position. This results in there being no initial load on the gas spring 50 at the wheel assembly 30 and facilitates assembly without the temporary fixing within a jig. Thus, the wheel assembly 30 may be considered to be neither pre-stressed, nor pre-compressed, but neutral. For example, a higher full-bore side chamber pressure may be applied (e.g., about 10% higher) than the piston side chamber pressure. Gas may be released from the full-bore side chamber until the piston 52 becomes centered relative to full-stroke. Alternatively, a higher piston-side chamber pressure may be applied (e.g., about 10% higher) than the full-bore side chamber pressure. Releasing gas from the cylinder 51 may be considered easier than surcharging, however, this may use more gas (e.g., nitrogen) than other approaches resulting in an increased cost.

The wheel assembly 30 also includes inboard lateral stops 44 carried by an inboard surface of the outer rim 33. More particularly, the inboard lateral stops 44 are positioned adjacent the thickened wall portion 42. The wheel assembly 30 also includes outboard lateral stops 45 carried by an outboard surface of the outer rim 33. Similarly to the inboard lateral stops 44, the outboard lateral stops 45 are adjacent the thickened wall portion 42. Each thickened wall portion 42 is positioned between a pair of inboard and outboard lateral stops 44, 45. The inboard and outboard lateral stops 44, 45 together with the outer rim 33 may conceptually be considered to be in the form of an L-shaped bracket. Illustratively, the inboard and outboard lateral stops 44, 45 each has a support plate 61 (e.g., having a rectangular shape) that is transverse to the outer rim 33 and has triangular side members 62.

As will be appreciated by those skilled in the art, the inboard and outboard lateral stops 44, 45 cooperate to limit relative lateral movement of the disk 40 and the outer rim 33. In other words, turning, for example, of the vehicle 20 may cause lateral movement of the disk 40 relative to the outer rim 33. The inboard and outboard lateral stops 44, 45 may limit the amount of lateral movement of the disk 40 relative to the outer rim 33 to thereby maintain structural integrity of the wheel assembly 30. Of course, the inboard and outboard lateral stops 44, 45 include other and/or additional components or elements that cooperate to limit relative lateral movement of the disk 40 and the outer rim 33.

Referring now additionally to FIGS. 7-16, the wheel assembly 30 illustratively includes tread assemblies 70 carried by the outer rim 33. Each tread assembly 70 includes a tread member support 71. Each tread member support 71 may be in the form of an arcuate metal plate with openings 69a, 69b therein (FIG. 10) and may couple to an outer circumference of the outer rim 33. One or more of the tread member supports 71 may be a flat plate in other embodiments. A center one of the openings 69b may receive a pin 83 therein as will be described in further detail below. In some embodiments, the tread member support 71 may not be metal, such as steel. Those skilled in the art will appreciate that given the arcuate shape of the tread member support 71, several tread assemblies 70 are coupled in end-to-end relation around the outer rim 33.

Figure 17:
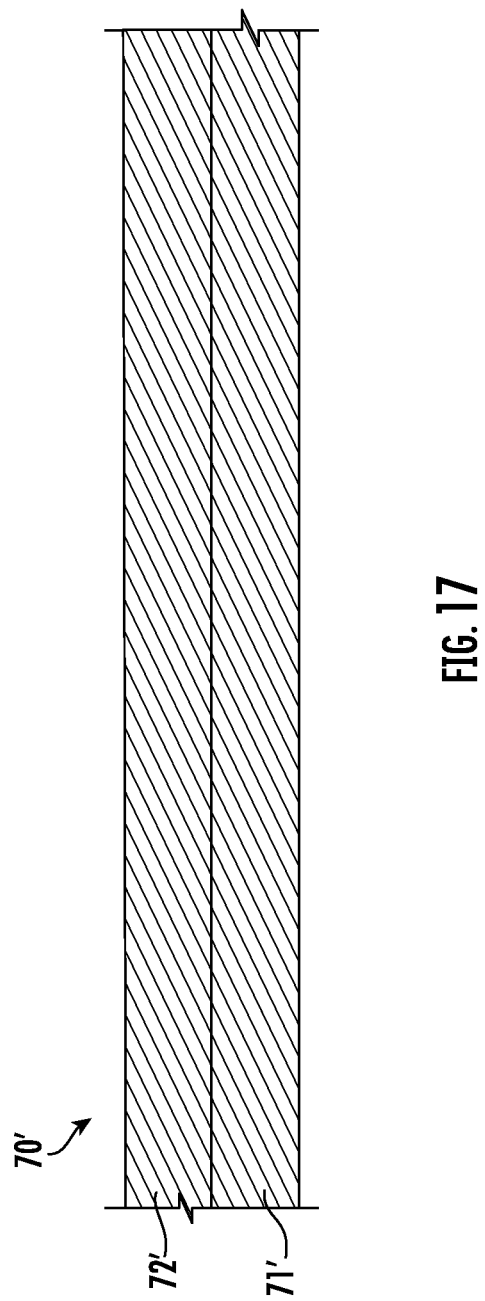
FIG. 17 is a cross-sectional view of a portion of a tread assembly in accordance with another embodiment.

A tread member 72 is coupled or bonded, for example, glued, fastened, etc., to the tread member support 71, and a clamping arrangement 73 removably securing the tread member support to the outer rim 33. There may be more than one tread member 72 bonded to the tread member support 71. The tread member 72 includes a resilient body 85 that has tread pattern 86 defined in an outer surface thereof. The resilient body 85 may include rubber or other material, which may be selected based upon desired friction, traction, or other characteristics, for example, based upon the use of the vehicle 20. The material of the tread member 72 may a metal such as steel, in other embodiments. The tread pattern 86 may similarly be selected based upon desired traction or other characteristics, for example, based upon the use of the vehicle 20. Moreover, referring briefly to FIG. 17, in another embodiment of a tread assembly 70', each tread member 72' and tread member support 71' may include a common material integrally formed as a monolithic unit, which may or may not be metal, such as steel. In other words, each tread member 72' and tread member support 71' define a single unit or body of the same material (e.g., an all-metal tread member support and tread member).

Further details of the clamping arrangement 73 will now be described. The clamping arrangement 73 illustratively includes inboard clamping members 74 coupled to the inboard side of the outer rim 33. The inboard clamping members 74 each have a first slotted recess 75 receiving adjacent portions of the tread member support 71. The inboard clamping members 74 are removably coupled to the inboard side of the outer rim 33. The inboard clamping members 74 are illustratively arranged in an end-to-end relation and each coupled to adjacent respective portions of the outer rim 33. In some embodiments, the inboard clamping members 74 may be fixed, for example, welded or fixedly coupled, to the inboard side of the outer rim 33 and/or a single inboard clamping member may be used.

The inboard clamping members 74 are coupled to the inboard side of the outer rim 33 by way of fasteners 79a, for example, threaded fasteners to facilitate removal and replacement, for example, when tread members 72 wear or it is desirable to replace the tread members. The threaded fasteners 79a may extend through openings 89 in the inboard clamping members 74 and engage corresponding threaded openings 81a in the outer rim 33.

The clamping arrangement 73 also illustratively includes outboard clamping members 76 coupled to the outboard side of the outer rim 33. Similar to the inboard clamping member 74, the outboard clamping members 76 each has a second slotted recess 77 therein receiving adjacent portions of the tread member support 71. The outboard clamping members 76 are removably coupled to the outboard side of the outer rim 33. The outboard clamping members 76 are illustratively arranged in an end-to-end relation and each coupled to adjacent respective portions of the outer rim 33. In some embodiments, a single outboard clamping member 76 may be coupled to the outboard side of the outer rim 33 and extend the circumference of the outer rim.

The outboard clamping members 76 are coupled to the outboard side of the outer rim 33 by way of fasteners, for example, threaded fasteners to facilitate removal and replacement, for example, when tread members 72 wear, or it is desirable to replace the tread members. The threaded fasteners may extend through openings 78 in the outboard clamping members 76 and engage corresponding threaded openings 81b in the outer rim 33.

The tread member support 71 and adjacent portions of the outer rim 33 (e.g., along the outer circumference) define a retaining feature therebetween. The retaining feature is illustratively in the form of or includes a pin 83 carried by the outer rim 33 and a pin-receiving opening 84 in the tread member support 71. The pin 83 and the pin-receiving opening 84 may advantageously prevent relative movement between the tread member support 71 and the outer rim 33, and also facilitate replacement (e.g., easy alignment) of the tread members 72, for example, thereby reducing downtime of the vehicle 20.

Figure 18:
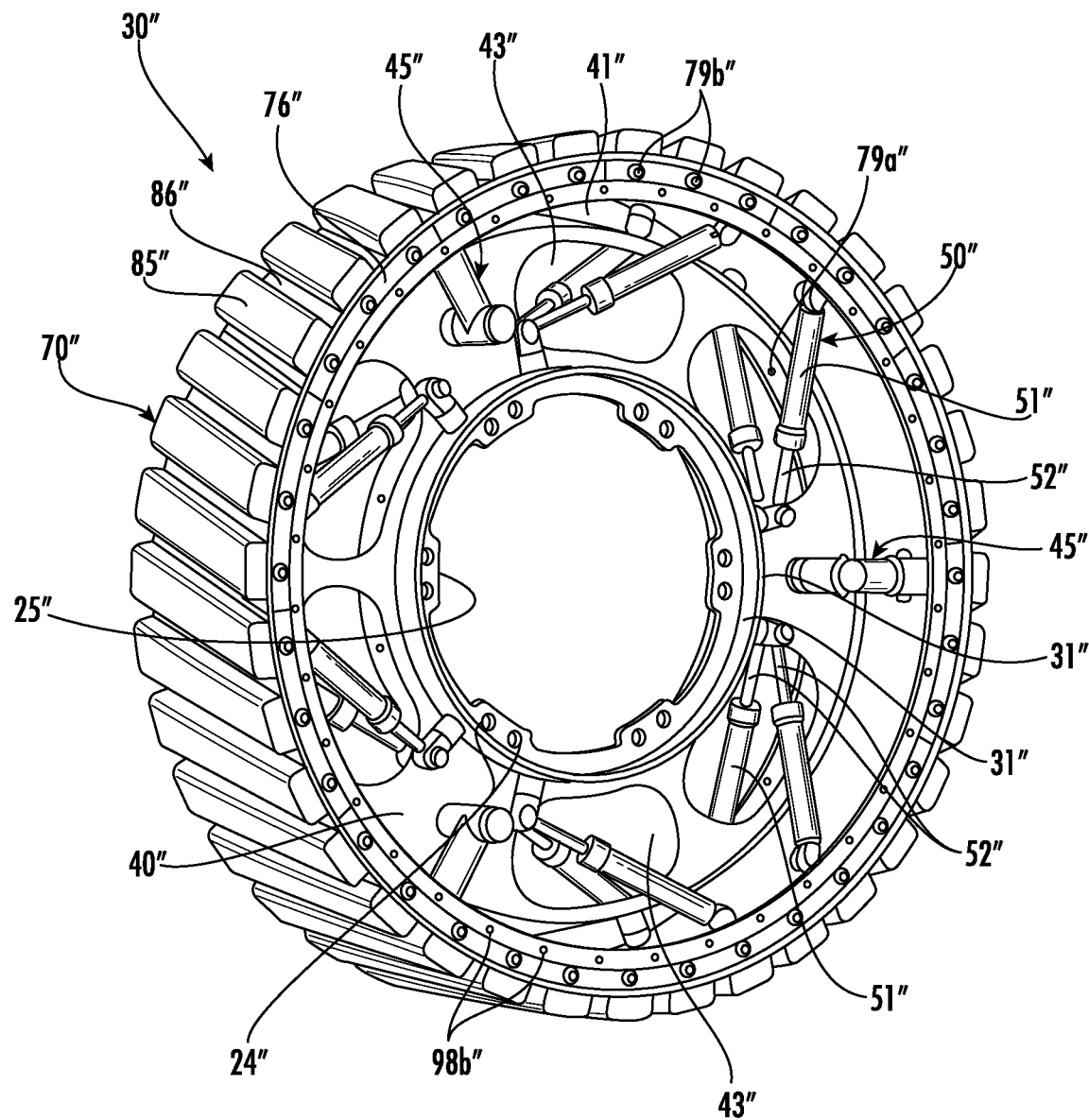
FIG. 18 is a perspective view of a wheel assembly in accordance with another embodiment.
Figure 19:
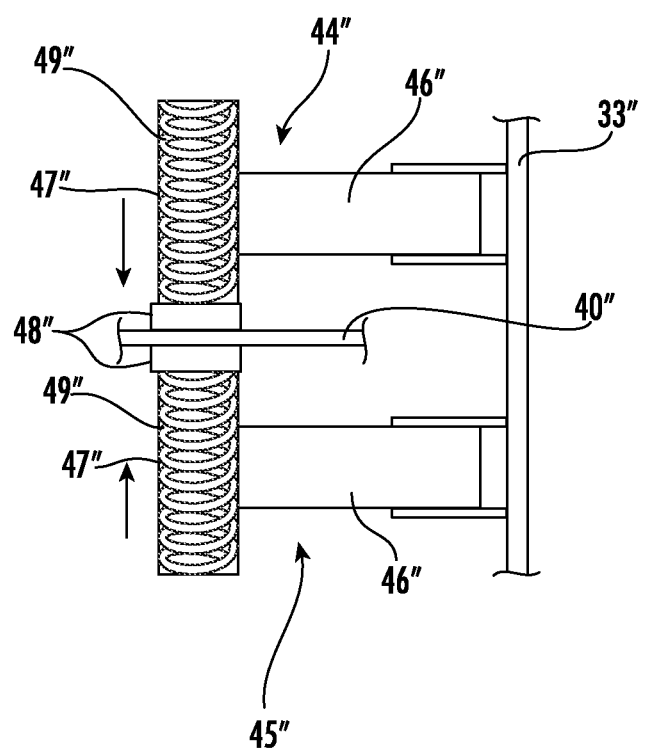
FIG. 19 is a schematic diagram of the lateral stops of FIG. 18.

Referring now briefly to FIGS. 18 and 19, in another embodiment, the inboard and outboard lateral stops 44", 45" are biased toward the disk 40". More particularly, the inboard and outboard lateral stops 44", 45" each includes an arm 46" extending radially inward from the inboard and outboard interior surfaces of the outer rim 33". A transverse arm 47" is coupled to an end of each arm 46". Each transverse arm 47" carries a plug 48" that is biased toward the disk 40" by a biasing member 49", for example, a spring, such as a coil spring. Other biasing arrangements may be used. Elements labeled 24", 25", 30", 31", 41", 43", 45", 50", 51", 52", 70", 76", 79a", 79b", 85" 86", and 98b" are similar to those respectively numbered elements described above without double prime notation.

Figure 20:
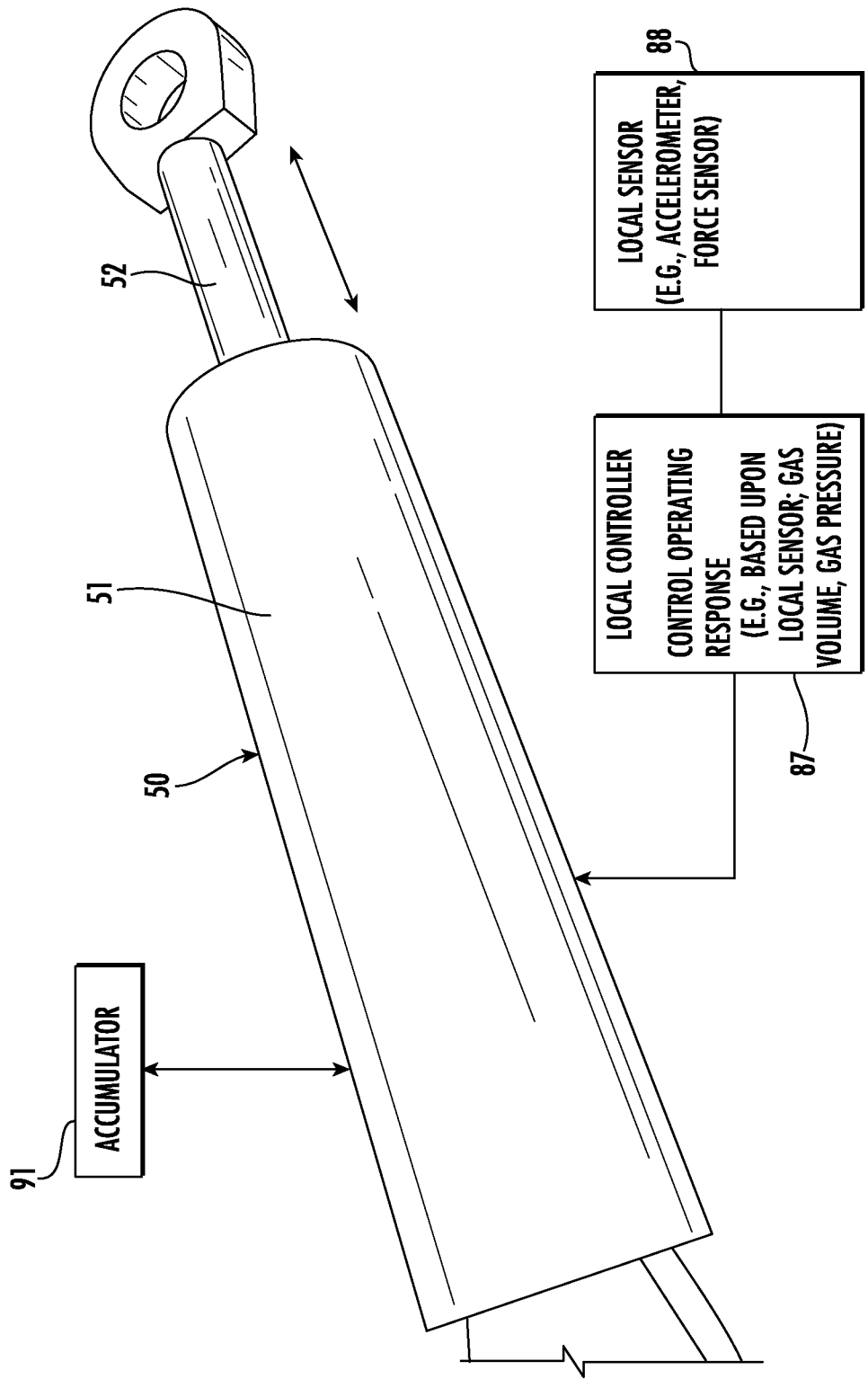
FIG. 20 is a schematic diagram of a portion of a wheel assembly including a local controller for controlling an operating response of a gas spring in accordance with an embodiment.

Referring now additionally to FIG. 20, one or more of the gas springs 50 may have a controllable response. For example, the gas springs 50 may have either or both of a controllable gas pressure and a controllable gas volume. Any number of the gas springs 50 may have a controllable response. By having a controllable response, each of the gas springs 50 may be operated or controlled as will be explained in further detail below, for example, with respect to certain operating conditions and/or environments. More particularly, the wheel assembly 30 may include a local controller 87 (e.g., including a processor and/or circuitry) that is coupled to the gas springs 50. The local controller 87 may be coupled to any number of gas springs 50. The local controller 87 may be carried within the outer rim 33, for example, inside the outer rim, or by the disk 40. The local controller 87 may be carried by other elements of the wheel assembly 30. The local controller 87 may also include respective actuators and/or valves to control the response of the gas springs 50 and cooperate with an accumulator 91 also coupled to the gas springs to act as a pressure and/or volume storage reservoir for gas springs.

The wheel assembly 30 may also include a local sensor 88 coupled to the local controller 87. The local controller 87 may control (e.g., monitor and/or adjust) the operating response of the gas springs 50 based upon the local sensor 88. For example, the local controller 87 may adjust the pressure or volume of the gas springs 50 without controlling the operation (e.g., extend/retract) of the gas springs. The local controller 87 may also adjust, for example, alternatively or additionally, the operation (e.g., extend/retract) of the gas springs 50.

The local sensor 88 may be an acceleration sensor, for example, and cooperate with the local controller 87 to control the controllable response of the gas springs 50 based upon a sensed acceleration (e.g., braking, turning, etc.). The local sensor 88 may be another type of sensor, for example, a force sensor. There may be more than one local sensor 88. In some embodiments, the local controller 87 may cooperate with the local sensor 88 to generate a notification, for example, when a sensed value exceeds a threshold. The notification may be communicate within the vehicle 20 (e.g., in the cab) or remotely from the vehicle. In other words, the local controller 87 may cooperate with the local sensor 88 independently from or without controlling the operating response of the gas springs 50.

Figure 21:
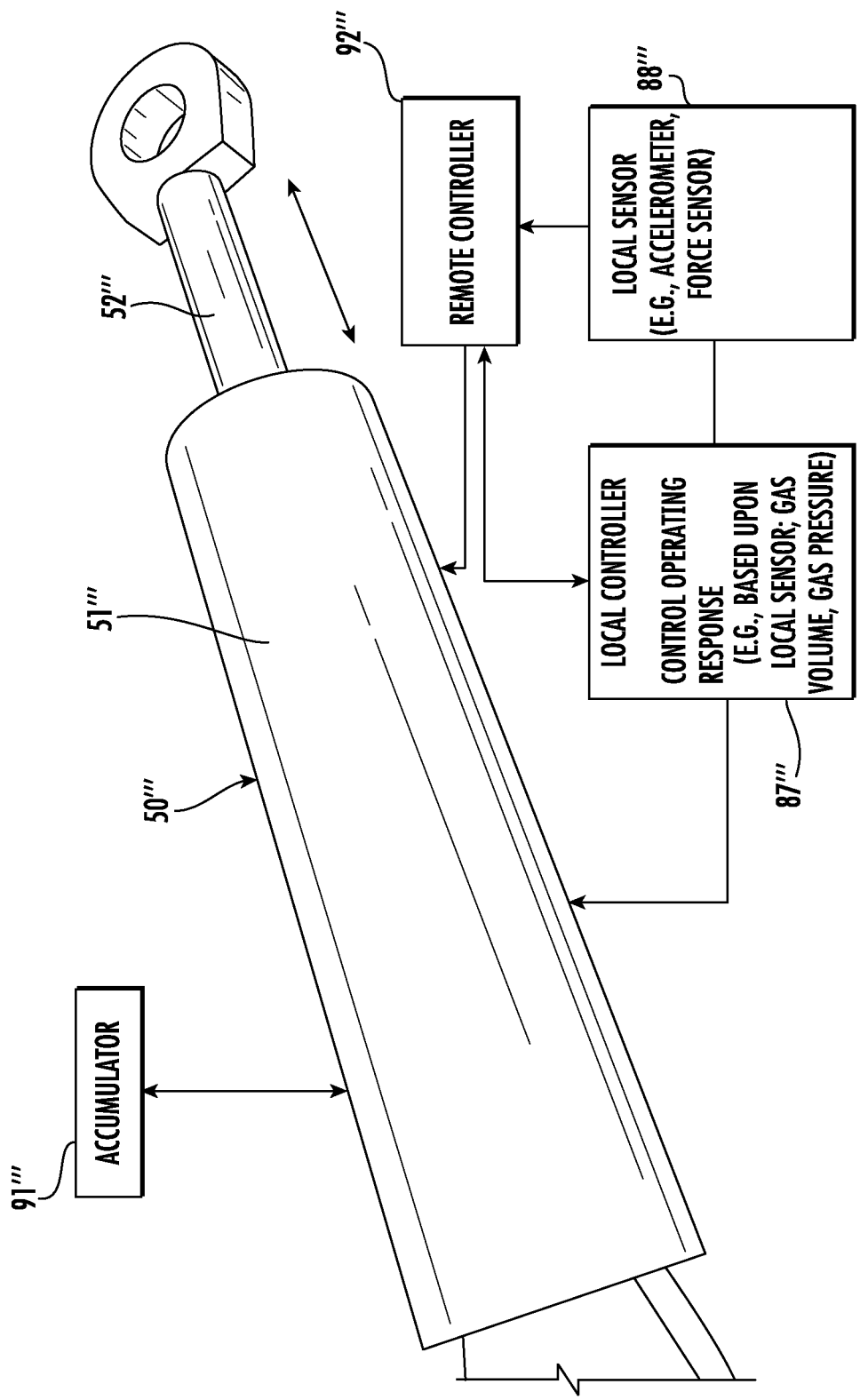
FIG. 21 is a schematic diagram of a portion of a wheel assembly including a local controller for controlling an operating response of a gas spring in accordance with another embodiment.

Referring now briefly to FIG. 21, in another embodiment, a remote controller 92''' may be carried remote from the wheel assembly 30, for example, within a wheel well of the vehicle 20 or within the truck cab. The remote controller 92''' may cooperate with the local sensor 88''' or other sensor, for example, remote from the wheel assembly 30. The remote controller 92''' may also cooperate with the local controller 87''' to effectuate a change in the operating response of the gas springs 50'''. Wiring from the remote controller 92''' may extend to the local controller 87''', and/or the remote controller may wirelessly communicate with the local controller. Elements labeled 51'', 52'', and 91'', are similar to those respectively numbered elements described above without triple prime notation.

Those skilled in the art will appreciate that the local controller 87 controls the operating response of the gas springs 50 while the wheel assembly 30 is rolling. For example, if the vehicle 20, during motion thereof, makes a relatively sharp turn or applies the brakes, the local controller 87 may independently control the operating response of each or selected ones of the gas springs 50 based upon the turn or braking (e.g., increase pressures in the gas springs of front wheel assemblies). Other motion of the vehicle 20 may cause changes in the operating response, such as, for example, failure of any of the gas springs 50, debris in the tread members 72, and/or contact of the disk 40 with the outer rim 33.

Figure 7:
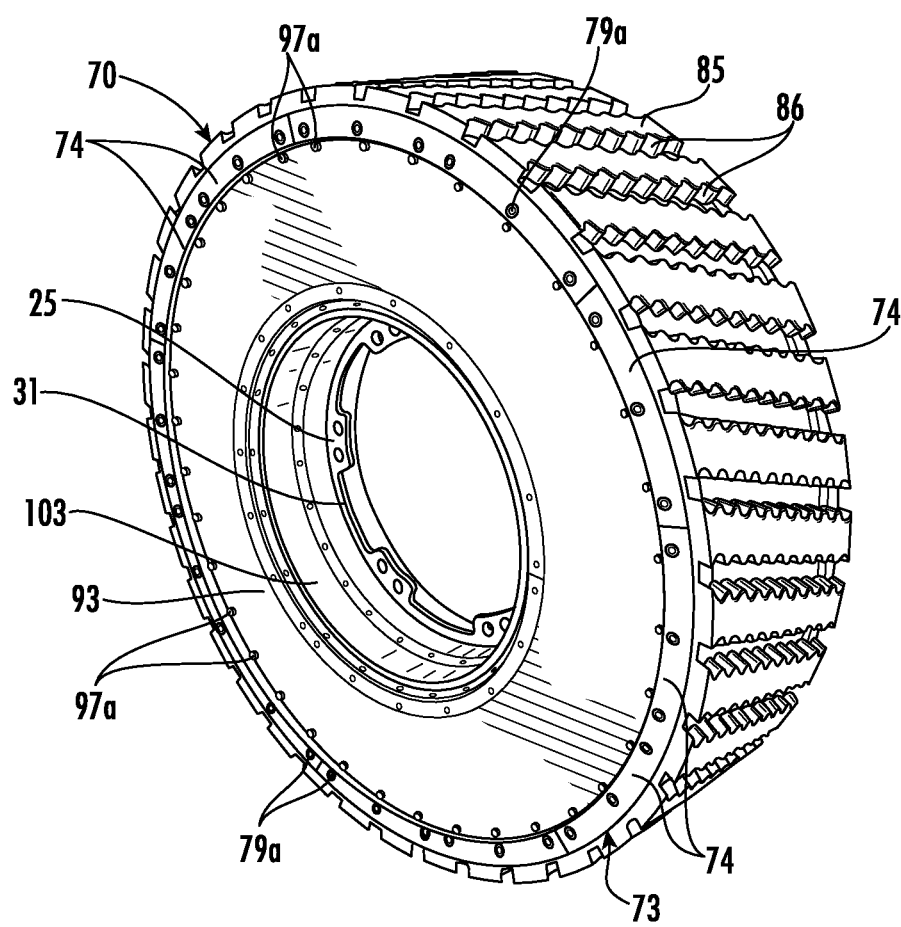
FIG. 7 is a perspective view of a portion of a wheel assembly including tread assemblies and a removable sidewall in accordance with an embodiment.
Figure 8:
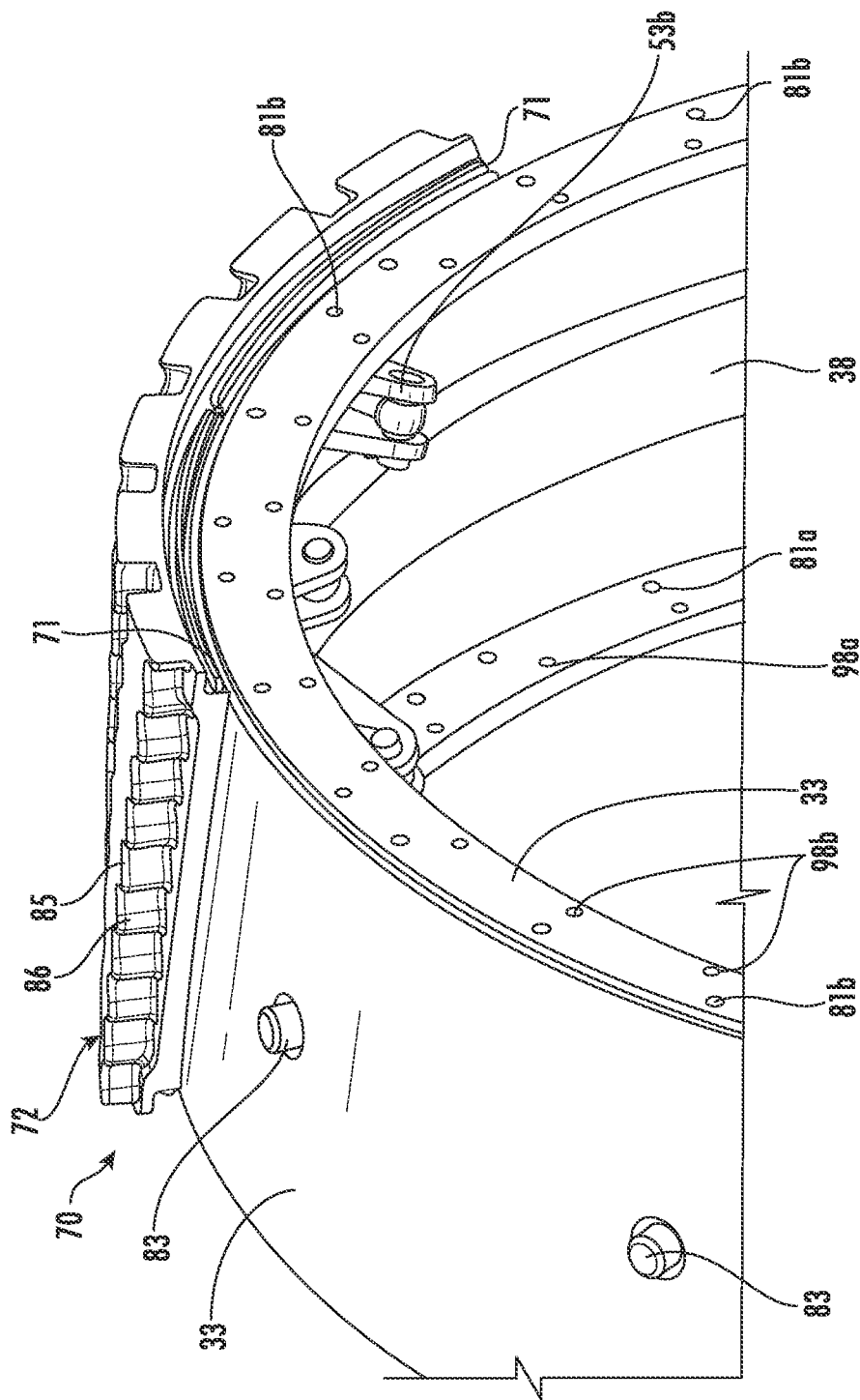
FIG. 8 is a perspective view of a portion of a wheel assembly in accordance with an embodiment.
Figure 9:
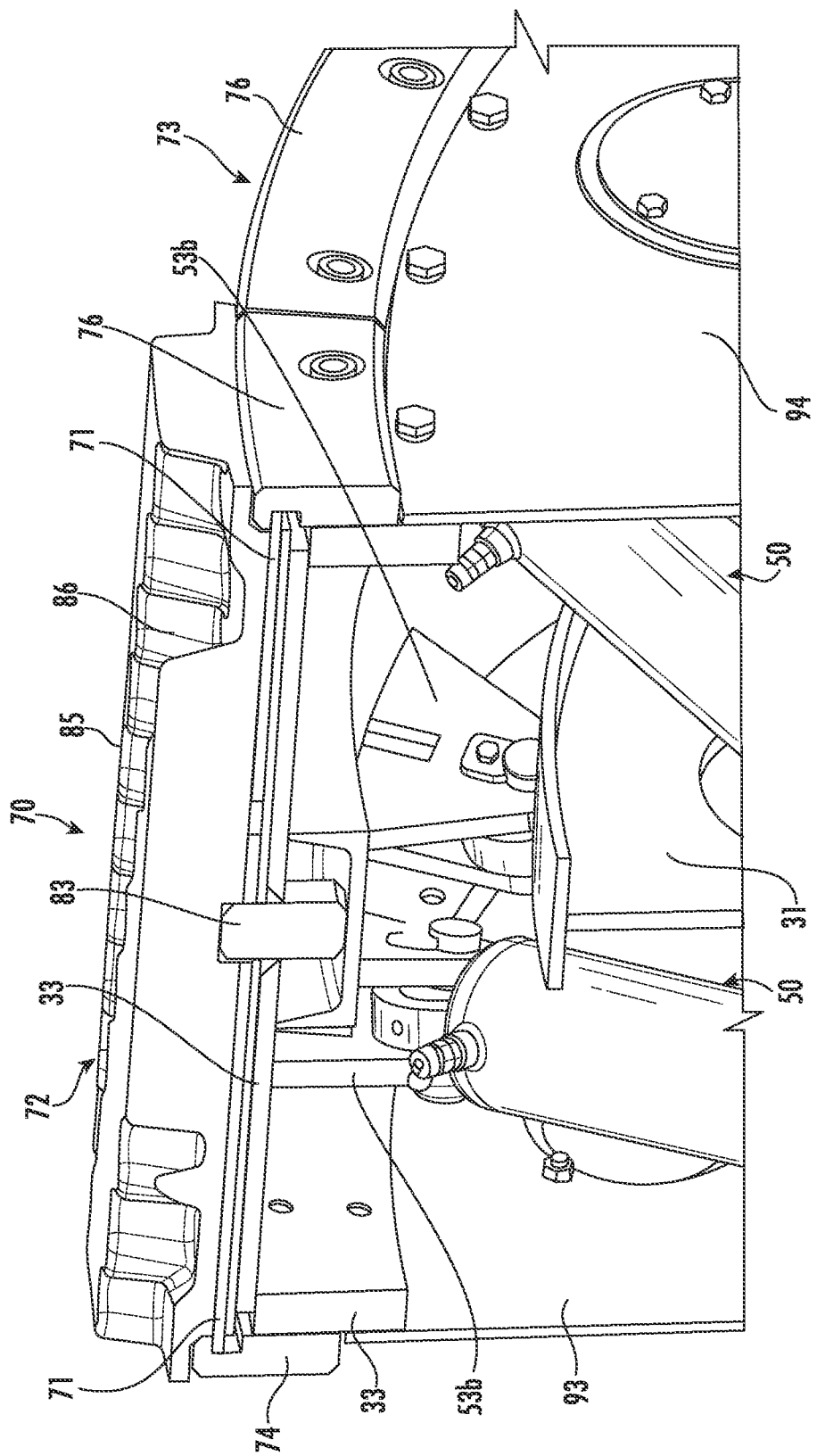
FIG. 9 is another perspective view of a portion of a wheel assembly in accordance with an embodiment.
Figure 10:
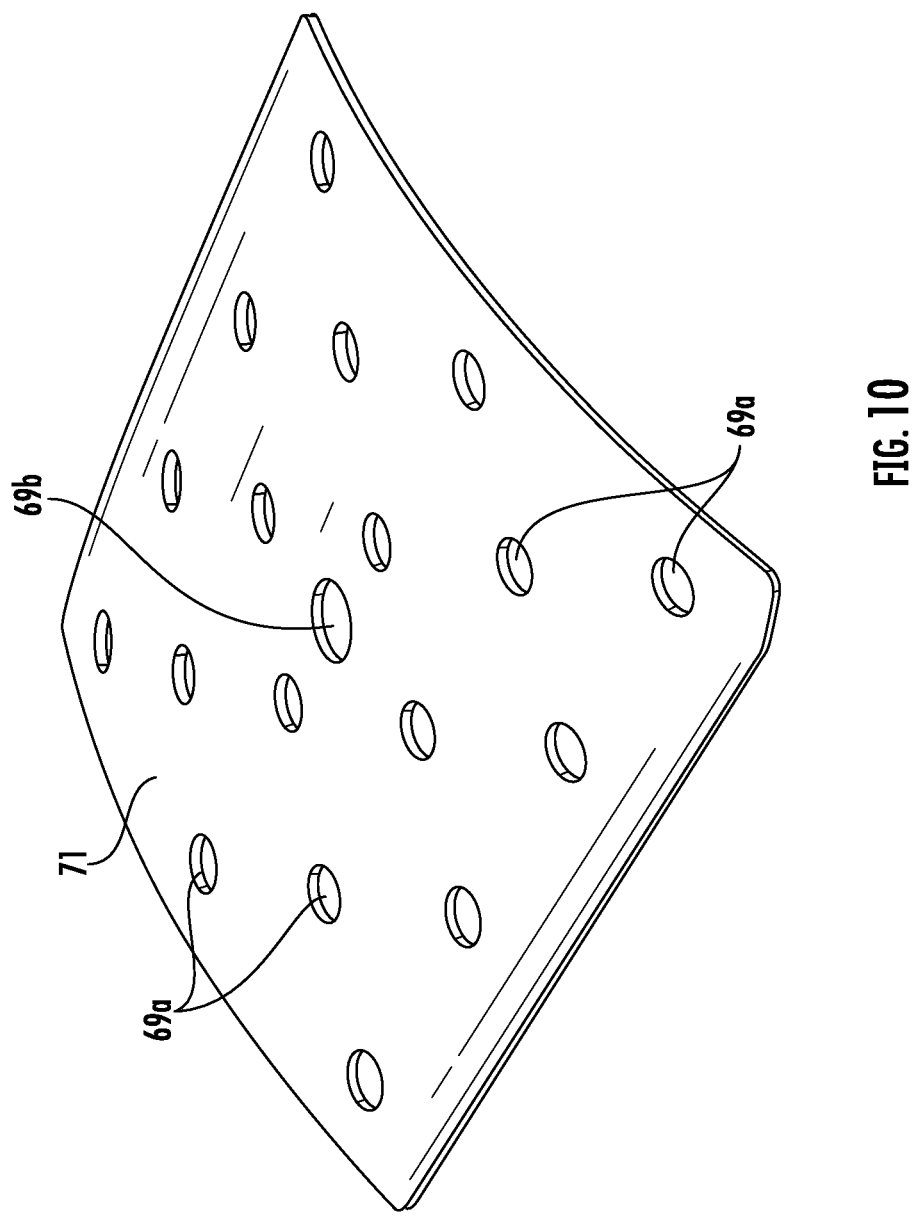
FIG. 10 is a perspective view of the tread member support of FIG. 9.
Figure 11:
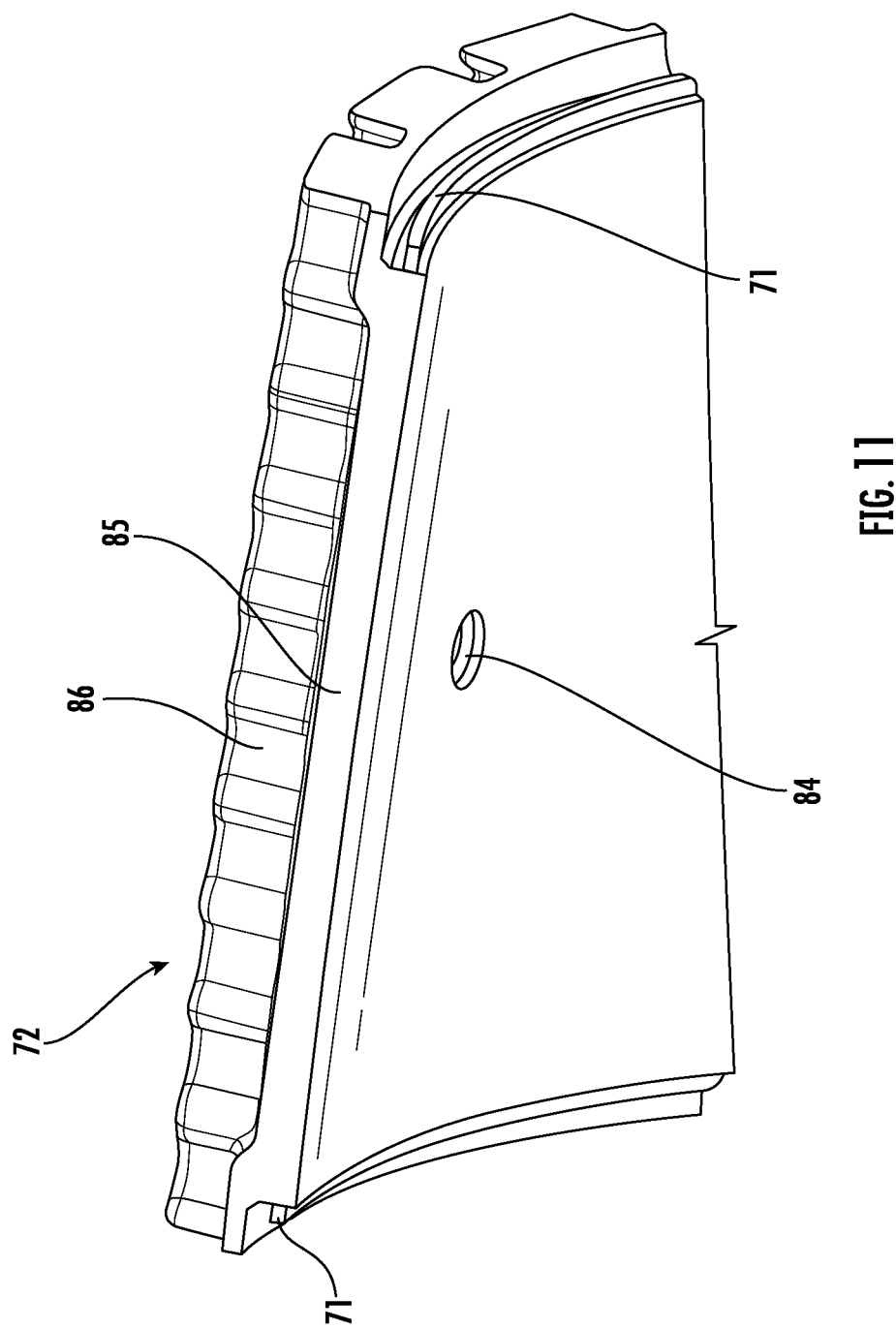
FIG. 11 is a perspective view of a portion of the tread assembly of FIG. 9.
Figure 12:
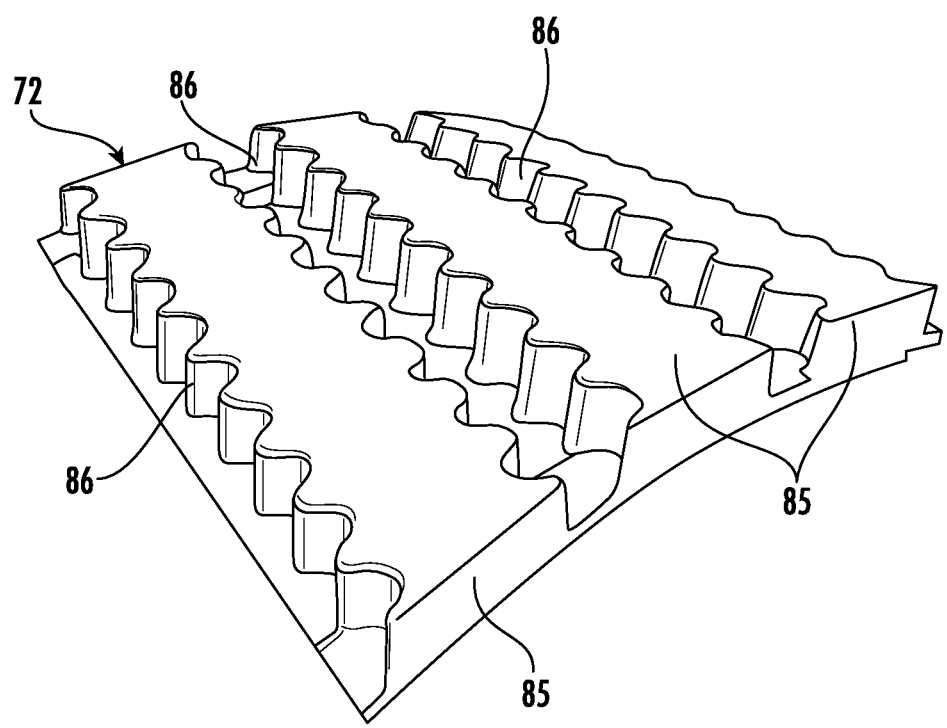
FIG. 12 is a perspective view of a tread member of the tread assembly of FIG. 9.
Figure 13:
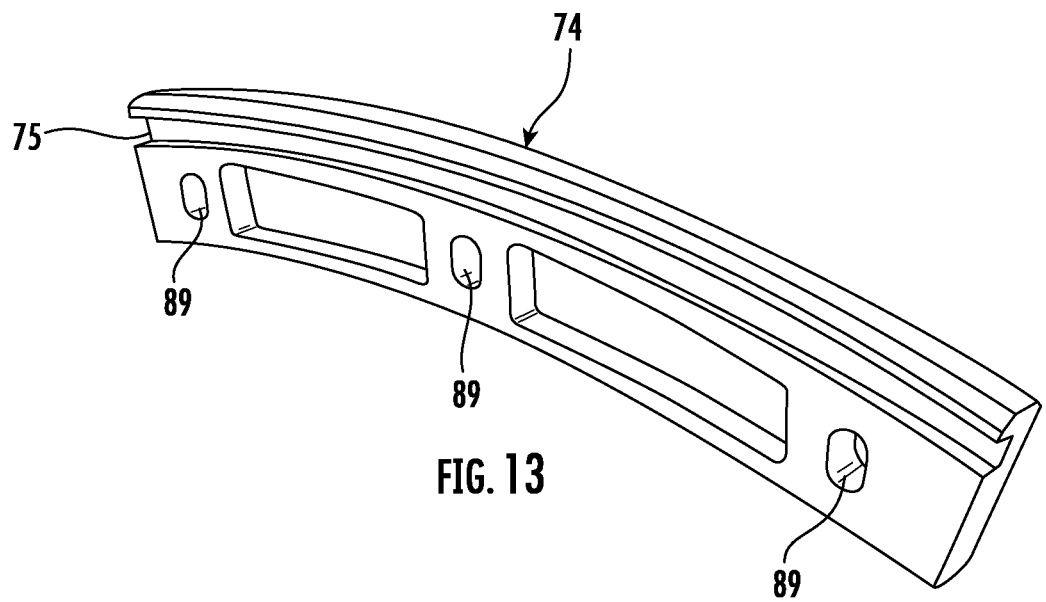
FIG. 13 is a perspective view of an inboard clamping member of a wheel assembly according to an embodiment.
Figure 14:
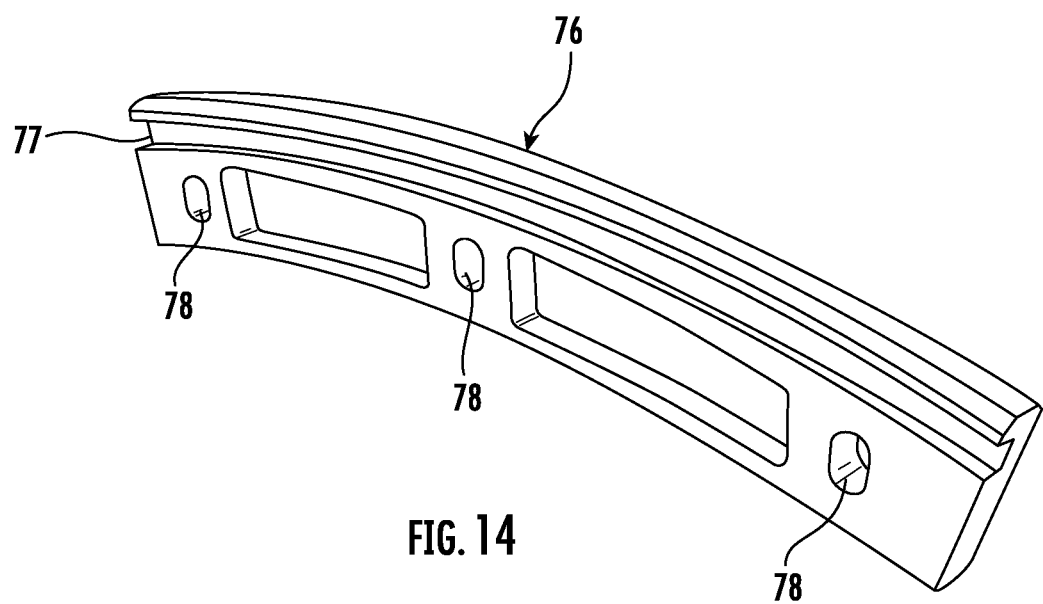
FIG. 14 is a perspective view of an outboard clamping member of a wheel assembly according to an embodiment.
Figure 15:
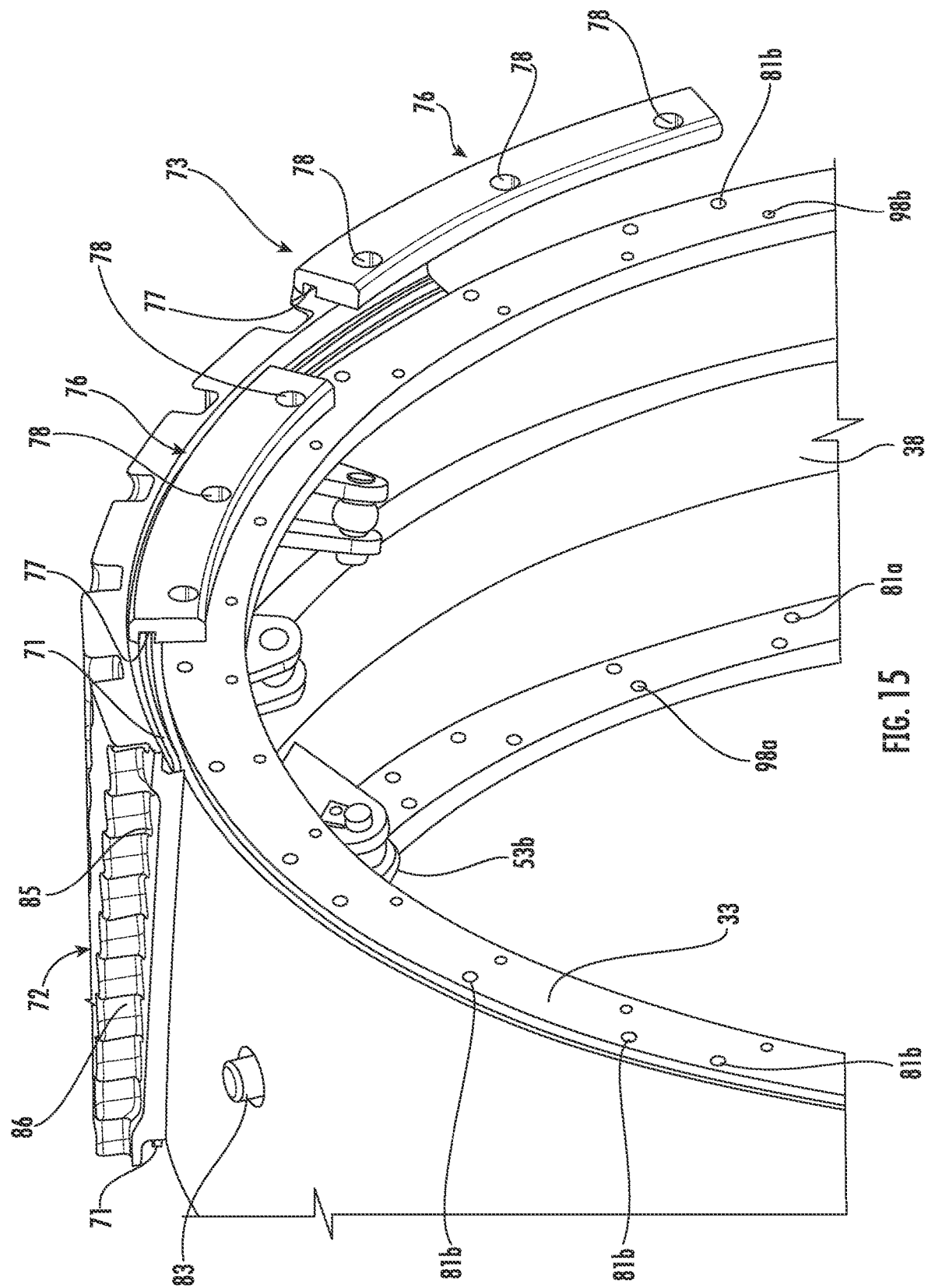
FIG. 15 is a perspective view of a portion of a wheel assembly including outboard clamping members in accordance with an embodiment.
Figure 16:
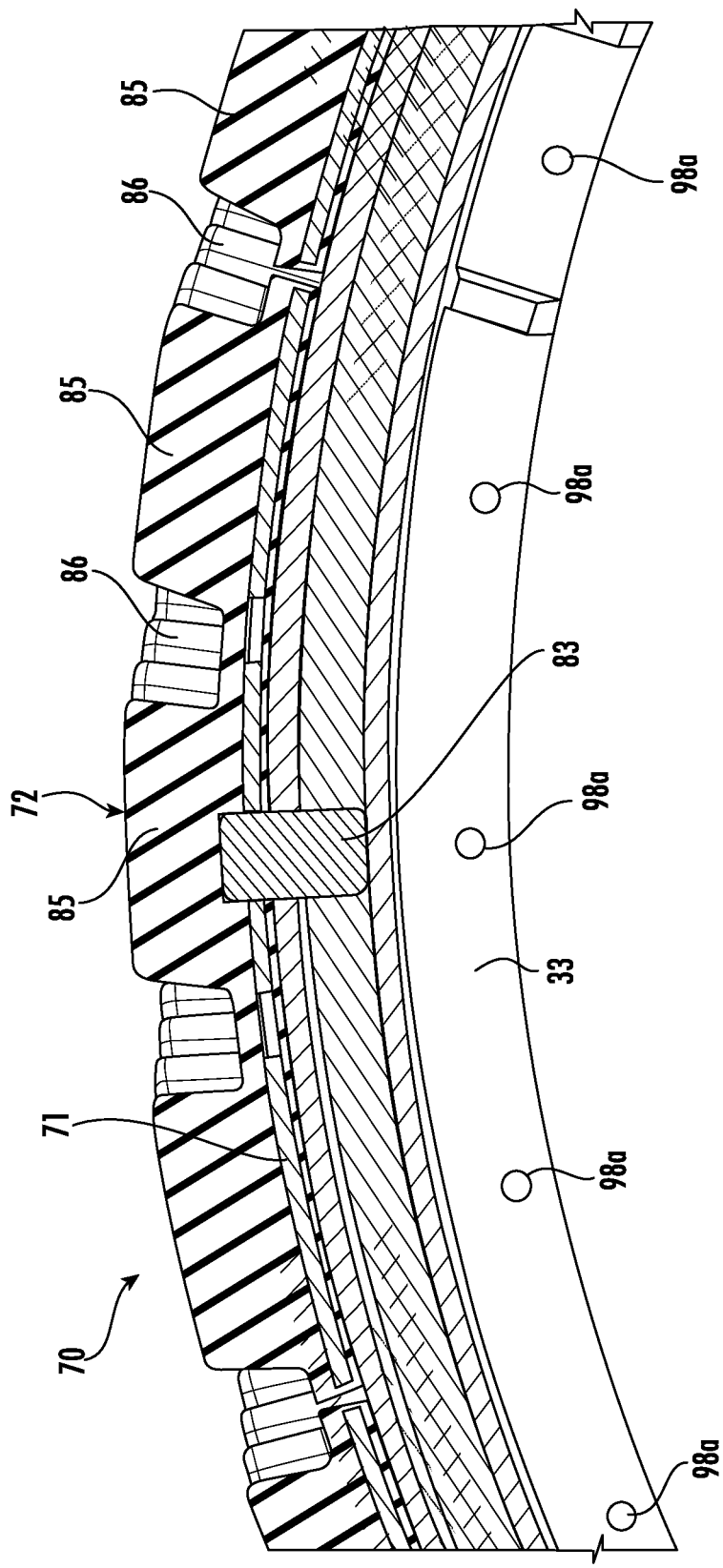
FIG. 16 is a cross-sectional view of a portion of an outer rim, retaining feature, and tread assembly in accordance with an embodiment.
Figure 22:
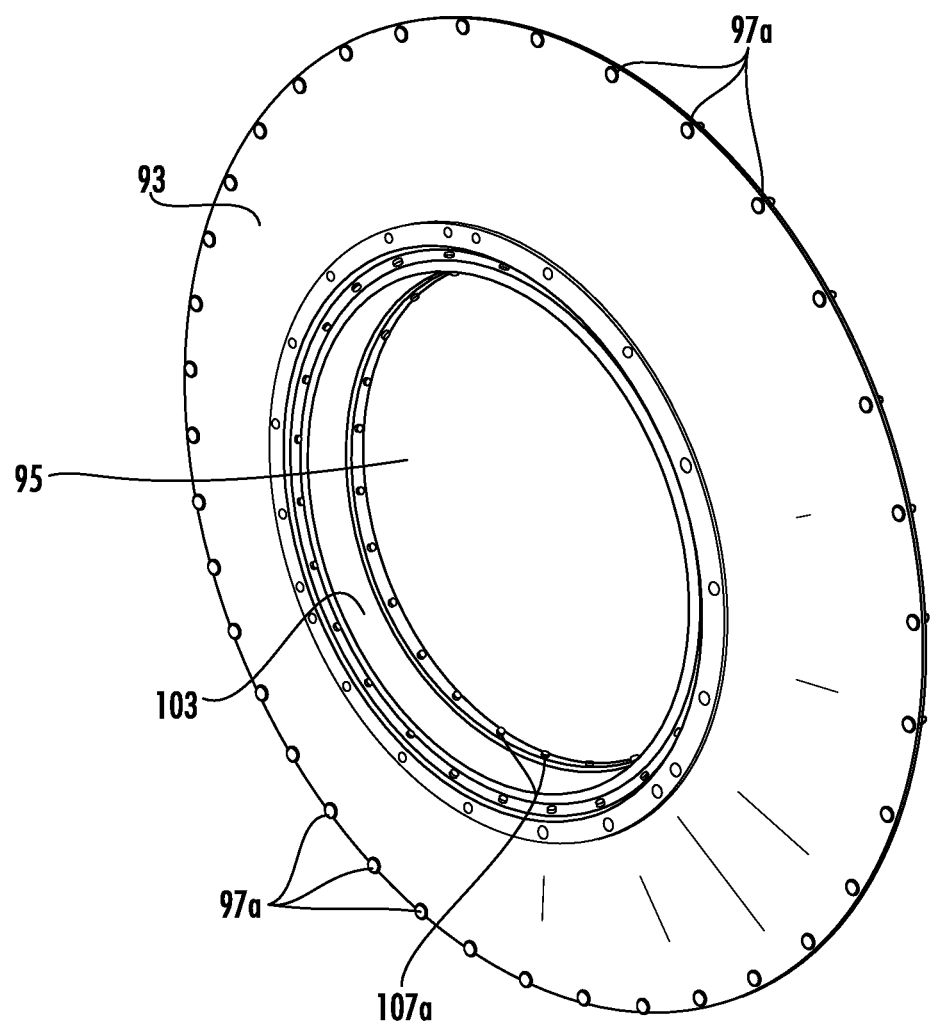
FIG. 22 is a perspective view of the inboard removable sidewall of the wheel assembly in accordance with an embodiment.
Figure 23:
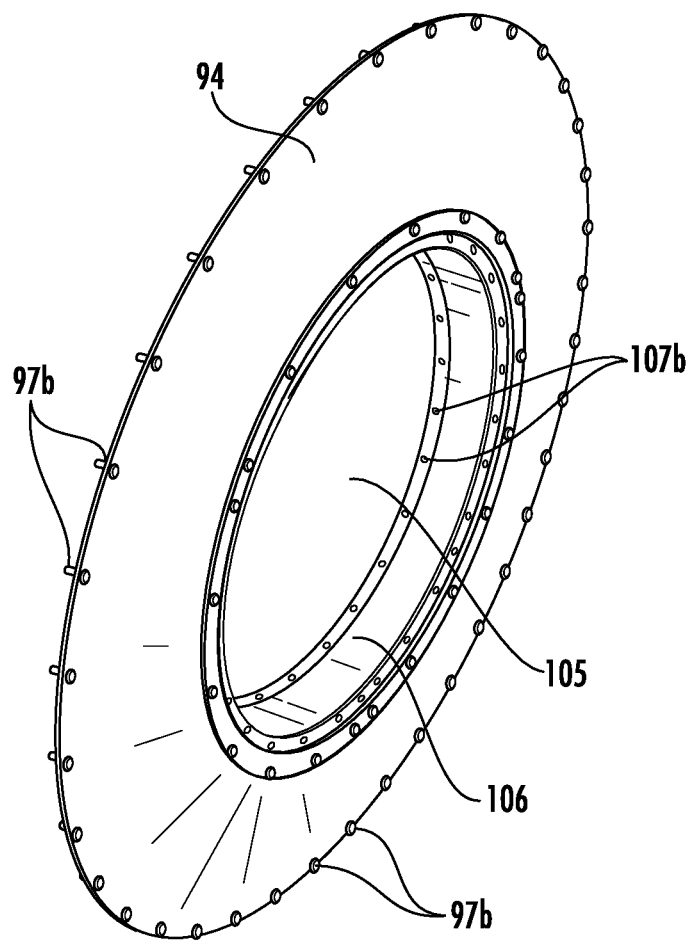
FIG. 23 is a perspective view of an outboard removable sidewall of a wheel assembly in accordance with an embodiment.

Referring now additionally to FIGS. 22 and 23, the wheel assembly 30 may include inboard and outboard removable sidewalls 93, 94. The inboard and outboard removable sidewalls 93, 94 are each illustratively in the form of a round or circular cover carried by the outer rim 33. More particularly, the inboard and outboard removable sidewalls 93, 94 each has an opening 95, 105 therein to permit, for example, coupling of the wheel assembly 30 to the hub 21. Respective flanges 103, 106 extend inwardly within the openings 95, 105. The inboard and outboard removable sidewalls 93, 94 may each be coupled to the inboard and outboard sides of the outer rim 33 by way of fasteners 97a, 97b and to the inner rim 31 also by way of fasteners 107a, 107b. The fasteners 97a, 97b may be received through fastener receiving passageways along the outer circumference of each of the inboard and outboard removable sidewalls 93, 94 and fasten to corresponding respective aligned threaded passageways 98a, 98b in the outer rim 33. The threaded passageways 98a, 98b in the outer rim 33 form a second, inner row of threaded passageways, with the outer row of threaded passageways 81a, 81b for securing the clamping arrangement 73 to the outer rim with fasteners 79a (FIG. 7).

Figure 24:
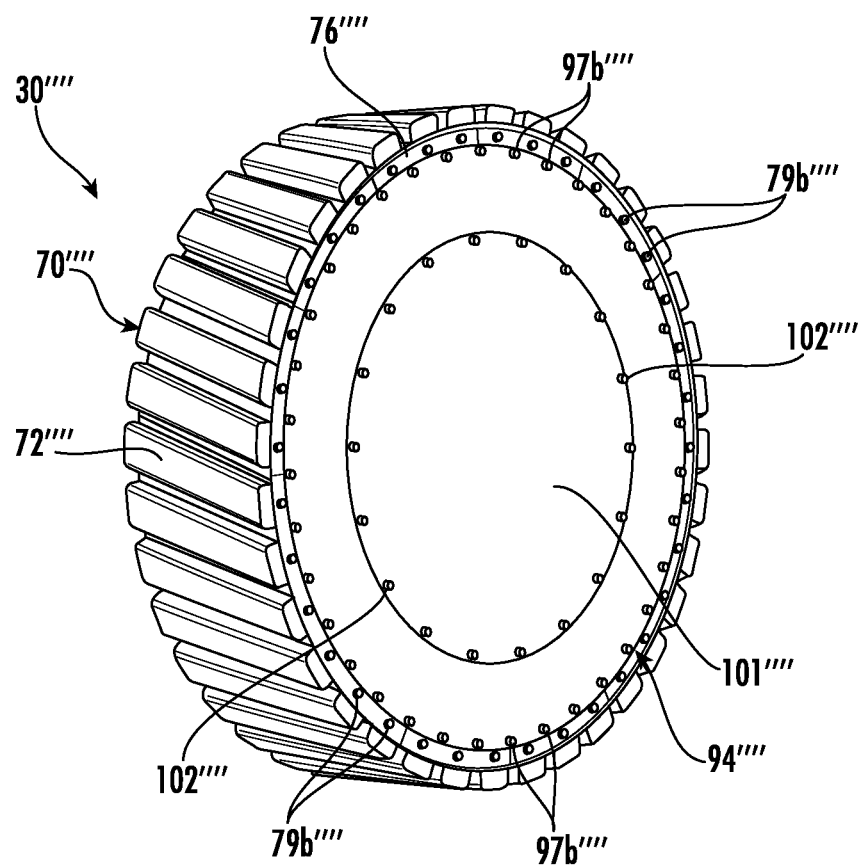
FIG. 24 is a perspective view of a wheel assembly in accordance with another embodiment.

Referring now to FIG. 24, in another embodiment, the outboard removable sidewall 94'''' may have a removable inner panel 101'''' that when removed, by way of respective fasteners 102'''', permit access to inner interior of the wheel assembly 30'''', for example, the inner rim. Similar to the outboard removable sidewall described above, the outboard sidewall 94'''' couples by way of fasteners 97b'''' to the outer rim inside of or adjacent the outboard clamping members 76'''' (which are secured to the outer rim also by way of fasteners 79b''''). Elements labeled 51'''', 52'''', 91'''', 70'''' and 72'''' are similar to those respectively numbered elements described above without quadruple prime notation.

As will be appreciated by those skilled in the art, the inboard and outboard removable sidewalls 93, 94 may be particularly advantageous for reducing the amount of dust and/or debris within the interior of the wheel assembly 30, for example, between the inner and outer rims 31, 33. Accordingly, elements of the wheel assembly 30, for example, the disk 40 and gas springs 50, may have increased protection against damage, for example, from environmental elements (e.g., rocks, dust, dirt, water, etc.), and thus may have a longer service life. In some embodiments, the wheel assembly 30 may not include the inboard and outboard removable sidewalls 93, 94.

Figure 25:
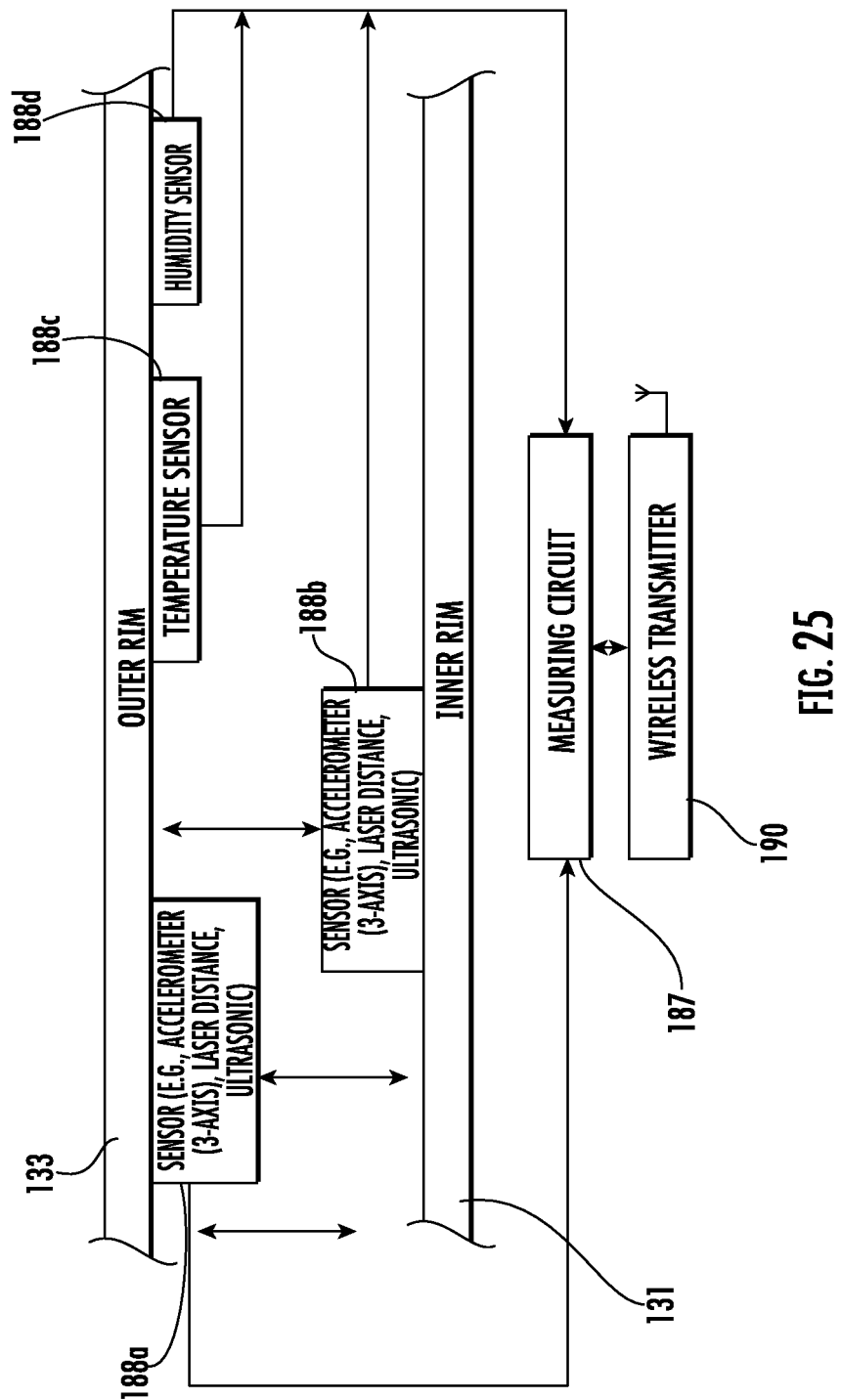
FIG. 25 is a schematic diagram of a portion of a wheel assembly including a sensor for measuring distance between the inner and outer rims in accordance with another embodiment.

Referring now to FIG. 25, in another embodiment, sensors 188a, 188b sense relative movement, such as by sensing a distance between the inner rim 131 and the outer rim 133. More particularly, the sensors 188a, 188b may be in the form of three-axis accelerometers. Of course, the sensors 188a, 188b may be other types of sensors, for example, laser distance sensors, ultrasonic sensors, linear variable differential transformer (LVDT) sensors, and/or other contact or non-contact displacement sensors.

When the sensors 188a, 188b are in the form of three-axis accelerometers, one of the accelerometers is carried by the inner rim 131 defining an inner accelerometer, while another accelerometer is carried by the outer rim 133 defining an outer accelerometer. The inner and outer accelerometers 188a, 188b are aligned by way of their axes so that relative movement of the inner and outer rims 131, 133 as a sensed acceleration can be translated, for example, by way of a distance measuring circuit 187 coupled to the accelerometers 188a, 188b (e.g., integrating each acceleration).

The sensors 188a, 188b may each be different from one another. For example, an ultrasonic sensor may be used with the inner and outer accelerometers 188a, 188b to sense or measure displacement (e.g., tangential to the inner and outer accelerometers). Of course, a laser distance sensor may be used as an alternative to the ultrasonic sensor or in conjunction with the ultrasonic sensor and/or the inner and outer accelerometers 188a, 188b. The measuring circuit 187 may be carried by the wheel assembly, the vehicle, or remote from the vehicle.

A temperature sensor 188c may be carried by the outer rim 133 (e.g., within or on an inner surface of the outer rim) and coupled to the measuring circuit 187 to sense a temperature within the wheel assembly, for example, when a cover or inboard or outboard removable sidewalls are used. A humidity sensor 188d may alternatively or additionally be carried by the outer rim 133 (e.g., within or on an inner surface of the outer rim) and coupled to the measuring circuit 187 to sense humidity within the wheel assembly, for example, when a cover or inboard or outboard removable sidewalls are used. Data representing the humidity, acceleration or distance data (e.g., raw data or processed), and/or temperature may be remotely communicated from the wheel assembly or vehicle via a wireless transmitter 190 coupled to the measuring circuit 187 for downstream processing.

Referring now to FIGS. 26-31, in another embodiment, the wheel assembly 230 includes a rigid inboard cover ring 293 coupled to an inboard side of the outer rim 233, for example, by way of fasteners 207a. The rigid inboard cover ring 293 extends radially inward toward the inner rim 231. More particularly, the rigid inboard cover ring 293 defines a radially and axially extending inboard gap with the inner rim 231. A flexible inboard seal 209a, for example, in the form of an inboard bellows seal, is coupled between the rigid inboard cover ring 293 and the inner rim 231, for example, by way of respective fasteners 208a to couple to the inner rim (e.g., used with a clamping arrangement 212a, such as, for example, metal banding or other material). The flexible inboard seal 209a closes the radially and axially extending inboard gap and permits relative movement of the inner rim 231 and the outer rim 233. Illustratively, the inboard bellows seal 209a has a Z-shaped cross-section. The flexible inboard seal 209a may be a different kind of flexible seal, for example, and may have a different shaped cross-section. The flexible inboard seal 209*a* may include rubber and/or an elastomeric material. The flexible inboard seal 209*a* may include other and/or additional materials.

The wheel assembly 230 also includes a rigid outboard cover ring 294 coupled to an outboard side of the outer rim 233, for example by way of fasteners 207*b*. The rigid outboard cover ring 294 extends radially inward toward the inner rim 231. More particularly, the rigid outboard cover ring 294 defines a radially and axially extending outboard gap with the inner rim 231. A flexible outboard seal 209*b*, for example, in the form of an outboard bellows seal, is coupled between the rigid outboard cover ring 294 and the inner rim 231, for example, by way of respective fasteners 208*b* (and respective clamping arrangement 212*b*, for example). The flexible inboard seal 209*b* closes the radially and axially extending outboard gap and permits relative movement of the inner rim 231 and the outer rim 233. Illustratively, the outboard bellows seal 209*a* has a Z-shaped cross-section. The flexible outboard seal 209*b* may be a different kind of flexible seal, for example, and may have a different shaped cross-section.

Figure 26:
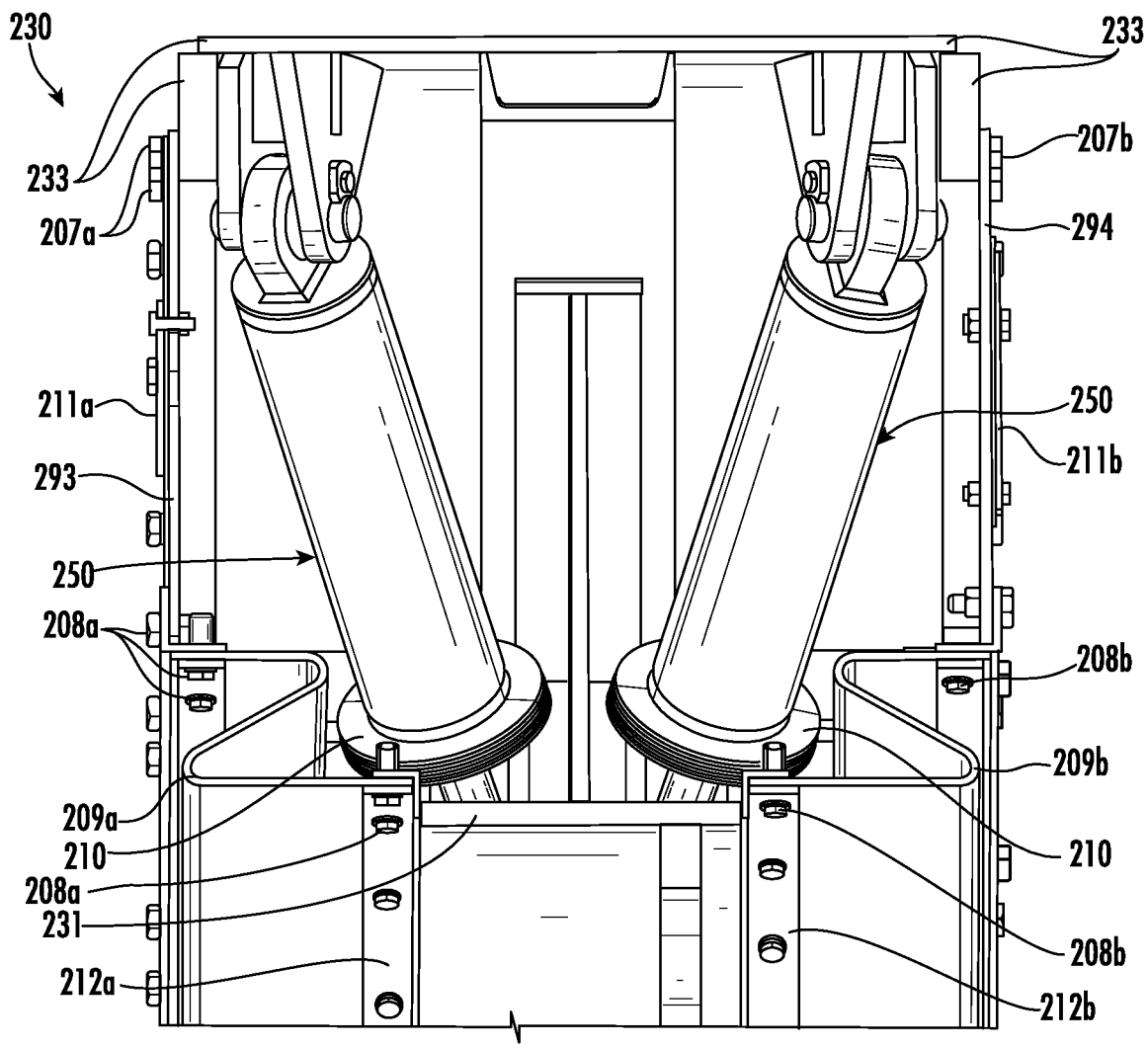
FIG. 26 is a side cut-away view of a portion of a wheel assembly in accordance with another embodiment.
Figure 27:
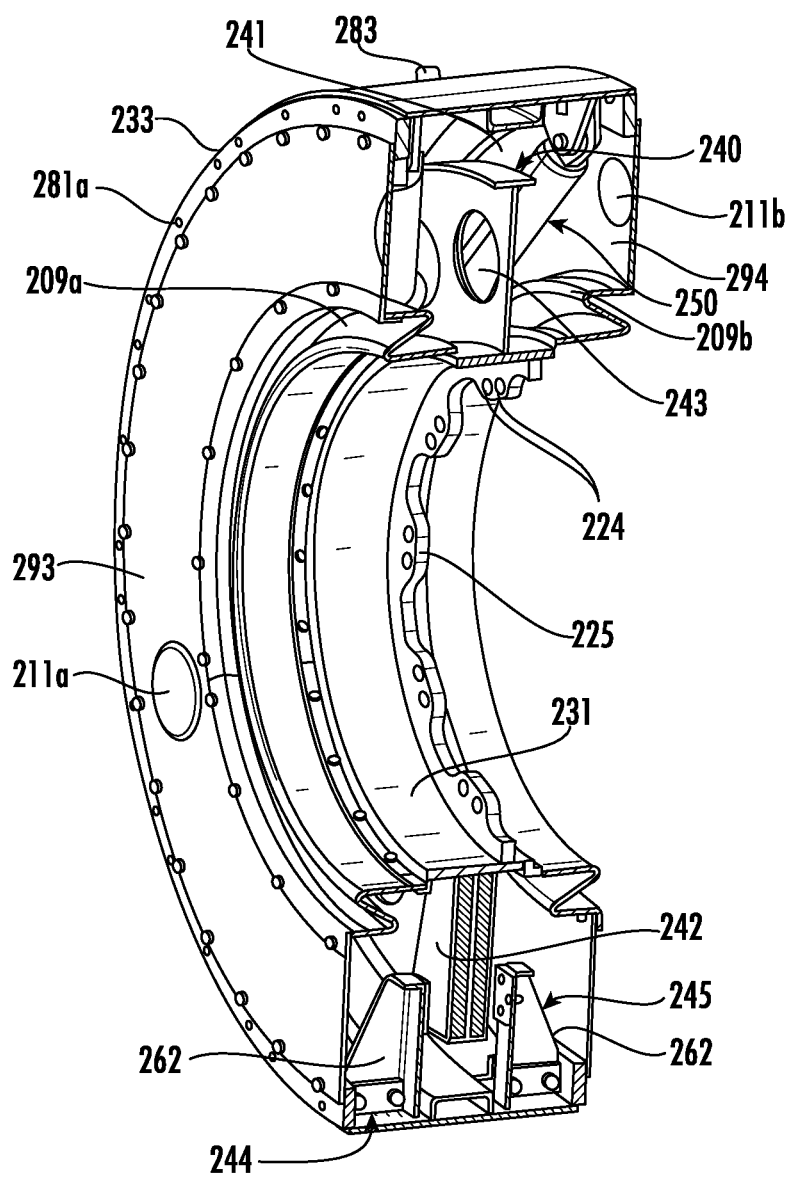
FIG. 27 a perspective cut-away view of the portion of the wheel assembly of FIG. 26.
Figure 28:
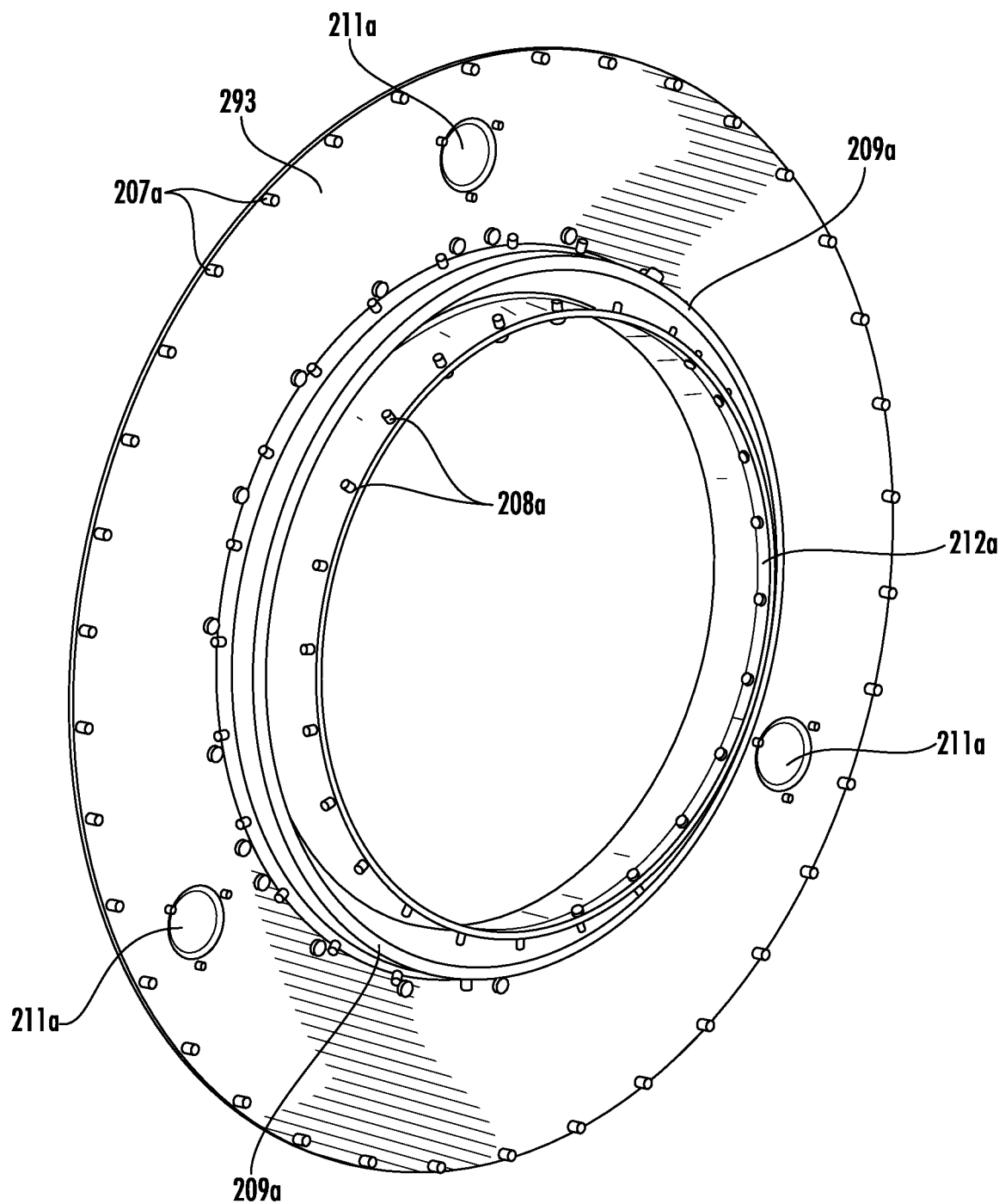
FIG. 28 is a perspective view of a cover ring and flexible seal of FIG. 27.
Figure 29:
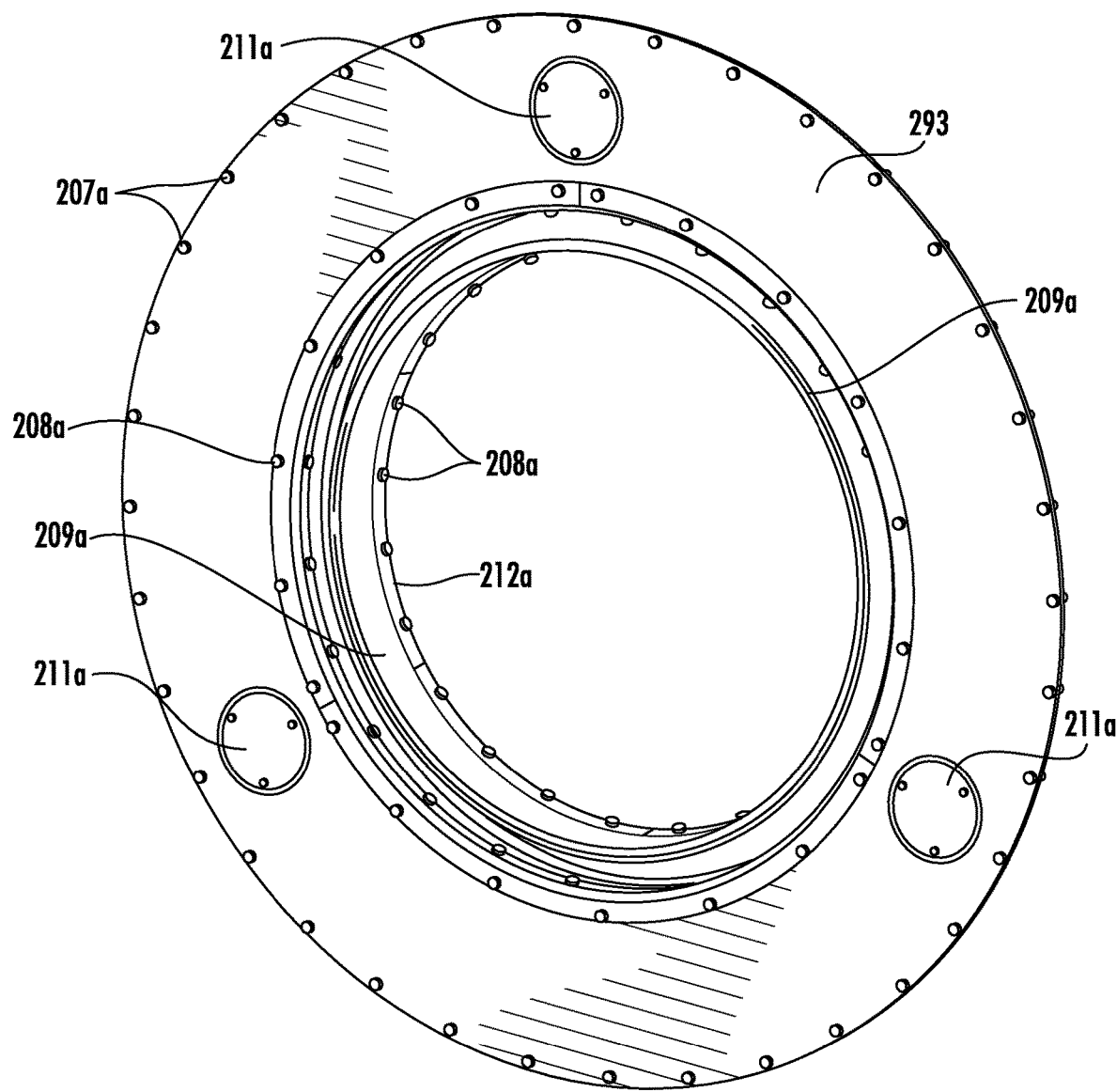
FIG. 29 is another perspective view of the cover ring and flexible seal of FIG. 27.
Figure 30:
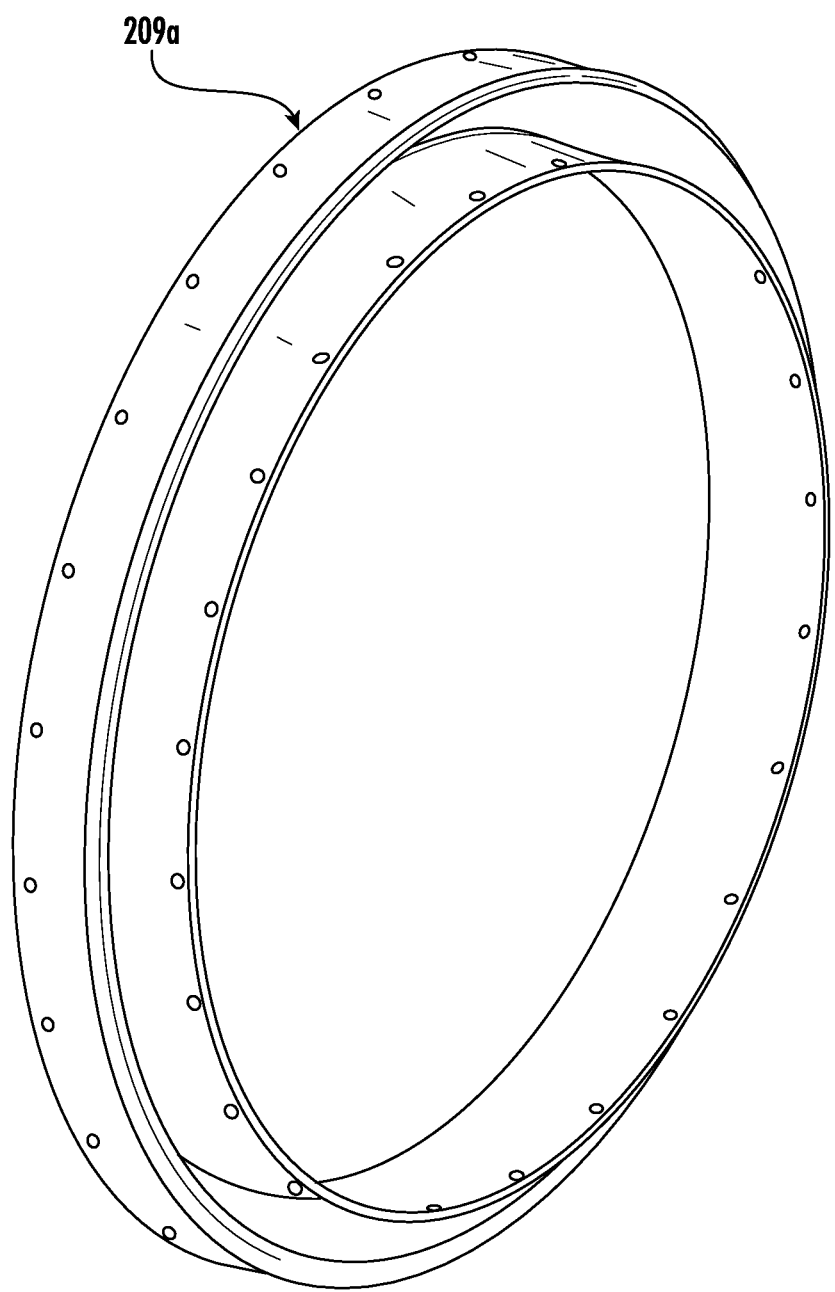
FIG. 30 is a perspective view of the flexible seal of FIG. 27.

Still further, a respective pleated cover 210 (e.g., bellows), is coupled to each of the gas springs 250. In particular, the pleated covers 210 cover the piston so that dust, dirt, and/or debris may be kept from the piston (FIG. 26). A reduced amount of dust, dirt, and/or debris in contact with the piston may increase the operational lifespan of the gas springs 250, as will be appreciated by those skilled in the art.

The flexible outboard seal 209*b* may include rubber and/or an elastomeric material. The flexible outboard seal 209*b* may include other and/or additional materials. A rigid outboard cover ring 294 and a flexible outboard seal 209*b* may not be used in some embodiments. Elements labeled 224, 225, 240, 241, 242, 243, 244, 245, 262, 281*a* and 283 are similar to respective elements labeled 24, 25, 40, 41, 42, 43, 44, 45, 62, 81*a* and 83 (i.e. decremented by 200) described above.

Figure 31:
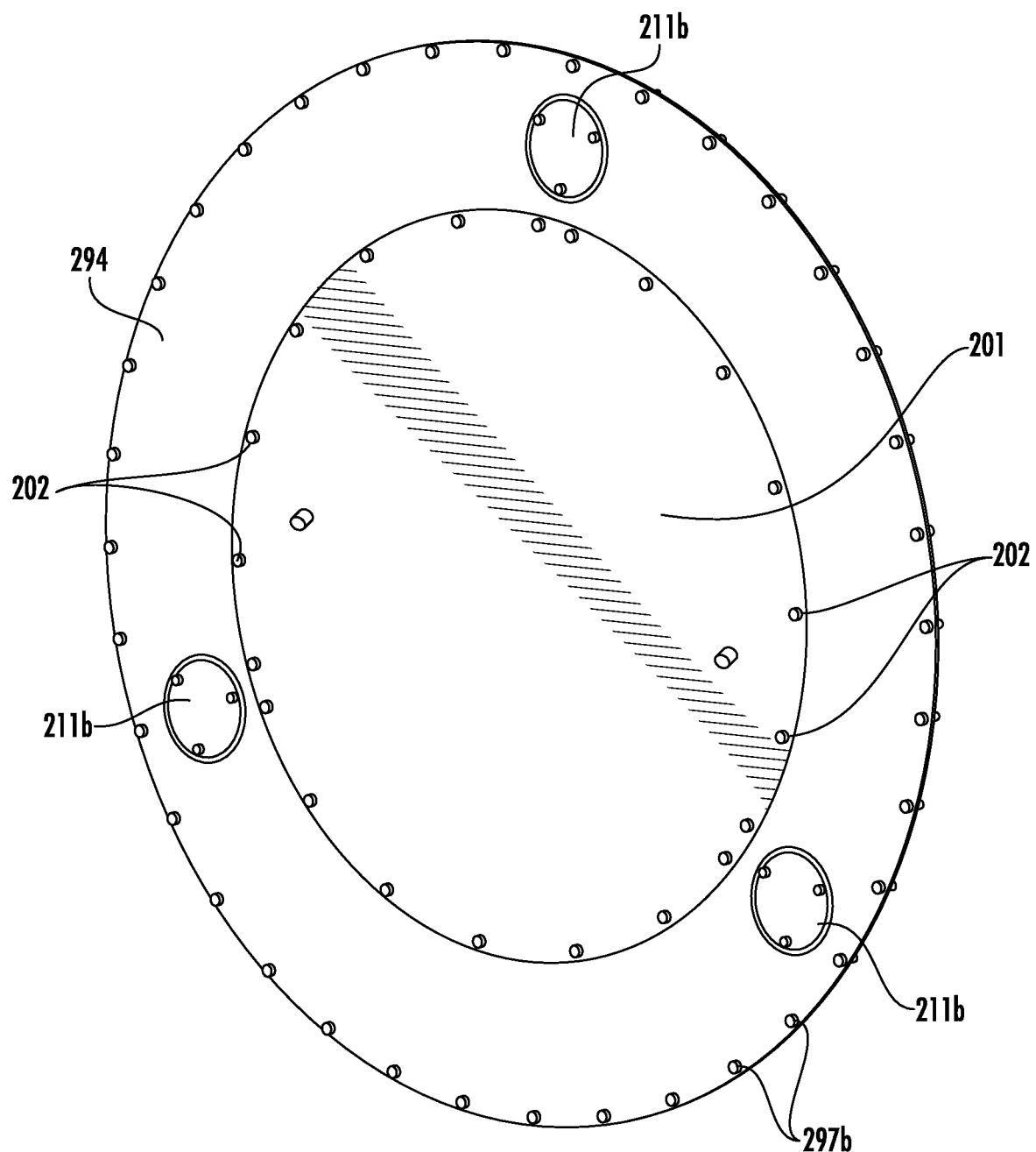
FIG. 31 is a perspective view of another cover ring and flexible seal of FIG. 27.

Referring now particularly to FIG. 31, similar to the embodiments described above with respect to FIGS. 22-24, a rigid removable inset panel or inner panel 201 may be carried within the rigid outboard cover ring 294 (e.g., secured to the wheel assembly by way of fasteners 297*b*) so that when removed, by way of respective fasteners 202, permits access to inner interior of the wheel assembly 230, for example, the inner rim. Access ports or removable covers 211*a* are spaced apart within the rigid outboard cover ring 294. The removable covers 211*a* may be clear acrylic, for example, to permit visual inspection within the wheel assembly without removing the rigid removable inset panel 201 and/or to permit ease of access to sensors, controller, and/or other circuitry, for example, as described above. A similar arrangement including the access ports or removable covers 211*b* may be used as the rigid inboard cover ring 294, for example, as described above (FIGS. 26-27). The access ports 211*a*, 211*b* may be not used in all embodiments.

The embodiments of the wheel assembly 30 described herein may be particularly advantageous with respect to a conventional pneumatic tire, for example, particularly on a relatively large vehicle (e.g., heavy machinery). A conventional pneumatic tire, for example, for heavy machinery has a relatively high cost and, in some environments, may have a relatively short usage life. Moreover, particularly with heavy machinery, a failure of a conventional tire may cause be associated with an increased chance of damage to the heavy machinery. Even still further, a failure of a conventional tire may cause the vehicle 20 to be inoperable or out of service for a relatively long time period, thus resulting in a financial loss and loss of productivity, particularly for certain types of vehicles or heavy machinery that operate around the clock.

The wheel assembly 30 may address these shortcomings of a conventional tire. More particularly, the wheel assembly 30 may have a lower operational cost with increased performance (e.g., by way of the controllable operating response of the gas springs 50). Additionally, the wheel assembly 30 may be field serviceable, meaning that tread members 72 may be replaced in the field. Repairs, for example, in the case of failed gas springs 50, may also be repaired in the field.

A method aspect is directed to a method of making a wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim. The method also includes mounting a plurality of tread assemblies 70 to the outer rim 33. Each tread assembly 70 may be mounted by bonding at least one tread member 72 to a tread member support 71 and positioning a clamping arrangement 73 to removably secure the tread member support to the outer rim 33.

Another method aspect is directed to a method of making wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim 31 to provide a gas suspension for relative movement between the inner rim and the outer rim. The method also includes coupling a disk 40 to the inner rim 31 that defines a closeable gap 41 with adjacent interior portions of the outer rim 33 to define a mechanical stop to limit relative movement of the inner rim and outer rim.

Another method aspect is directed to a method of making a wheel assembly 30 to be coupled to a hub 21 of a vehicle 20. The method includes operatively coupling a plurality of gas springs 50 operatively between an inner rim 31 to be coupled to the hub 21 of a vehicle 20 and an outer rim 33 surrounding the inner rim to provide a gas suspension for relative movement between the inner rim and the outer rim. The method also includes coupling a disk 40 coupled to the inner rim 31 and defining a closeable gap 41 with adjacent interior portions of the outer rim 33. The method may further include positioning a plurality of inboard lateral stops 44 carried by an inboard interior surface of the outer rim 33, and positioning plurality of outboard lateral stops 45 carried by outboard interior surface of the outer rim so that the plurality of inboard lateral stops and plurality of outboard lateral stops cooperate to limit relative lateral movement of the disk 40 and the outer rim.

Another method aspect is directed to a method of making a wheel assembly 30 to be coupled to a hub 21 of a vehicle 20. The method includes operatively coupling a plurality of gas springs 50 between an inner rim 31 to be coupled to the hub 21 of the vehicle 20 and an outer rim 33 surrounding the inner rim. At least one gas spring 50 from among the plurality thereof has a controllable operating response. The method also includes coupling a local controller 87 to the at least one gas spring 50 to control the operating response of the at least one gas spring.

Another related method aspect is directed to a method of operating a wheel assembly 30 to be coupled to a hub 21 of a vehicle 20. The wheel assembly 30 includes an inner rim 31 to be coupled to the hub 21 of the vehicle 20, an outer rim 33 surrounding the inner rim, and a plurality of gas springs 50 operatively coupled between the inner rim and the outer rim. At least one gas spring 50 from among the plurality thereof has a controllable operating response. The method includes operating a local controller 87 coupled to the at least one gas spring 50 to control the operating response of the at least one gas spring.

Another method aspect is directed to a method of sensing relative movement, e.g. a distance, between an inner rim 131 of a wheel assembly 30 to be coupled to a hub 21 of a vehicle 20 and an outer rim 133 of the wheel assembly. The inner rim 131 is to be coupled to the hub 21 of a vehicle 20 and the outer rim 133 surrounding the inner rim. The wheel assembly 30 includes a plurality of gas springs 50 operatively coupled between the inner rim 131 and the outer rim 133 and permitting relative movement therebetween. The method includes using at least one sensor 188a, 188b to sense the relative movement between the inner and outer rims 131, 133 during operation or rolling of the wheel assembly.

Another method aspect is directed to a method of making a wheel assembly 30 to be coupled to a hub 21 of a vehicle 20. The method includes coupling an inner rim 231 to be to the hub 21 of the vehicle 20 and positioning an outer rim 233 surrounding the inner rim. The method also includes operatively coupling a plurality of gas springs 50 between the inner rim 231 and the outer rim 233 to permit relative movement therebetween. The method further includes coupling a rigid inboard cover ring 293 to an inboard side of the outer rim 233 and extending radially inward toward the inner rim 231 and coupling a flexible inboard seal 209a between the rigid inboard cover ring and the inner rim.

Figure 32:
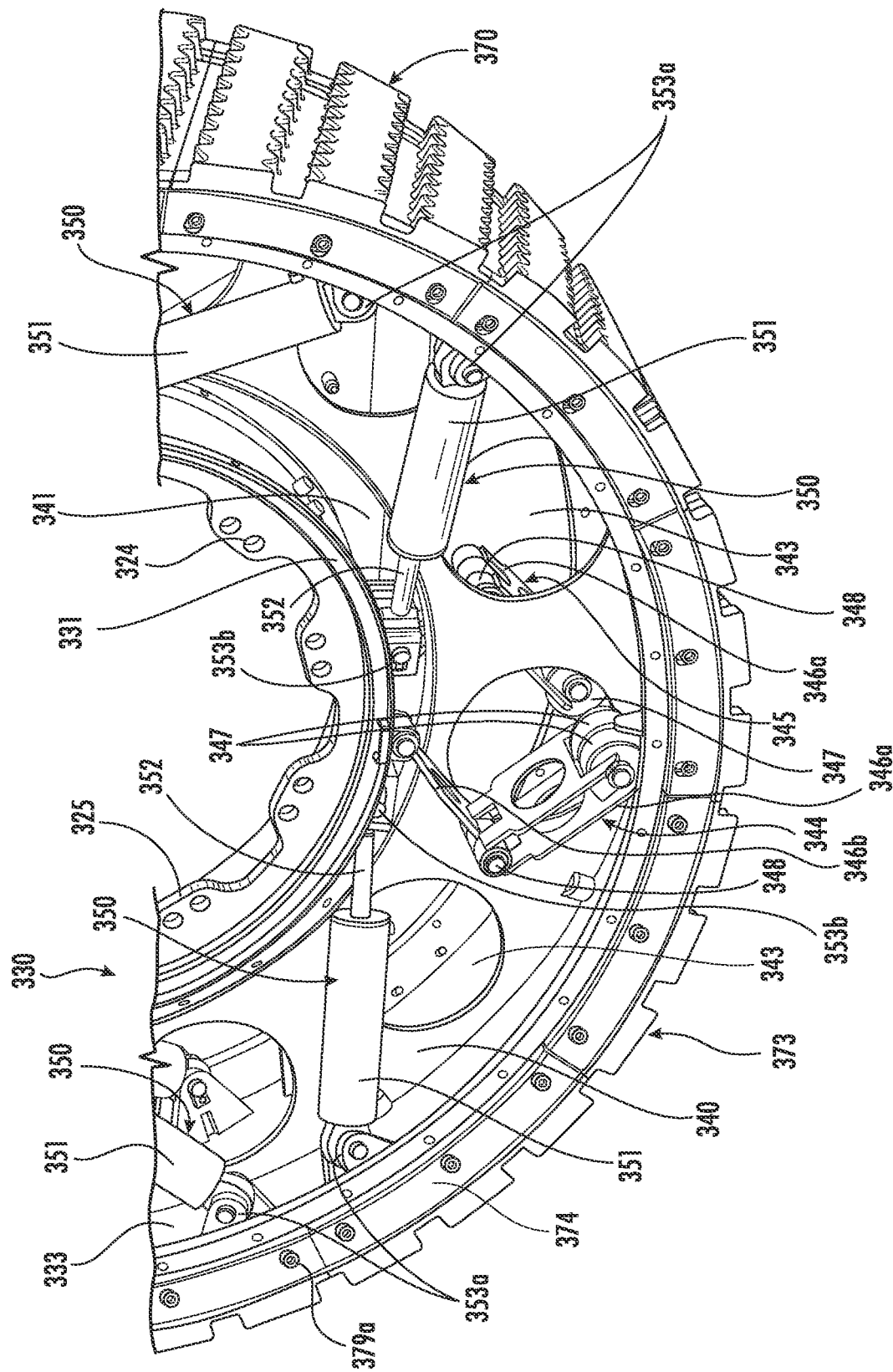
FIG. 32 is a perspective view of a portion of a wheel assembly according to another embodiment.

Referring now to FIG. 32, in another embodiment of the wheel assembly 330, an outer ring 340 or disk is coupled to the outer rim 333. This is in contrast to embodiments described above where the ring or disk 40 is coupled to the inner rim 331. In the present embodiments, the outer ring 340 being coupled to the outer rim 333 defines a closeable gap 341 with adjacent interior portions of the inner rim 331 to define a mechanical stop to limit relative movement of the inner and outer rims. Similarly to the embodiments described above, the outer rim 333 may have a diameter of at least 3.5 feet.

Similarly to the embodiments above, the outer ring 340 also includes weight-reduction openings 343 therein. The weight-reduction openings 343 each illustratively have a generally round or circular shape. The weight-reduction openings 343 may have another shape, such as oblong, hexagonal, and/or contoured for stress reduction, for example.

Gas springs 350 are operatively coupled between the inner rim 331 and the outer rim 333. Each gas spring 350 may be a double-acting gas spring, for example, and include a double-acting gas cylinder 351 and an associated piston 352. Of course, in some embodiments, each gas spring 350 may be a single-acting gas spring. More than one type of gas spring 350 may be used. The gas springs 350 may be air springs and/or nitrogen springs, for example. The gas springs 350 may include other gasses as well.

Illustratively, the gas springs 350 are arranged in pairs on opposite sides of the outer ring 340. More particularly, the gas springs 350 diverge outwardly from the inner rim 331 to the outer rim 333. A respective attachment bracket 353 for each gas spring 350 is coupled to the inner rim 331. Each attachment bracket 353 may include a generally U-shaped or V-shaped base bracket that receives an end of the piston 352 therein (e.g., between the arm of the U- or V-shaped bracket). A fastener fastens the end of the piston 352 of the gas spring 350 to the base bracket 353. A similar attachment bracket 353 is coupled to the outer rim 333 adjacent inboard and outboard surfaces. Accordingly, the gas springs 350 are pivotally coupled between the inner and outer rims 331, 333.

Similar to the embodiments described above, as will be appreciated by those skilled in the art, the gas springs 350 provide a gas suspension for relative movement between the inner rim 331 and the outer rim 333. The gas springs 350 have an operating stroke the permits the outer ring 340 to define a mechanical stop. In other words, the gas springs 350 maintain the outer rim 333 spaced apart from the inner rim 331. However, if pressure on any gas spring 350 causes the gas spring to reach its limit under load or the gas spring fails, the outer ring 340 may act as a mechanical stop to limit relative movement of the inner and outer rims 331, 333. In other words, the outer ring 340 and gas springs 350 may be considered as providing a run-flat capability. Since the gas springs 350 are similar to the gas springs described with respect to the embodiments above, further details of the gas springs need not be described.

Figure 33:
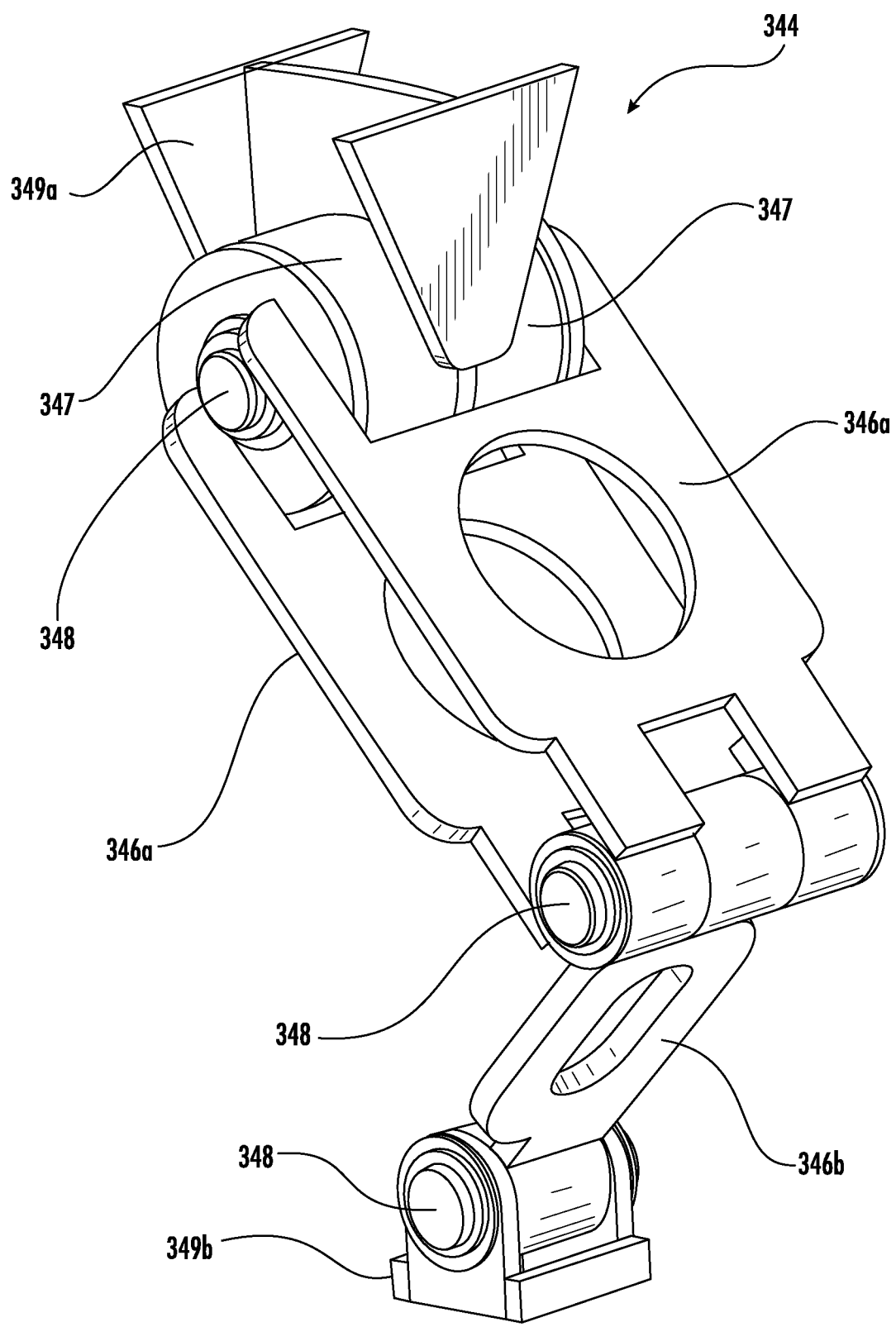
FIG. 33 is a perspective view of an inboard lateral stop of the wheel assembly of FIG. 32.

Referring additionally to FIG. 33, the wheel assembly 330 also includes inboard lateral stops 344 coupled between an inboard side of the outer rim 333 and an inboard side of the inner rim 331. More particularly, the inboard lateral stops 344 are illustratively in the form of hinge retainers or scissor hinges. Each inboard lateral stop 344 includes inboard hinge brackets 346a, 346b and inboard elastomeric bodies 347, for example, urethane bodies, carried by the hinge bracket adjacent the outer rim 333. More particularly, the inboard elastomeric bodies 347 couple to an outer lateral stop mounting bracket 349a that is coupled to the outer rim 333. The inboard hinge brackets 346a, 346b are coupled by way of a hinge pin 348. In some embodiments, an outer lateral stop mounting bracket 349a may not be used as the inboard elastomeric bodies 347 may couple, for example, directly, to the outer ring 340, for example, by way of a hinge pin 348. The hinge bracket 346b is coupled to the inner rim 331 by way of an inner lateral stop mounting bracket 349b coupled to the inner rim by a hinge pin 348 coupled to the inner lateral stop mounting bracket. In some embodiments, the hinge bracket 346b may couple to the inner rim 331 without an inner lateral stop mounting bracket 349b, for example, directly to the inner rim by way of a hinge pin 348.

The wheel assembly 330 also includes outboard lateral stops 345 coupled between an outboard side of the outer rim 333 and an outboard side of the inner rim 331. More particularly, the outboard lateral stops 345 are illustratively in the form of hinge retainers or scissor hinges that are similar to the inboard lateral stops 344. That is, each outboard lateral stop 345 includes outboard hinge brackets 346a, 346b and outboard elastomeric bodies 347, for example, urethane bodies, carried by the hinge bracket adjacent the outer rim 333. More particularly, the outboard elastomeric bodies 347 couple to an outer lateral stop mounting bracket 349a that is coupled to the outer rim 333. The hinge brackets 346a, 346b are coupled by way of a hinge pin 348. In some embodiments, an outer lateral stop mounting bracket 349a may not be used as the outboard elastomeric bodies 347 may couple, for example, directly, to the outer ring 340, for example, by way of a hinge pin 348. The hinge bracket 346b is coupled to the inner rim 331 by way of an inner lateral stop mounting bracket 349b coupled to the inner rim by a hinge pin 348 coupled to the inner lateral stop mounting bracket. In some embodiments, the hinge bracket 346b may couple to the inner rim 331 without an inner lateral stop mounting bracket 349b, for example, directly to the inner rim by way of a hinge pin 348.

Those skilled in the art will appreciate that the inboard and outboard lateral stops 344, 345, similarly to the lateral stops described with respect to the embodiments above, limit relative movement of the outer rim 333 (and thus the outer ring 340) and the inner rim 331. In other words, turning, for example, of the vehicle may cause lateral movement of the outer ring 340 relative to the inner rim 331. The inboard and outboard lateral stops 344, 345 may limit the amount of lateral movement of the outer ring 340 relative to the inner rim 331 to thereby maintain structural integrity of the wheel assembly 330. Of course, the inboard and outboard lateral stops 344, 345 may include other and/or additional components or elements that cooperate to limit relative lateral movement of the outer ring 340 and the outer inner rim 331.

Other elements illustrated, such as, for example, fastener receiving passageways 324 within inwardly extending flange ring 325, the tread assemblies 370, and the clamping arrangement 373 including the inboard clamping members 374 and fasteners 379*a*, are similar to corresponding elements described with respect to the embodiments described above. Accordingly, these elements as they relate to the present embodiments need no further discussion.

A method aspect is directed to method of making a wheel assembly 330 to be coupled to a hub of a vehicle. The method includes operatively coupling a plurality of gas springs 350 between an inner rim 331 to be coupled to the hub of the vehicle and an outer rim 333 surrounding the hub to provide a gas suspension for relative movement between the inner rim and the outer rim. The method may also include coupling an outer ring 340 to the outer rim 333 that defines a closeable gap 341 with adjacent interior portions of the inner rim to define a mechanical stop to limit relative movement of the inner rim and outer rim.

Figure 34:
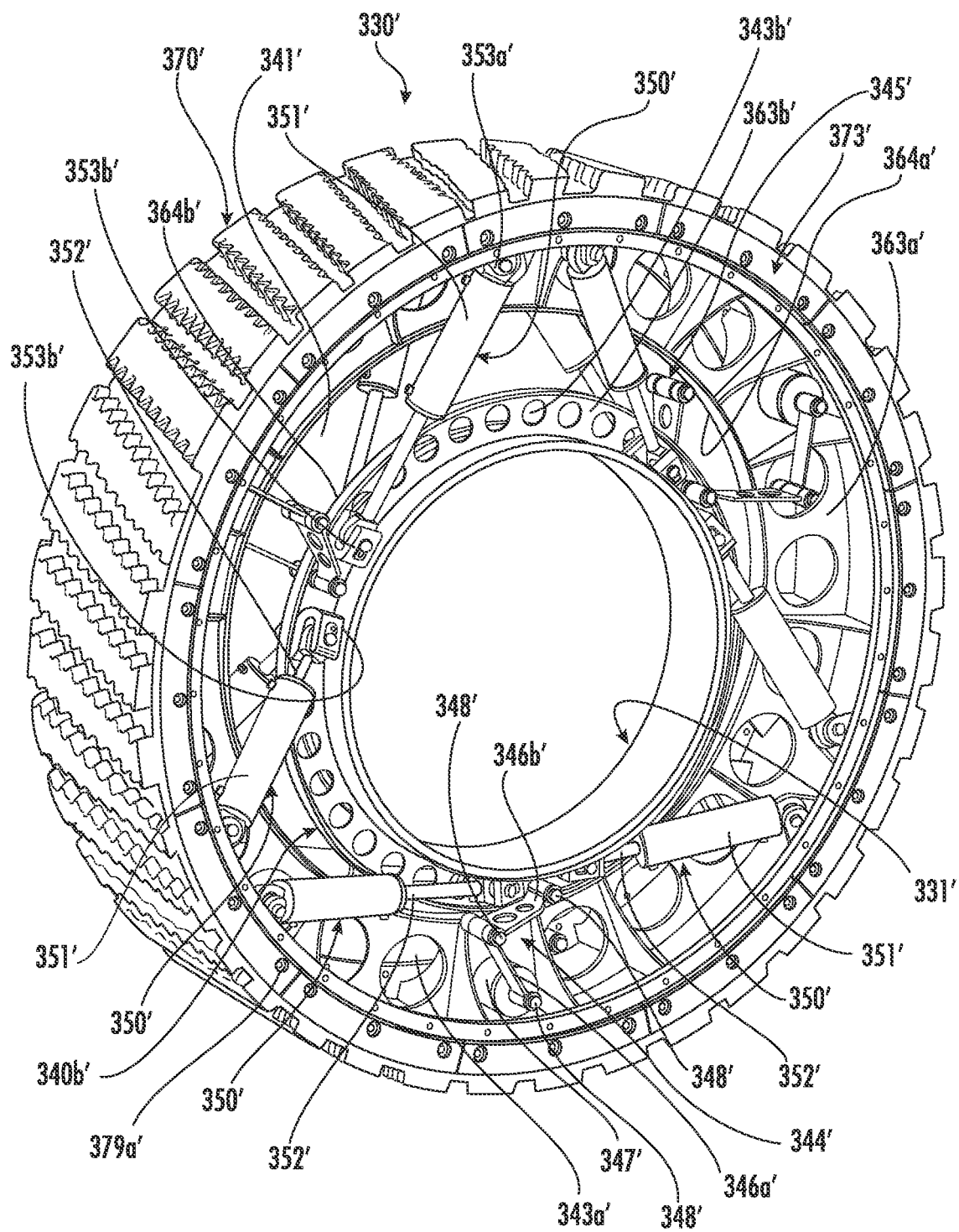
FIG. 34 is a perspective view of a wheel assembly according to another embodiment.
Figure 35:
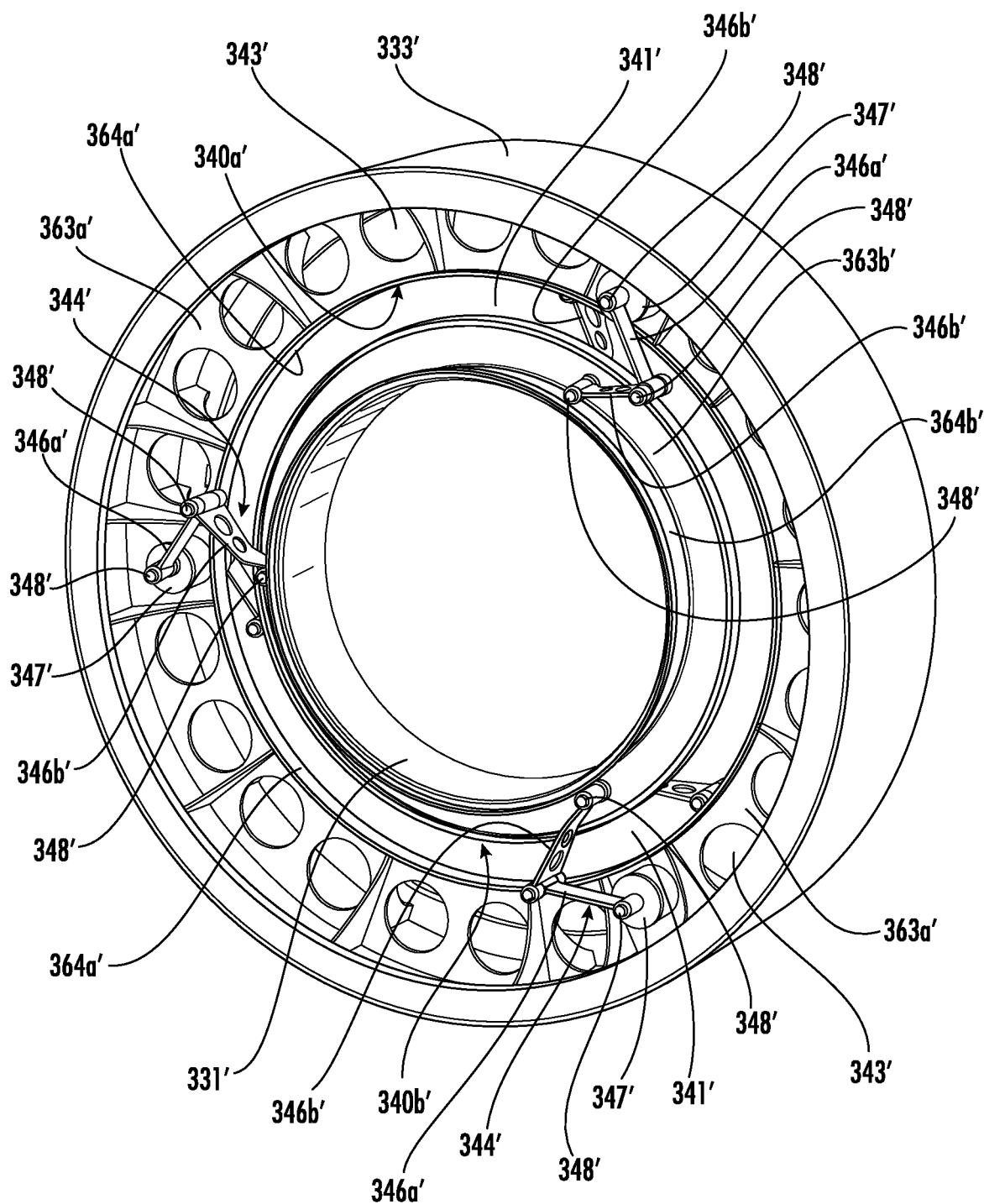
FIG. 35 is a perspective view of a portion of the wheel assembly of FIG. 34 and without weight-reduction openings in the inner ring.

Referring now to FIGS. 34-35, in another embodiment of the wheel assembly 330', an outer ring 340*a'* is coupled to the outer rim 333' and an inner ring 340*b'* is coupled to the inner rim 331'. The inner ring 340*b'* defines a closeable gap 341' with adjacent portions of the outer ring 340*a'* to define a mechanical stop to limit relative movement of the inner and outer rims 331', 333'. Similarly to the embodiments described above, the outer rim 333' may have a diameter of at least 3.5 feet.

The outer ring 340*a'* has an outer ring body 363*a'* and an outer ring edge cap 364*a'* carried by an inner edge of the outer ring body. The inner ring 340*b'* also includes an inner ring body 363*b'* and an inner ring edge cap 364*b'* carried by an outer edge of the inner ring body. The inner and outer ring edge caps 364*a'*, 364*b'* provide an increased surface area mechanical stop to limit the relative movement of the inner and outer rims 331', 333'.

Similarly to the embodiments above, the outer ring 340*a'* also includes weight-reduction openings 343*a'* therein. The inner ring 340*b'* also includes weight-reduction openings 343*b'* therein. The weight-reduction openings 343*a'*, 343*b'* each illustratively have a generally round or circular shape. The weight-reduction openings 343*a'*, 343*b'* may have another shape, such as oblong, hexagonal, and/or contoured for stress reduction, for example.

Gas springs 350' are operatively coupled between the inner rim 331' and the outer rim 333'. Each gas spring 350' may be a double-acting gas spring, for example, and include a double-acting gas cylinder 351' and an associated piston 352'. Of course, in some embodiments, each gas spring 350' may be a single-acting gas spring. More than one type of gas spring 350' may be used. The gas springs 350' may be air springs and/or nitrogen springs, for example. The gas springs 350' may include other gasses as well.

Illustratively, the gas springs 350' are arranged in pairs on opposite sides of the outer ring 340*af*. More particularly, the gas springs 350' diverge outwardly from the inner rim 331' to the outer rim 333'. A respective attachment bracket 353' for each gas spring 350' is coupled to the inner ring 340*b'*, and more particularly, the inner ring body 363*b'*. Each attachment bracket 353' may include a generally U-shaped or V-shaped base bracket that receives an end of the piston 352' therein (e.g., between the arm of the U- or V-shaped bracket). A fastener fastens the end of the piston 352' of the gas spring 350' to the base bracket. A similar attachment bracket 353' is coupled to the outer rim 333' adjacent inboard and outboard surfaces. Accordingly, the gas springs 350' are pivotally coupled between the inner and outer rims 331', 333'.

Similar to the embodiments described above, as will be appreciated by those skilled in the art, the gas springs 350' provide a gas suspension for relative movement between the inner rim 331' and the outer rim 333'. The gas springs 350' have an operating stroke the permits the outer ring 340*a'* to define a mechanical stop. In other words, the gas springs 350' maintain the outer rim 333' spaced apart from the inner rim 331'. However, if pressure on any gas spring 350' causes the gas spring to reach its limit under load or the gas spring fails, the outer ring 340*a'* may act as a mechanical stop to limit relative movement of the inner and outer rims 331', 333'. In other words, the outer ring 340*a'* and gas springs 350' may be considered as providing a run-flat capability. Since the gas springs 350' are similar to the gas springs described with respect to the embodiments above, further details of the gas springs need not be described.

Figure 37:
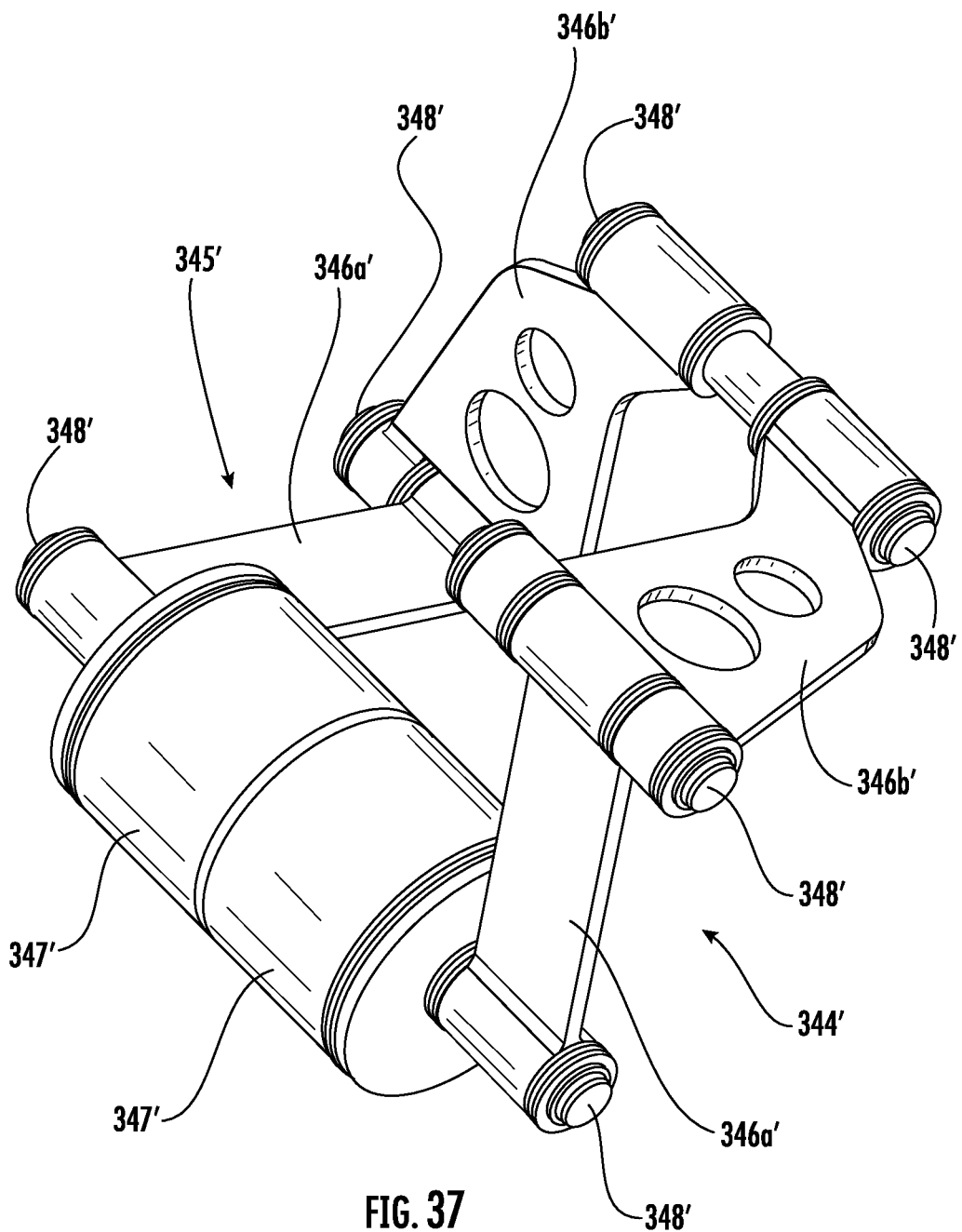
FIG. 37 is a perspective view of inboard and outboard lateral stops of the wheel assembly of FIG. 34.

Referring additionally to FIG. 37, the wheel assembly 330' also includes inboard lateral stops 344' carried between an inboard side of the outer rim 333' and an inboard side of the inner rim 331'. More particularly, the inboard lateral stops 344' are illustratively in the form of hinge retainers or scissor hinges. Each inboard lateral stop 344' includes inboard hinge brackets 346*a'*, 346*b'* and an inboard elastomeric body 347', for example, a urethane body, carried by the hinge bracket adjacent an inboard side of the outer ring 340*a'*. The inboard elastomeric body 347' couples to a wall portion of outer ring 340*a'* by way of a hinge pin 348'. The hinge brackets 346*a'*, 346*b'* are coupled together by way of a hinge pin 348'. The hinge bracket 346*b'* is coupled to a wall portion of the inner ring 340*b'* by way of a hinge pin 348'.

The wheel assembly 330' also includes outboard lateral stops 345' carried between an outboard side of the outer rim 333' and an outboard side of the inner rim 331'. More particularly, the outboard lateral stops 345' are illustratively in the form of hinge retainers or scissor hinges. Each outboard lateral stop 345' includes outboard hinge brackets 346*a'*, 346*b'* and an outboard elastomeric body 347', for example, a urethane body, carried by the hinge bracket adjacent an outboard side of the outer ring 340*a'*. The outboard elastomeric body 347' couples to a wall portion of outer ring 340*a'* opposite a corresponding portion of the inboard lateral stop 344' by way of a hinge pin 348', which may be shared with the hinge pin of the inboard lateral stop. The hinge brackets 346*a'*, 346*b'* are coupled by way of a hinge pin 348'. The hinge bracket 346*b'* is coupled to a wall portion of the inner ring 340*b'* opposite the corresponding portion of the inboard lateral stop 344' by way of a hinge pin 348', which may be shared with the hinge pin of the inboard lateral stop. As will be appreciated by those skilled in the art, the inboard lateral stops 344' are structurally similar to the outboard lateral stops 345', just positioned opposite (i.e., on the inboard side) to the outboard lateral stops.

Those skilled in the art will appreciate that the inboard and outboard lateral stops 344', 345' limit relative movement of the outer ring 340a' and the inner ring 340b'. In other words, turning, for example, of the vehicle may cause lateral movement of the outer ring 340a' relative to the inner ring 340b'. The inboard and outboard lateral stops 344', 345' may limit the amount of lateral movement of the outer ring 340a' relative to the inner ring 340b' to thereby maintain structural integrity of the wheel assembly 330'. Of course, the inboard and outboard lateral stops 344', 345' may include other and/or additional components or elements that cooperate to limit relative lateral movement of the outer ring 340a' and the outer inner rim 331'.

Other elements illustrated, such as, for example, the tread assemblies 370' and the clamping arrangement 373' including the inboard clamping members 374' and fasteners 379a', are similar to corresponding elements described with respect to the embodiments described above. Accordingly, these elements as they relate to the present embodiments need no further discussion.

A method aspect is directed to a method of making a wheel assembly 330' to be coupled to a hub of a vehicle. The method includes operatively coupling a plurality of gas springs 350' between an inner rim 331' to be coupled to the hub of the vehicle and an outer rim 333' surrounding the hub to provide a gas suspension for relative movement between the inner rim and the outer rim. The method also includes coupling an outer ring 340a' to the outer rim 333' and coupling an inner ring 340b' to the inner rim 331' that defines a closeable gap 341' with adjacent interior portions of the outer ring to define a mechanical stop to limit relative movement of the inner rim and outer rim.

Figure 38:
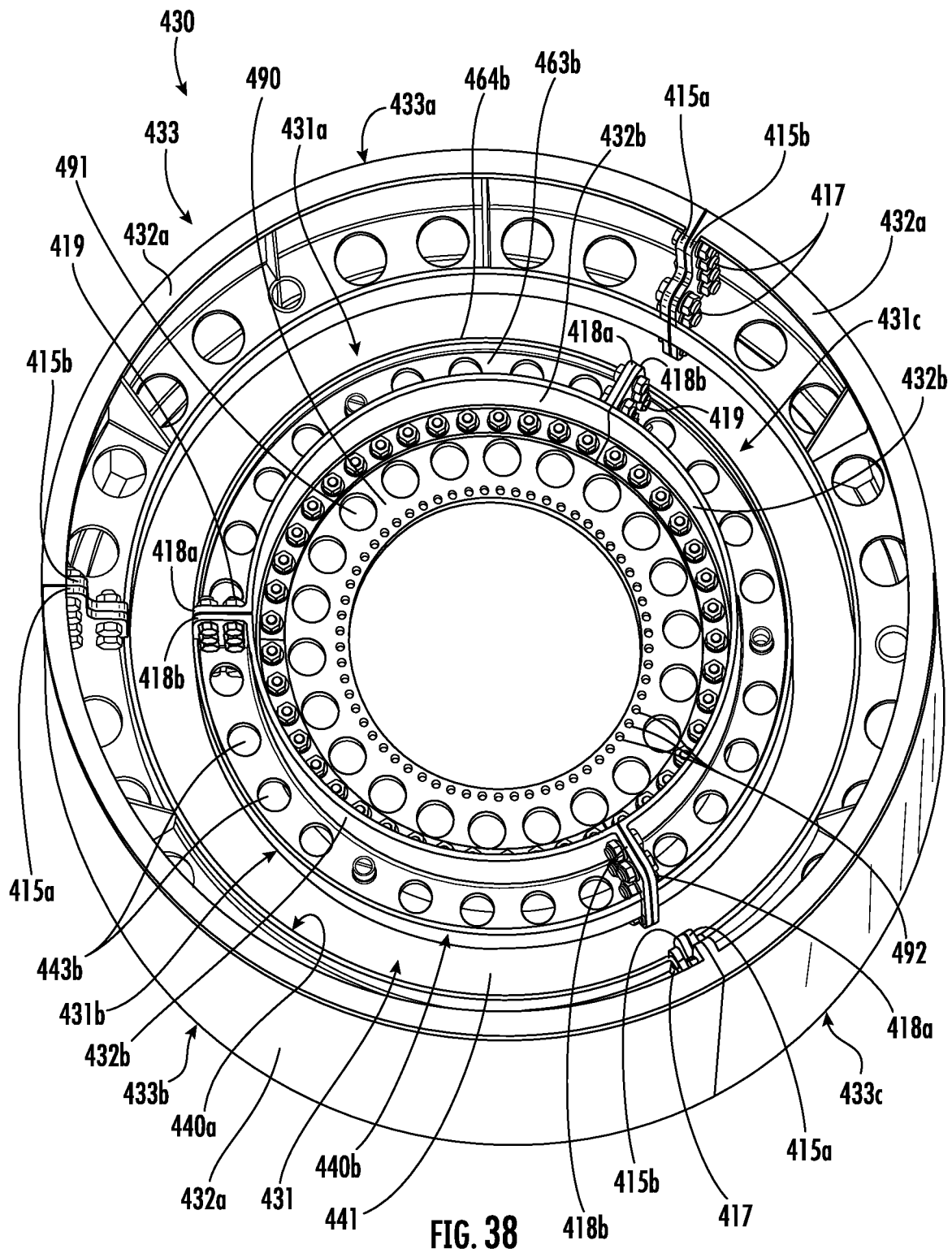
FIG. 38 is a perspective view of a portion of wheel assembly in accordance with an embodiment.
Figure 39:
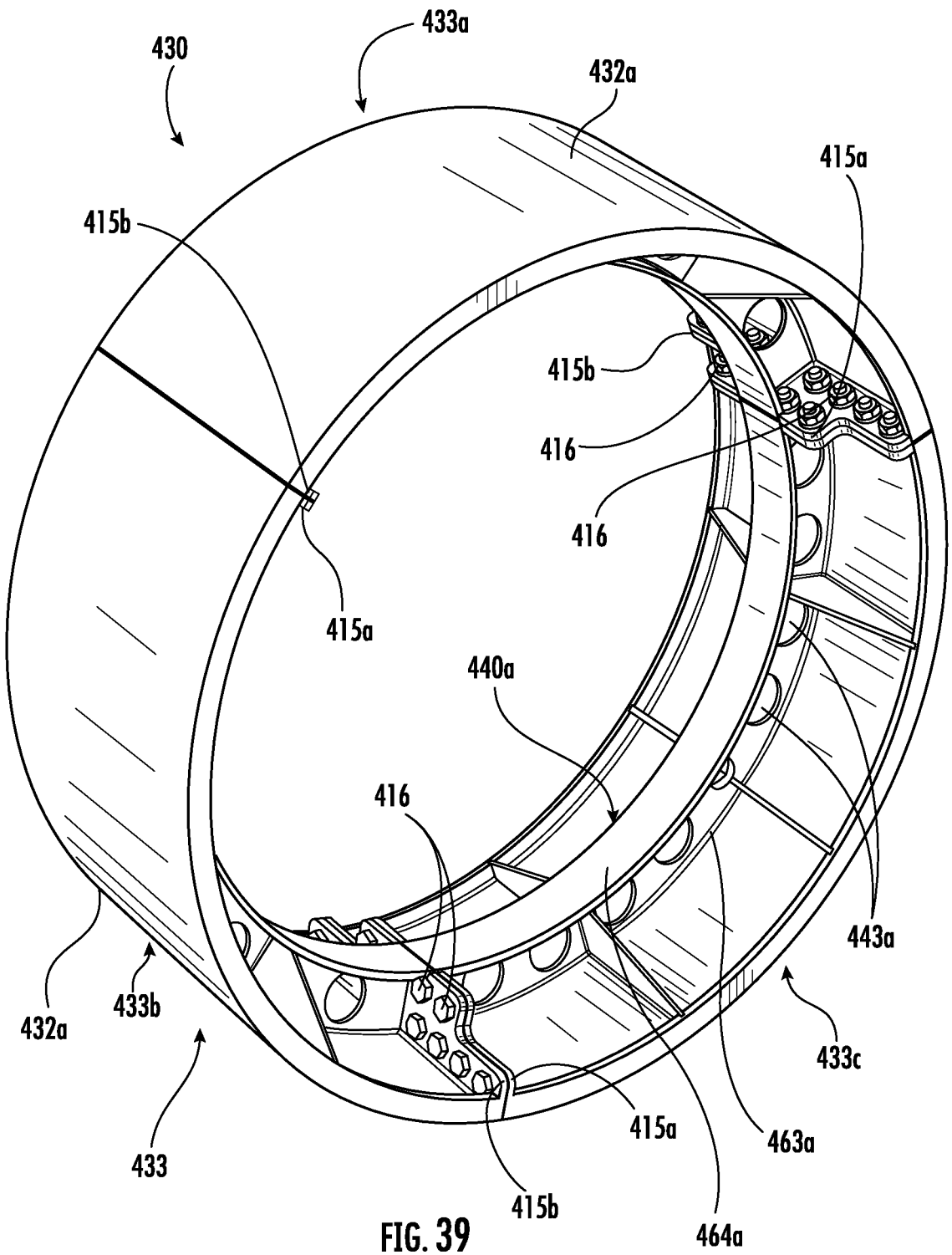
FIG. 39 is a perspective view of a portion of the wheel assembly of FIG. 38.
Figure 40:
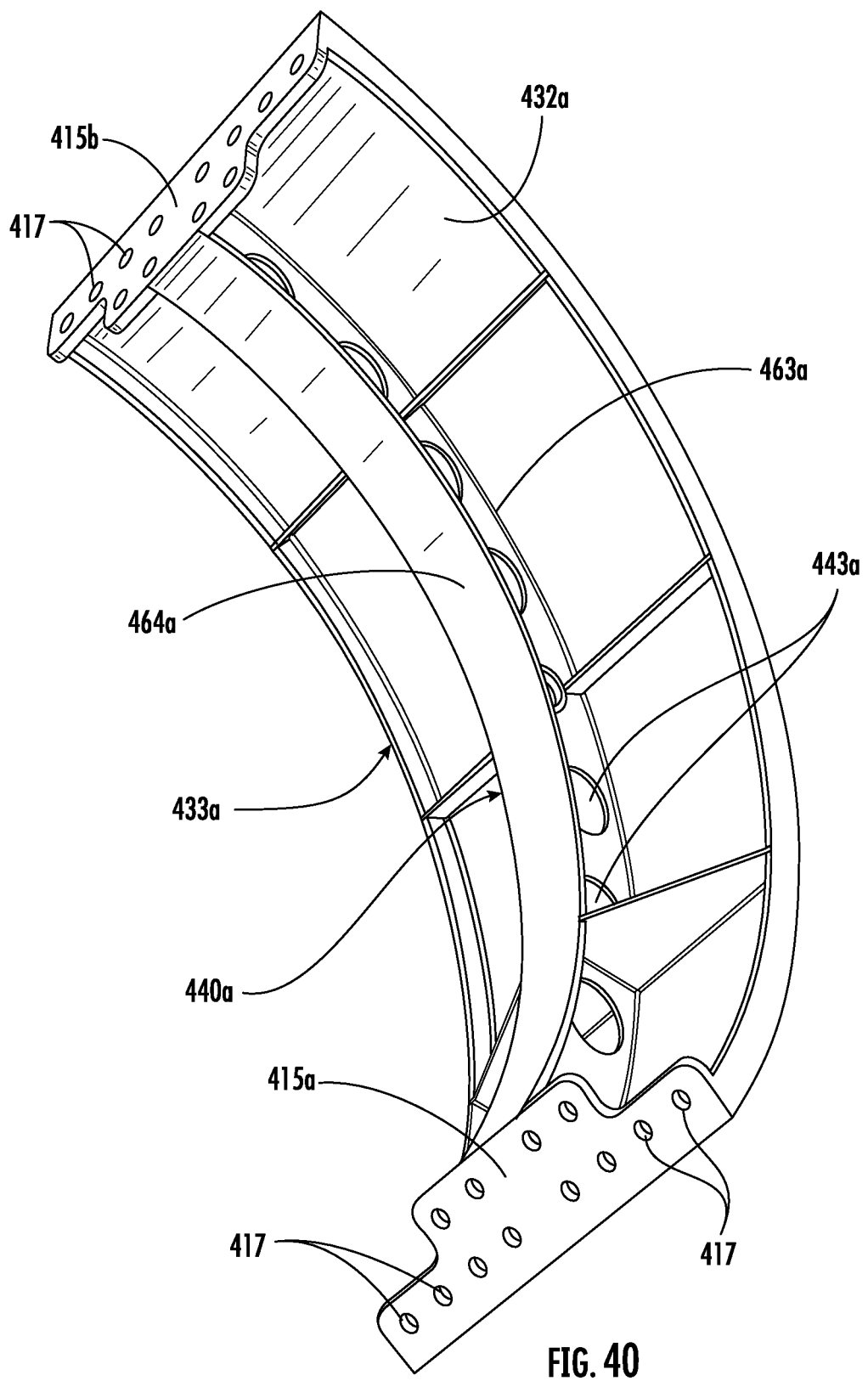
FIG. 40 is a perspective view of another portion of the wheel assembly of the FIG. 38.
Figure 41:
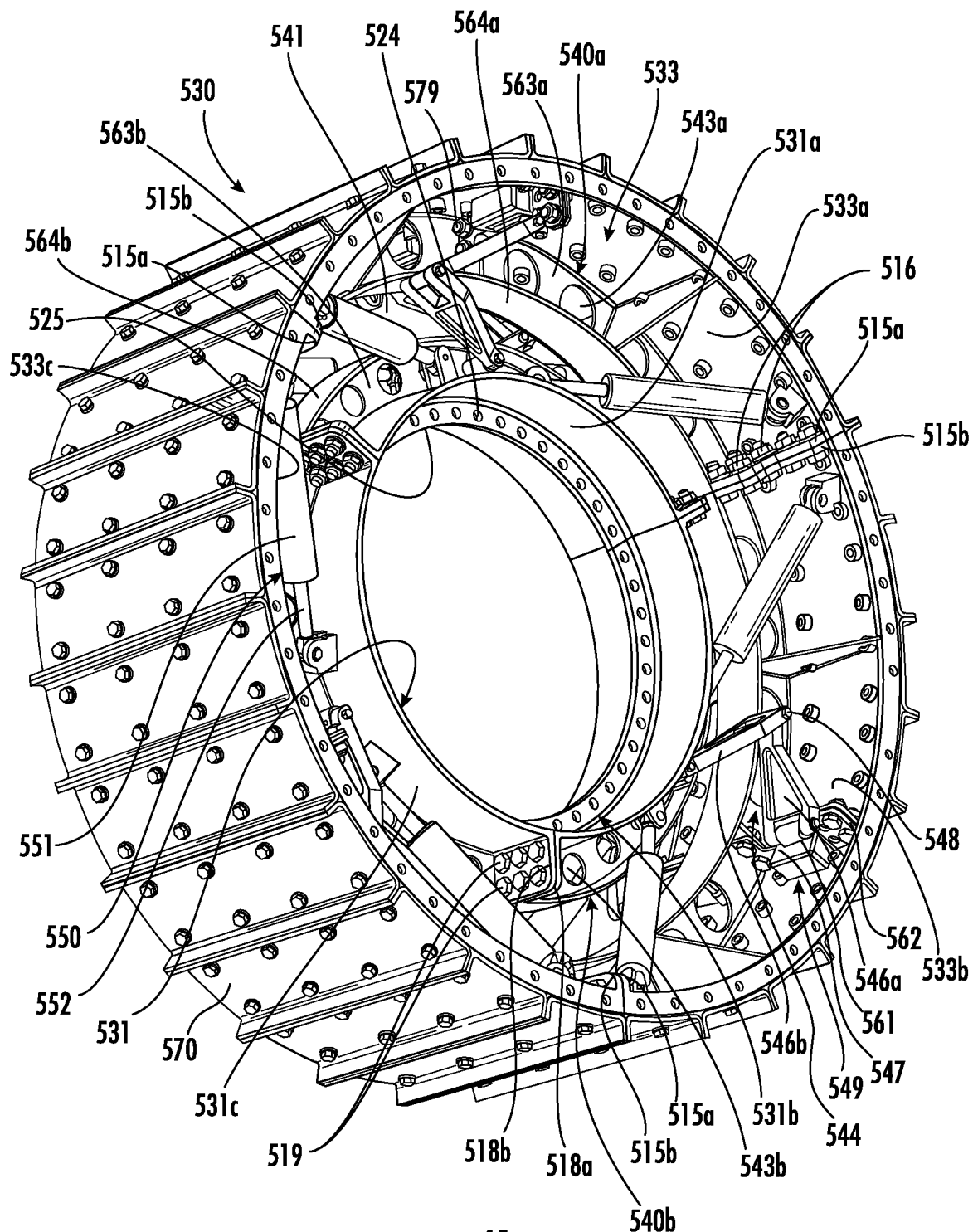
FIG. 41 is a perspective view of a wheel assembly according to an embodiment.
Figure 42:
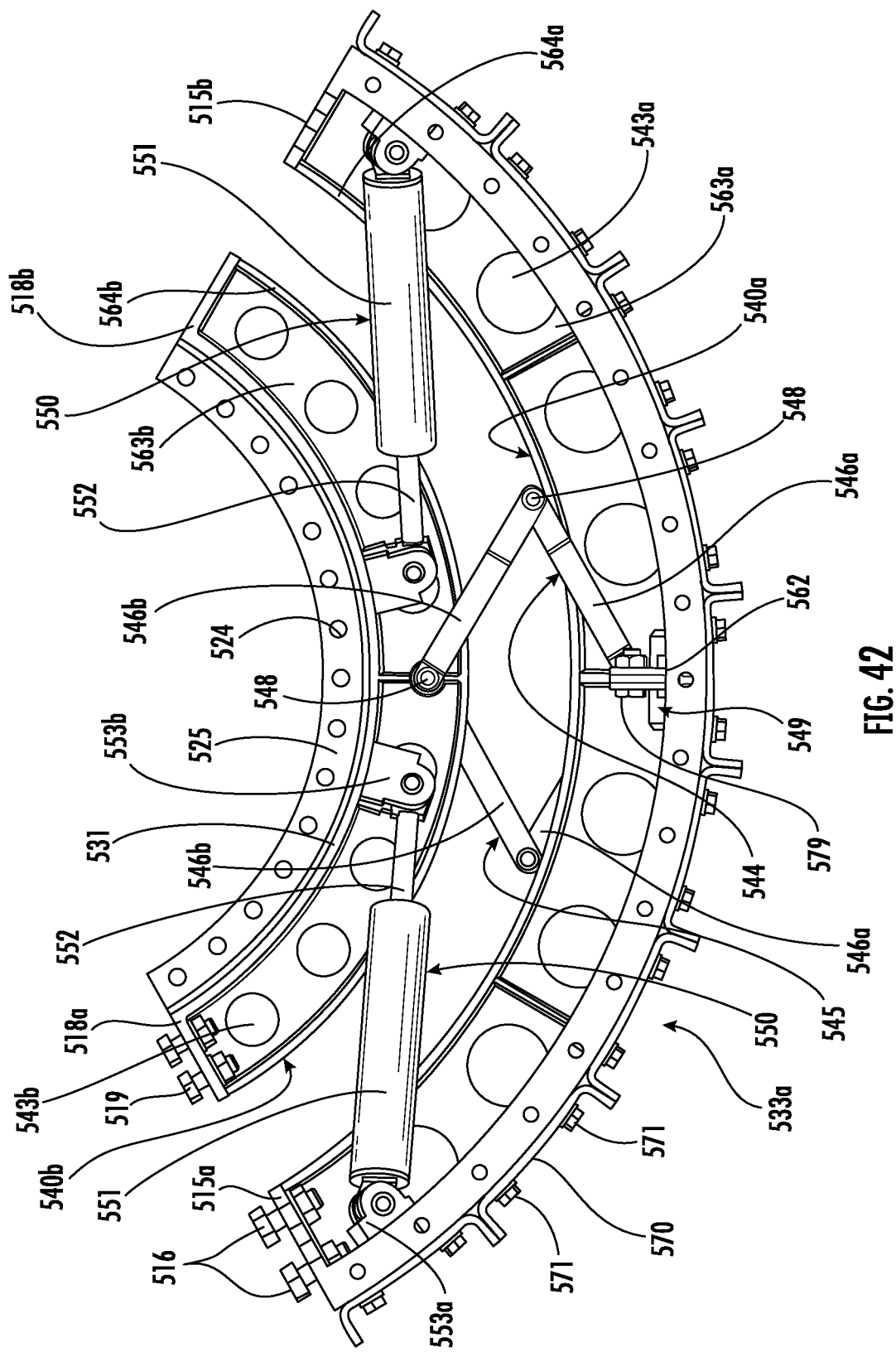
FIG. 42 is a side view of a portion of the wheel assembly of FIG. 41.
Figure 43:
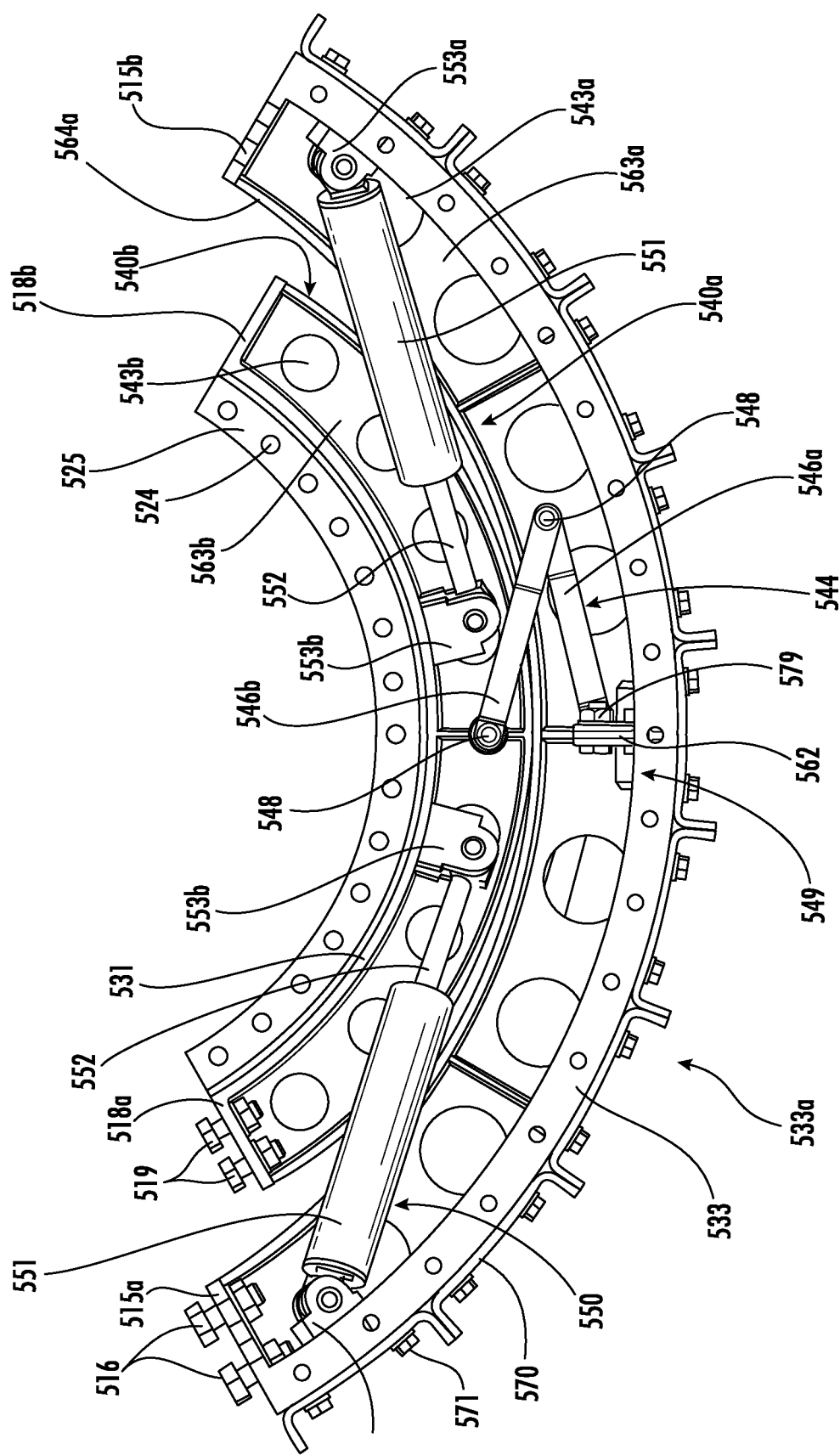
FIG. 43 is another side view of a portion of the wheel assembly of FIG. 41.
Figure 44:
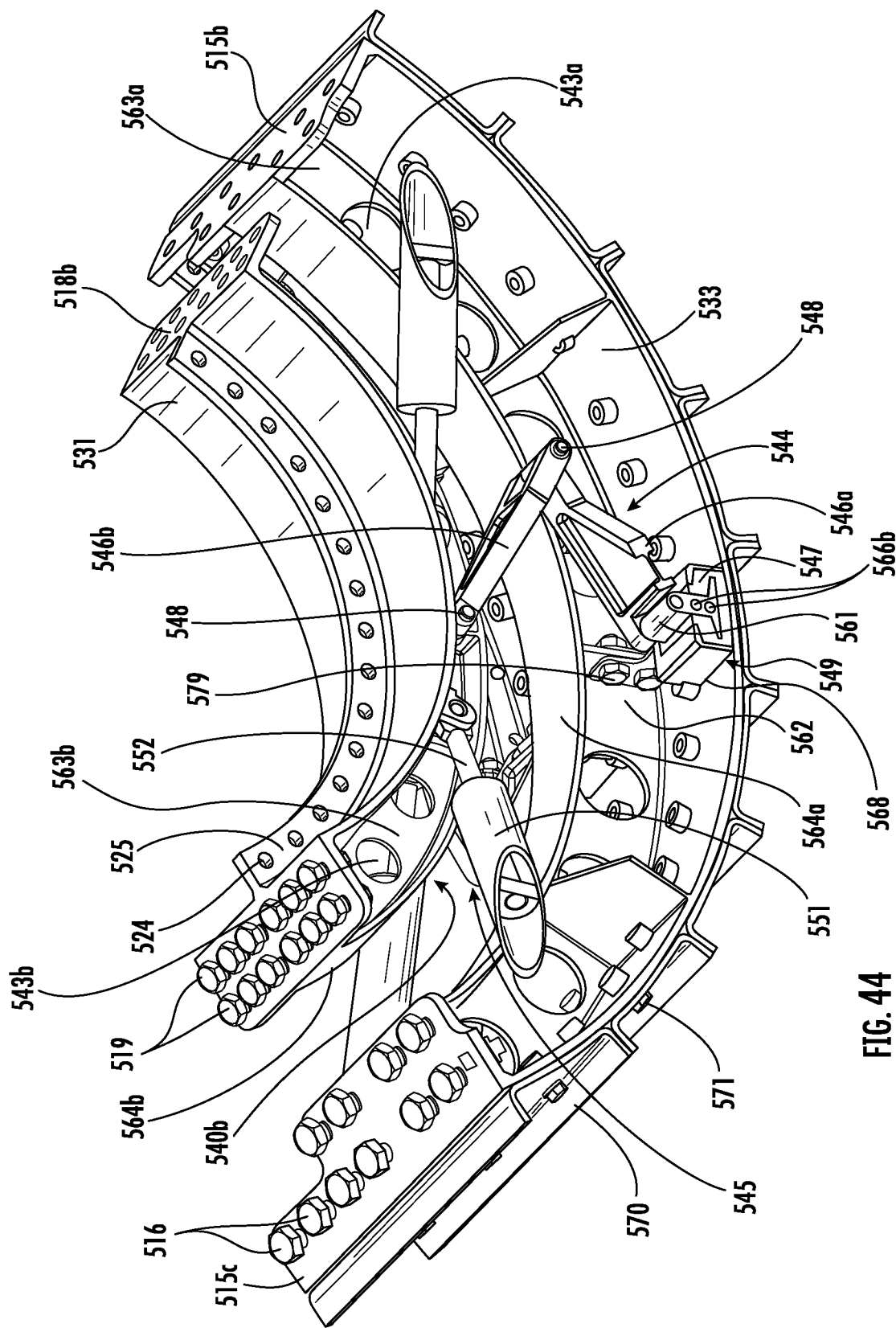
FIG. 44 is a perspective view of a portion of the wheel assembly of FIG. 41.
Figure 45:
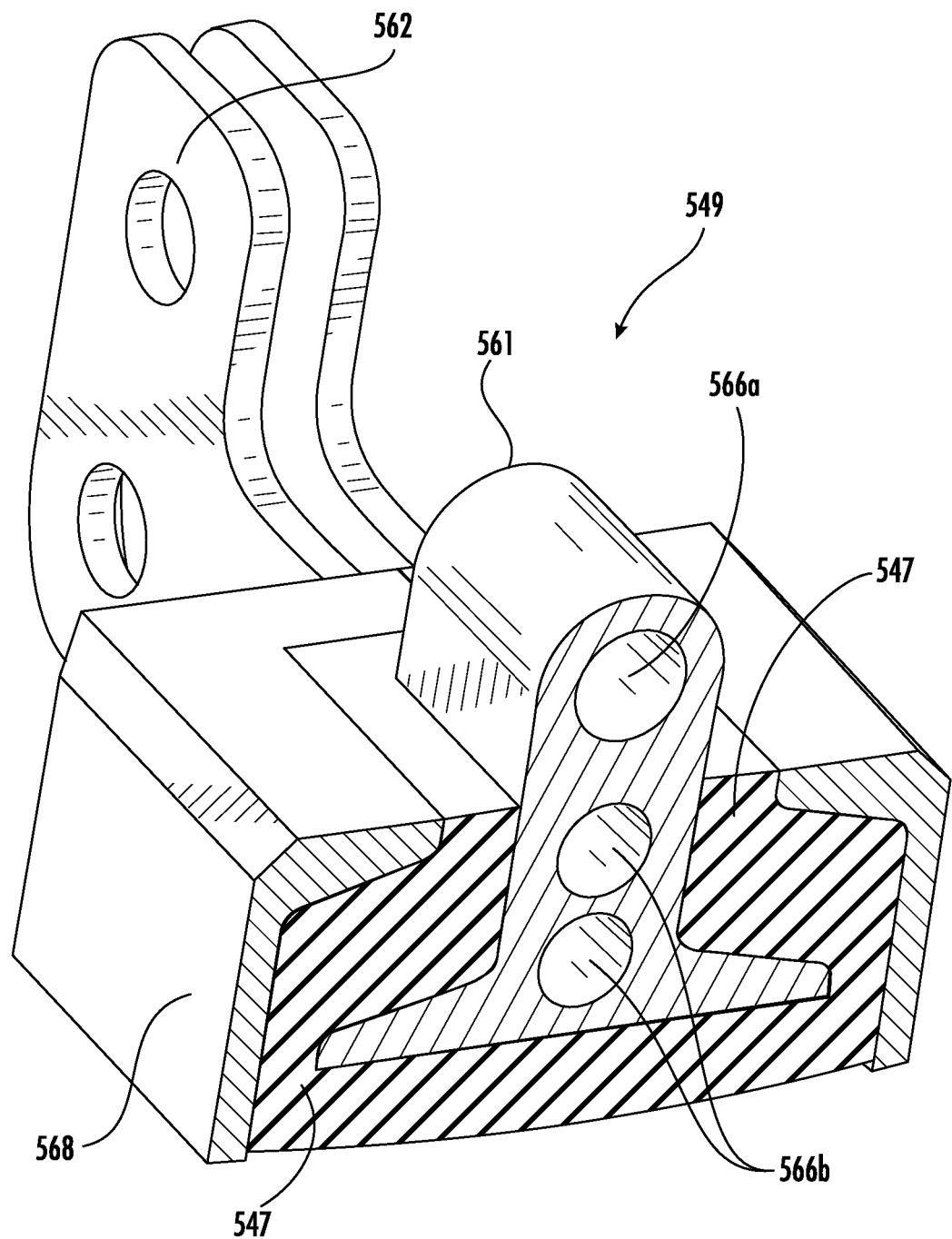
FIG. 45 is an enlarged cross-sectional view of a portion of a lateral stop of the wheel assembly of FIG. 41.
Figure 46:
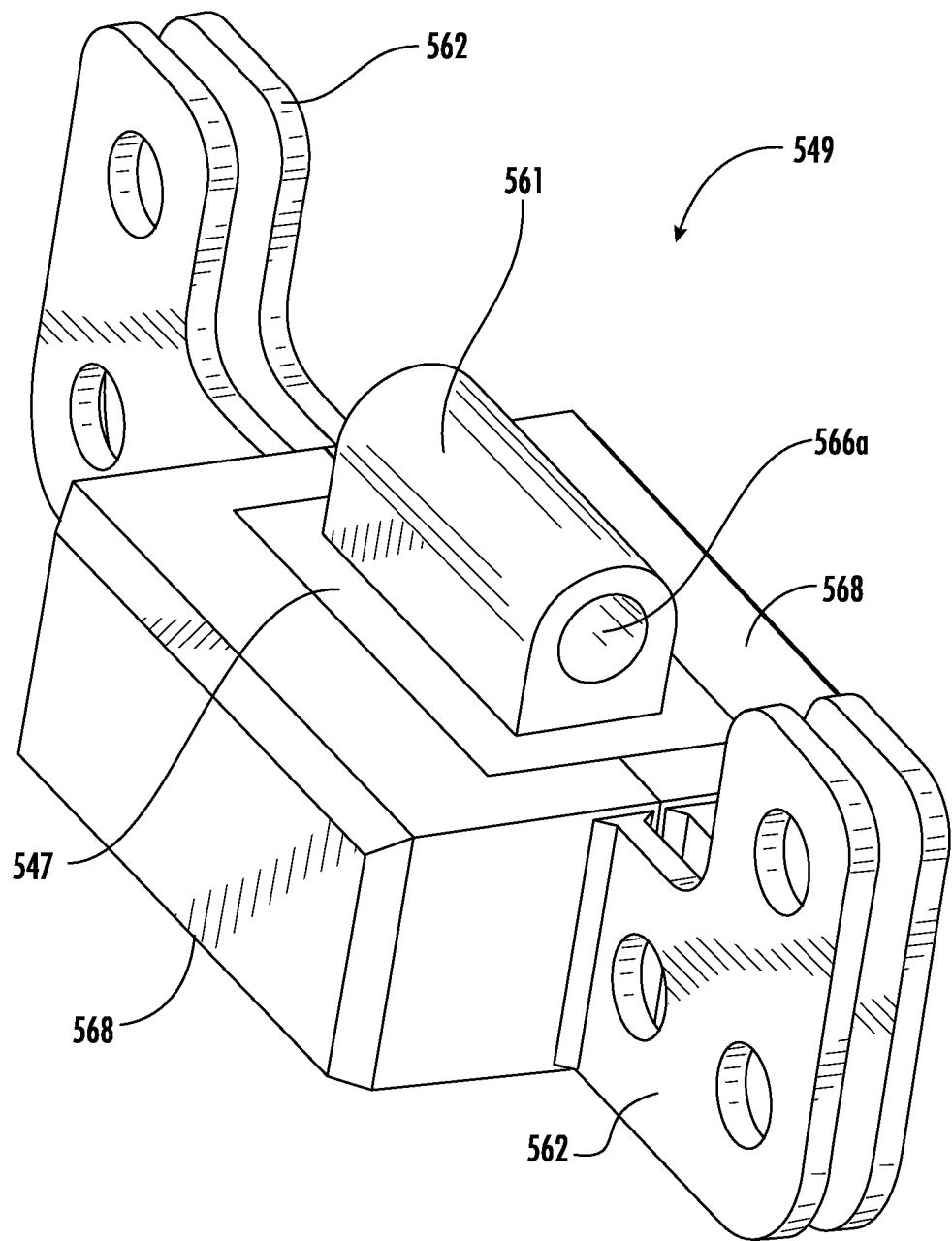
FIG. 46 is an enlarged perspective view of another portion of the lateral stop of the wheel assembly of FIG. 41.
Figure 47:
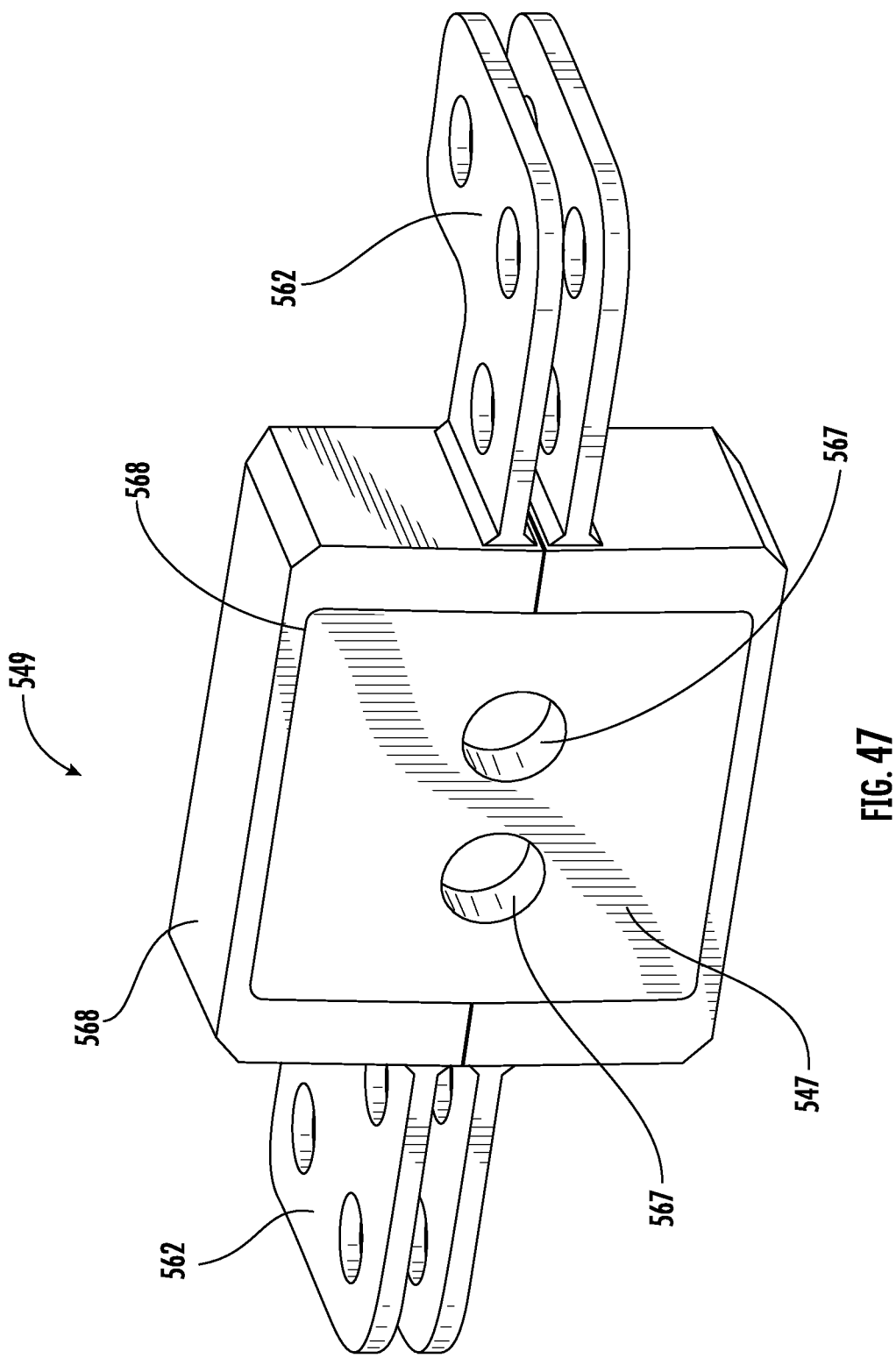
FIG. 47 is a bottom perspective view of the lateral stop of FIG. 46.
Figure 48:
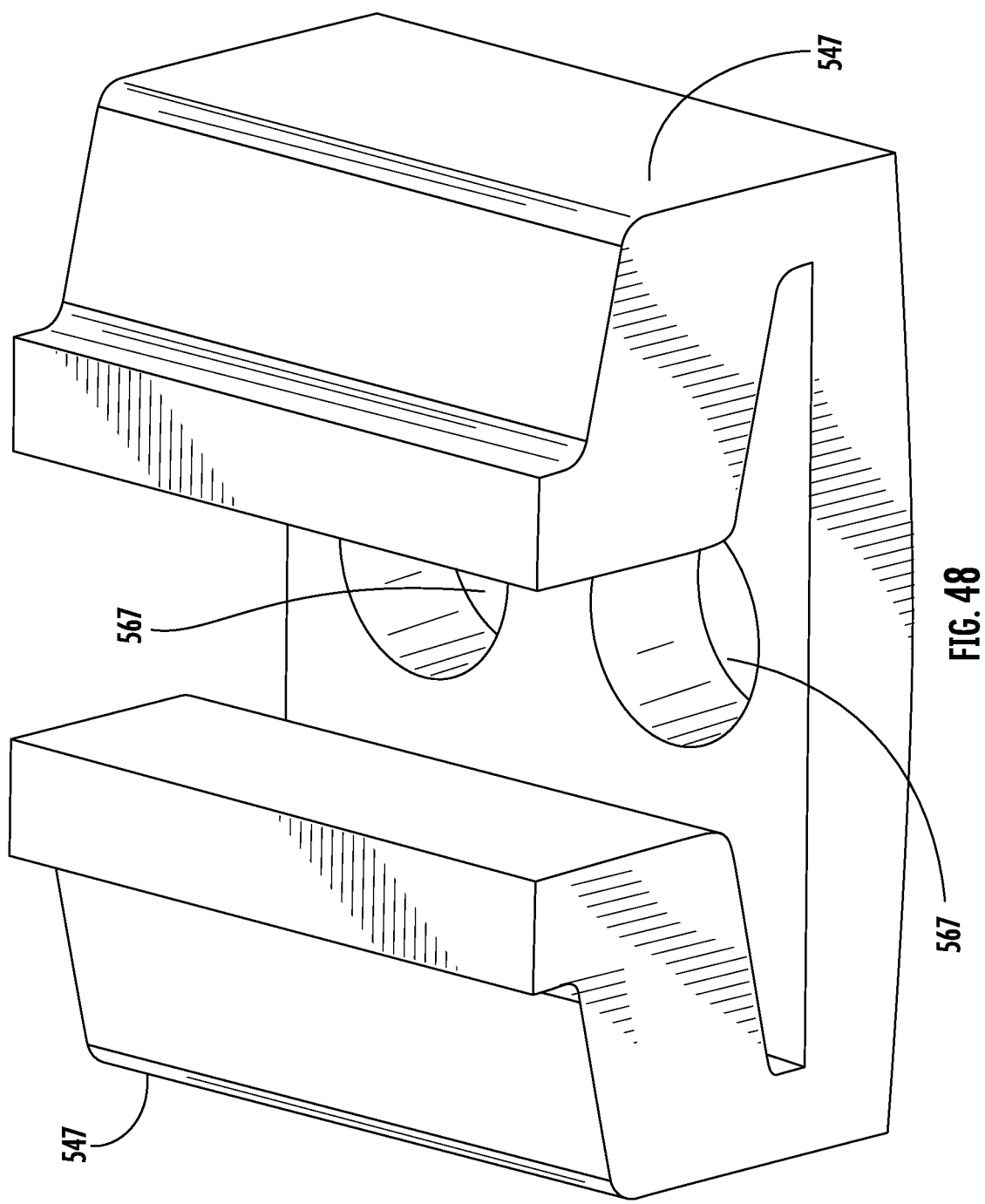
FIG. 48 is a top perspective view of a portion of the elastomeric body of the lateral stop of the wheel assembly of FIG. 41.
Figure 49:
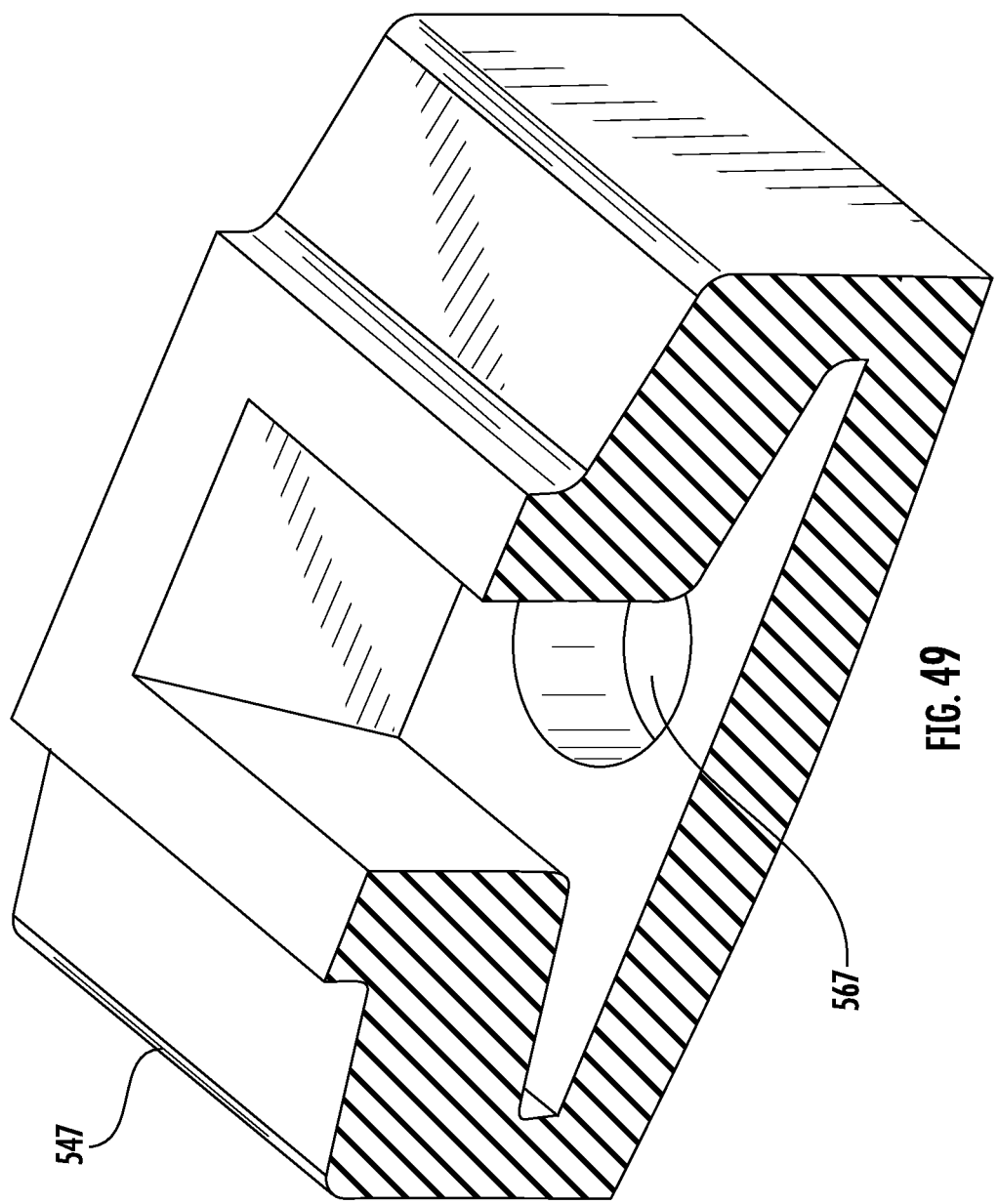
FIG. 49 is a top perspective view of another portion of the elastomeric body of the lateral stop of wheel assembly of FIG. 41.
Figure 50:
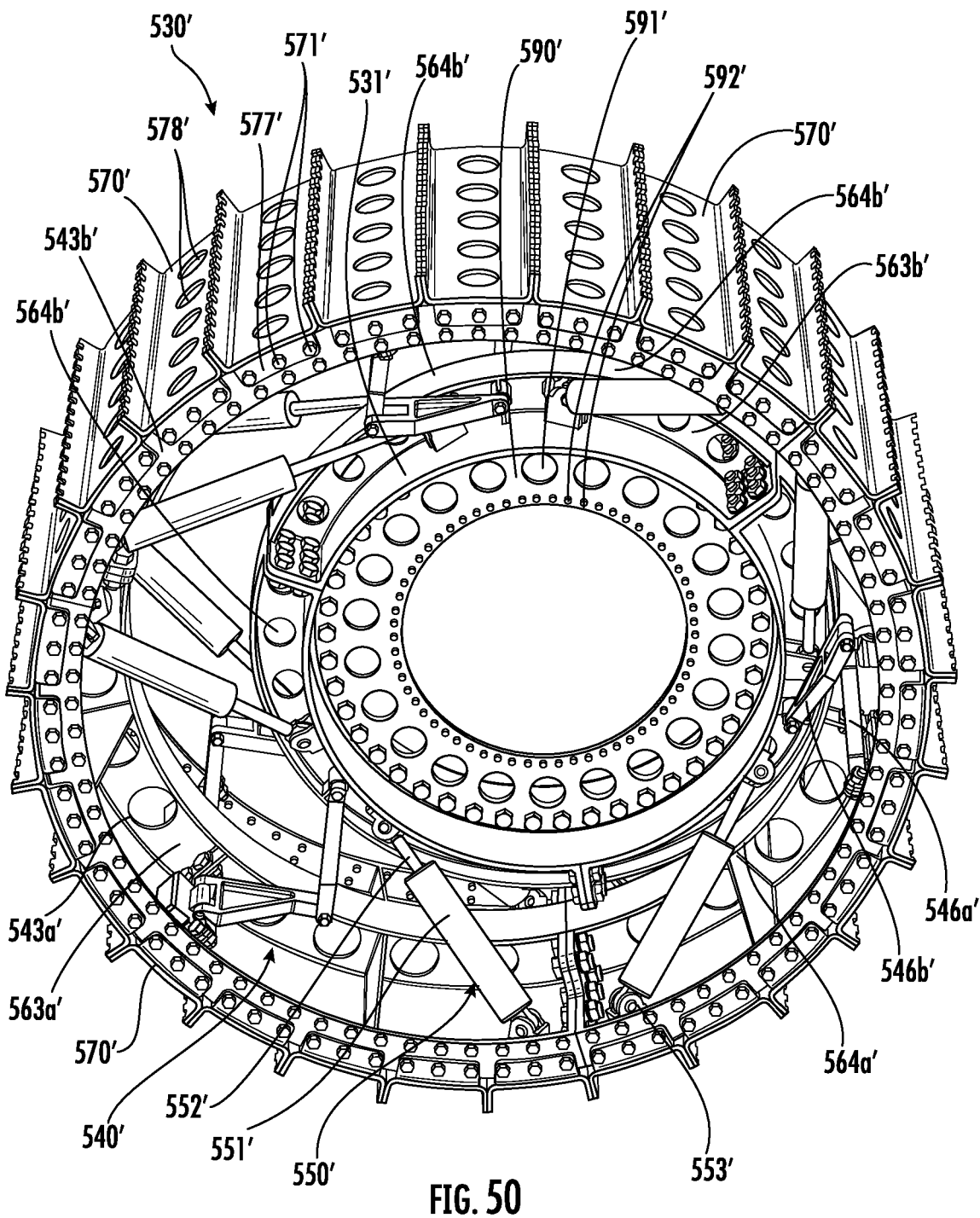
FIG. 50 is a perspective view of a wheel assembly according to another embodiment.
Figure 51:
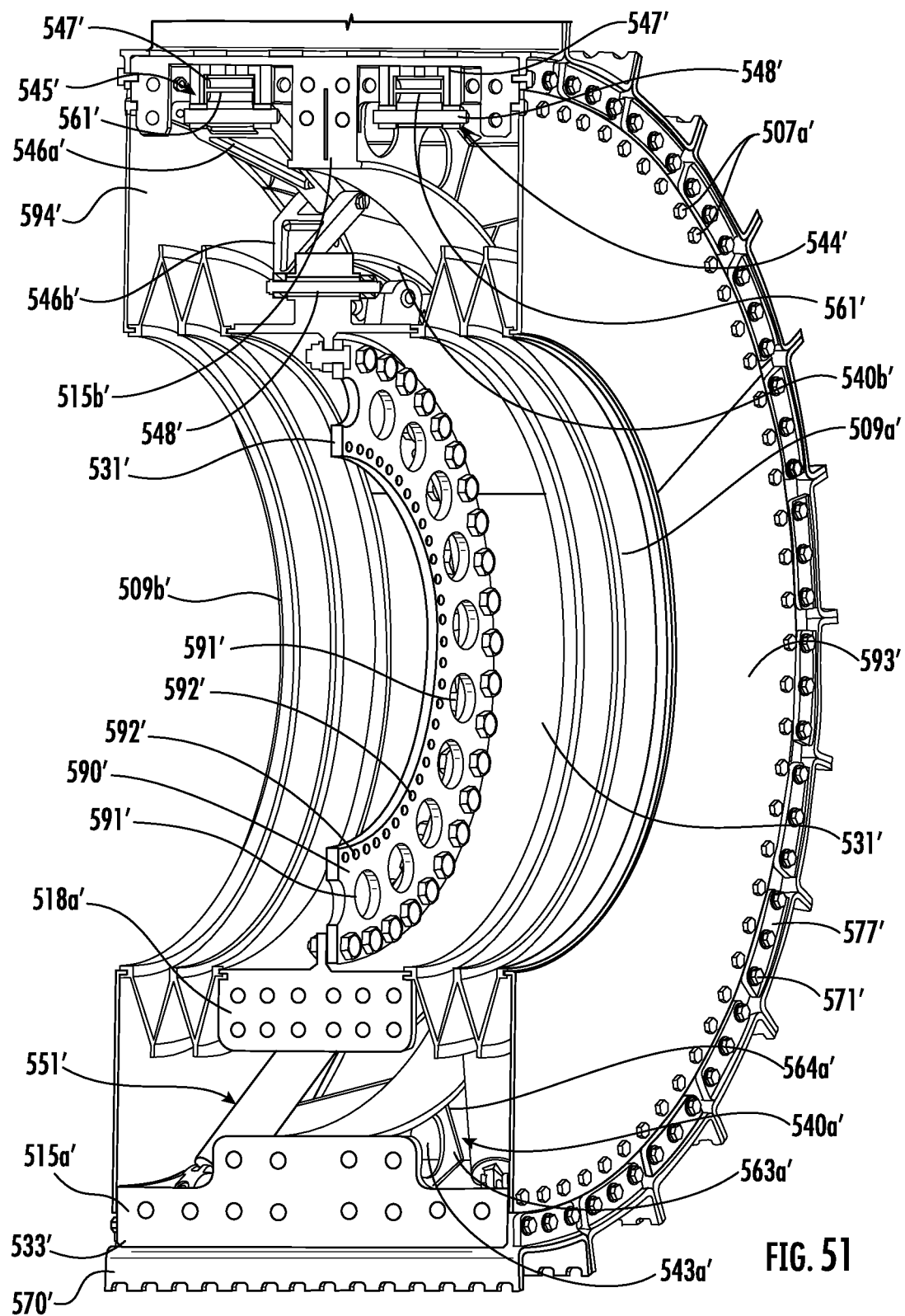
FIG. 51 is a cross-sectional view of a portion of the wheel assembly of FIG. 50 including flexible seals in accordance with an embodiment.
Figure 52:
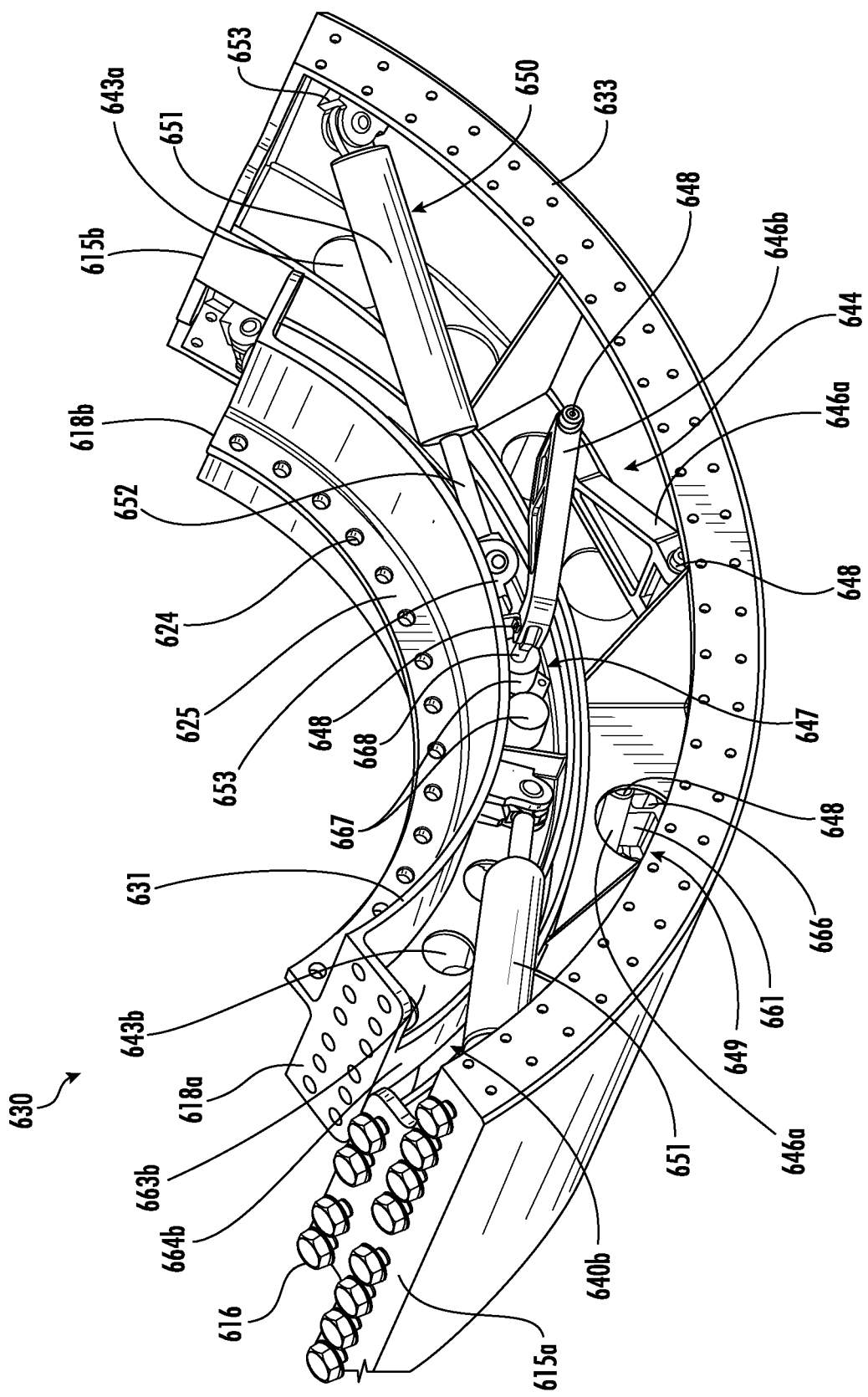
FIG. 52 is a perspective view of a wheel assembly in accordance with another embodiment.
Figure 53:
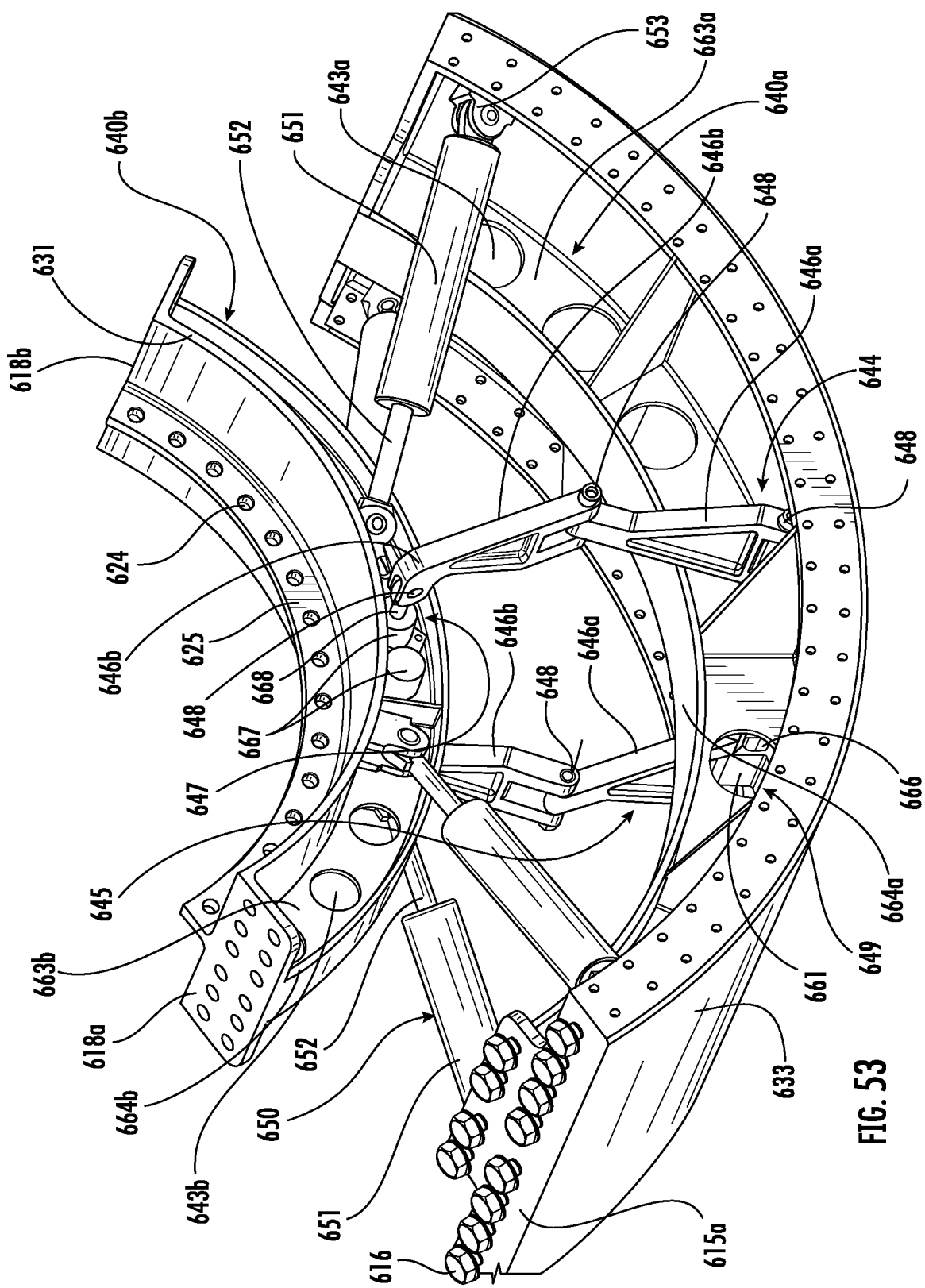
FIG. 53 is another perspective view of the wheel assembly of FIG. 52.
Figure 54:
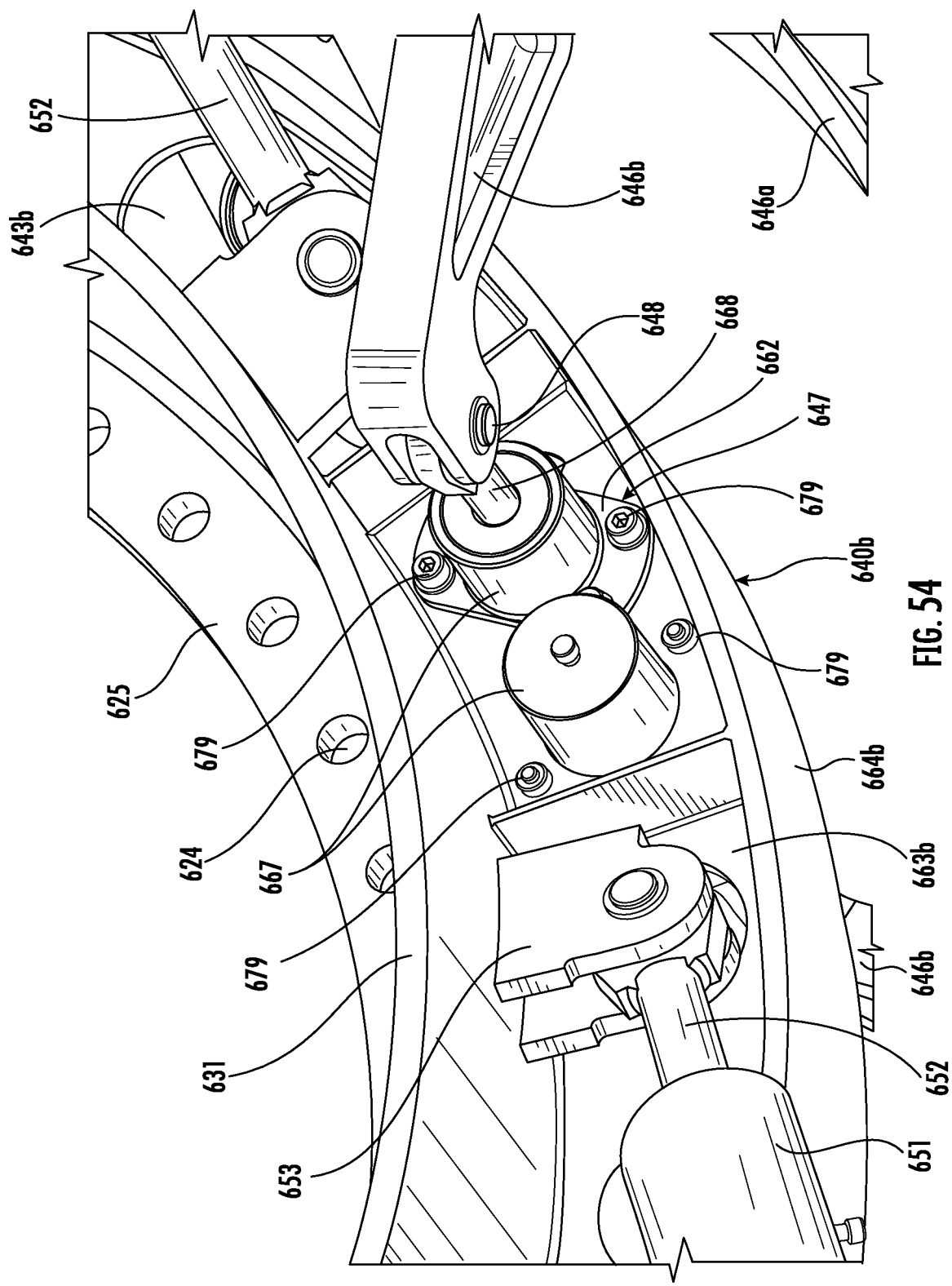
FIG. 54 is an enlarged perspective view of a portion of the wheel assembly of FIG. 52.
Figure 55:
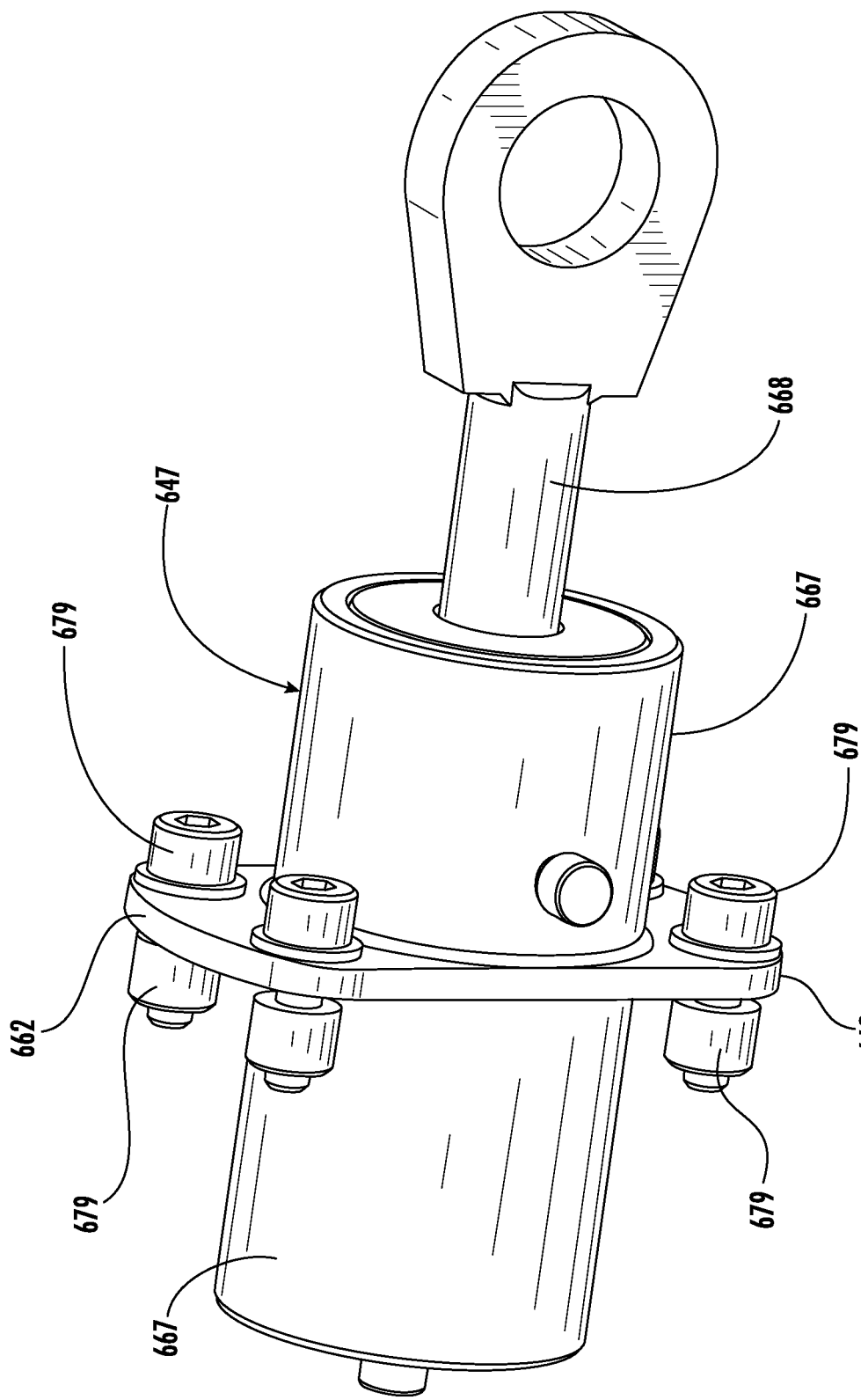
FIG. 55 is a perspective view of a gas cylinder of a lateral stop of the wheel assembly of FIG. 52.

Referring now to FIGS. 38-40, in another embodiment, the wheel assembly 430 is segmented to facilitate shipping, and to permit maintenance of individual segments. More particularly, the wheel assembly 430 includes a segmented circular shaped inner rim 431 to be coupled to the hub. Arcuate inner rim assemblies 431a, 431b, 431c are removably coupled together to define the circular inner rim 431. While three arcuate inner rim assemblies 431a, 431b, 431c are illustrated, it will be appreciated by those skilled in the art that there may be any number of arcuate inner rim assemblies, for example, from 2 to 4.

A mounting ring 490 extends inwardly from the circular inner rim 431. The mounting ring 490 illustratively includes inner and outer openings 491, 492 therein. The outer openings 491 are spaced apart along an outer circumference of the mounting ring 490 relative to the inner openings 492, which are spaced apart along an inner circumference of the mounting ring. The inner openings 492 are illustratively smaller in size (i.e., diameter) relative to the outer openings 491. The mounting ring 490 including the outer and inner openings 491, 492 may advantageously define what may be conceptually considered a universal mount that can adapt to different sized (e.g., diameter) wheels on various sized trucks and loaders, for example. As will be appreciated by those skilled in the art, the mounting ring 490 may clear the hub of a vehicle by the amount of radial displacement, so consideration and/or checking of fluid reservoirs (e.g., brake fluid) may be facilitated.

Figure 36:
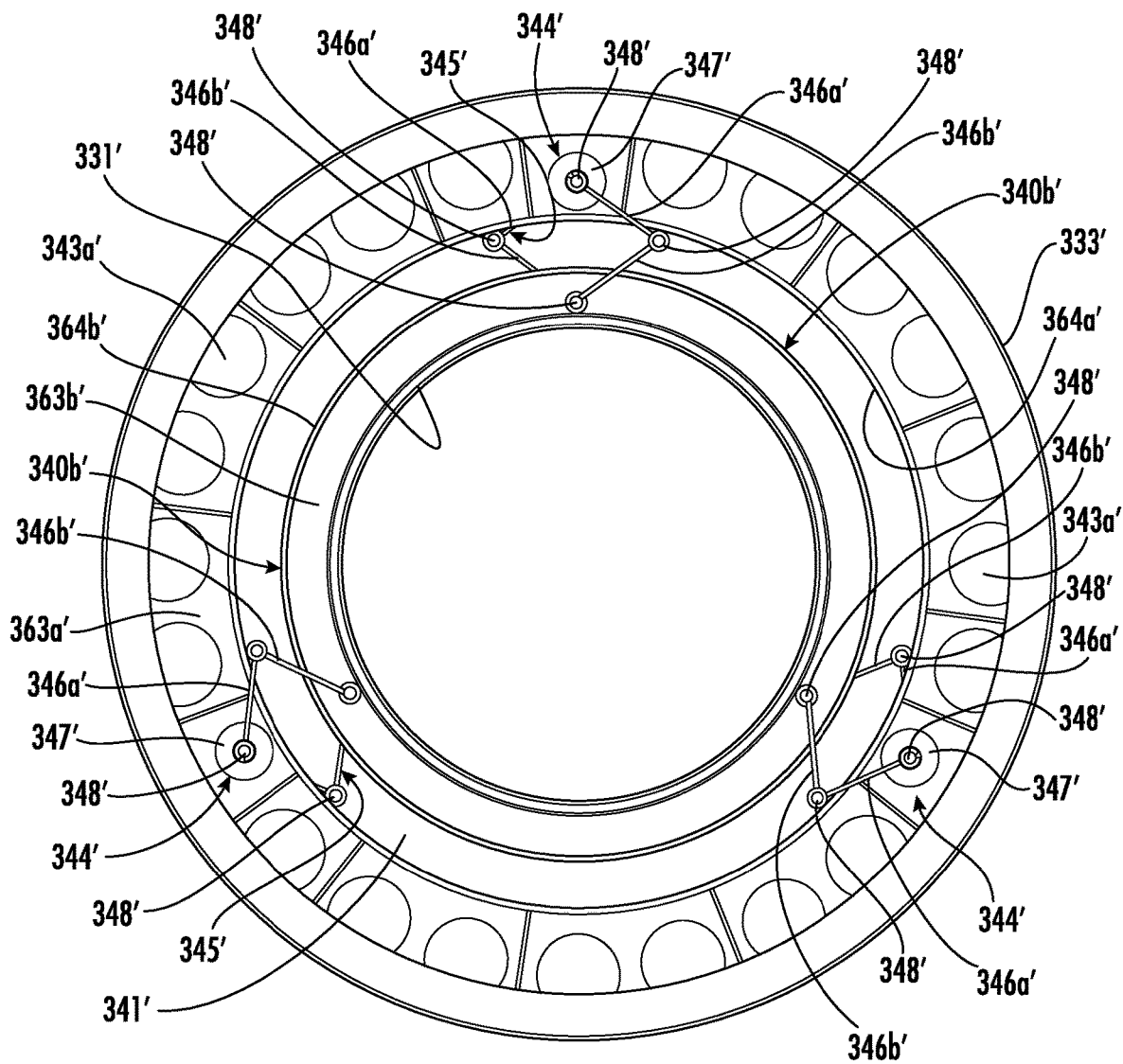
FIG. 36 is a side view of the portion of the wheel assembly of FIG. 35.

Each arcuate inner rim assembly 431a, 431b, 431c includes an arcuate inner rim segment 432b and an arcuate inner ring segment 440b extending radially outward from the arcuate inner rim segment, similar to the embodiments described above with respect to FIGS. 34-36. Each inner ring segment 440b includes an inner ring body 463b and an inner ring edge cap 464b carried by an outer edge of the inner ring body. Each arcuate inner ring segment 440b also includes weight-reduction openings 443b therein.

Each segment or arcuate inner rim assembly 431a, 431b, 431c has end flanges 418a, 418b at opposing ends. More particularly, a respective inner flange 418a, 418b is at each end of the arcuate inner rim segment 432b and the arcuate inner ring segment 440b for coupling adjacent ones of the arcuate inner rim assemblies 431a, 431b, 431c in end-to-end relation. Each inner flange 418a, 418b has openings or inner flange fastener receiving passageways therein to receive inner flange fasteners 419 therethrough when aligned with an adjacent end flange.

The wheel assembly 430 also includes an outer rim 433 having a circular shape. Similar to the circular inner rim 431 the circular outer rim 433 is segmented, or defined by coupled together arcuate outer rim assemblies 433a, 433b, 433c. While three arcuate outer rim assemblies 433a, 433b, 433c are illustrated, it will be appreciated by those skilled in the art that there may be any number of arcuate outer rim assemblies, for example, from 2 to 4, and the number of arcuate outer rim assemblies need not match the number of arcuate inner rim assemblies 431a, 431b, 431c. In addition, the joints in the arcuate outer rim assemblies 433a, 433b, 433c need not be aligned with the corresponding joints in the arcuate inner rim assemblies 431a, 431b, 431c in other embodiments.

The number of arcuate inner and outer rim assemblies 431a, 431b, 431c, 433a, 433b, 433c may be dependent on the overall size of the wheel assembly 430. Other considerations for the size of each segment or arcuate inner and outer rim assemblies may include shipping constraints (e.g., weight, size, cost, etc.). Of course, the number of segments or arcuate inner and outer rim assemblies 431a, 431b, 431c, 433a, 433b, 433c may be based upon other and/or additional factors. The arcuate inner and outer rim assemblies 431a, 431b, 431c, 433a, 433b, 433c may be coupled or assembled on site.

Each arcuate outer rim assembly 433a, 433b, 433c, similar to each arcuate inner rim assembly 431a, 431b, 431c and similar to the embodiments described above with respect to FIGS. 34-36, includes an arcuate outer rim segment 432a and an arcuate outer ring segment 440a extending radially inward from the arcuate outer rim segment. Similar to the embodiments described above, each arcuate outer ring segment 440a has an outer ring body 463a and an outer ring edge cap 464a carried by an inner edge of the outer ring body. Also similar to the embodiments above, each arcuate outer ring segment 440a also includes weight-reduction openings 443a therein.

Each arcuate outer rim assembly 433a, 433b, 433c also has end flanges 415a, 415b at opposing ends. More particularly, a respective outer flange 415a, 415b is at each end of the arcuate outer rim segment 432a and the arcuate outer ring segment 440a for coupling adjacent ones of the arcuate outer rim assemblies 433a, 433b, 433c in end-to-end relation. Each outer flange 415a, 415b has openings or outer flange fastener receiving passageways 417 therein to receive outer flange fasteners 416 therethrough when aligned with an adjacent outer flange.

Similar to the embodiments described above with respect to FIGS. 34-36, arcuate outer ring segments 440a and arcuate inner ring segments 440b define a closable gap 441 therebetween to define a mechanical stop. Thus, relative movement may be limited between the arcuate outer ring segments 440a and arcuate inner ring segments 440b.

Additionally, while not specifically illustrated or described with respect to FIGS. 38-40, the wheel assembly 430 includes gas springs (shown in other figures) that are operatively coupled between the circular inner rim 431 and the circular outer rim 433 to provide a gas suspension for relative movement therebetween. The gas springs may diverge outwardly from the arcuate inner rim segments 432*a* to the arcuate outer rim segments 432*b*. Exemplary arrangements of gas springs are illustrated in FIGS. 32 and 34, and 41-44, for example. The wheel assembly 430 may also include attachment brackets, covers, cover rings, bellows, and/or any other element described herein.

A method aspect is directed to a method of assembling a wheel assembly 430 to be coupled to a hub of a vehicle. The method includes coupling together a plurality of arcuate inner rim assemblies 431*a*, 431*b*, 431*c* to define a circular inner rim 431 to be coupled to the hub of the vehicle. Each arcuate inner rim assembly 431*a*, 431*b*, 431*c* includes an arcuate inner rim segment 432*b*, and an arcuate inner ring segment 440*b* extending radially outward from the arcuate inner rim segment. The method also includes coupling together a plurality of arcuate outer rim assemblies 433*a*, 433*b*, 433*c* to define a circular outer rim 433. Each arcuate outer rim assembly 433*a*, 433*b*, 433*c* includes an arcuate outer rim segment 432*a*, and an arcuate outer ring segment 440*a* extending radially inward from the arcuate outer rim segment. The method further includes operatively coupling a plurality of gas springs between the circular inner rim 431 and the circular outer rim 433 to provide a gas suspension for relative movement therebetween.

Referring now to FIGS. 41-49, in another embodiment, the segmented wheel assembly 530 similar to the embodiments described above with respect to FIGS. 38-40, includes an outer rim 533, including an outer ring 540*a* that is segmented into three segments 533*a*, 533*b*, 533*c*, each segment including end flanges 515*a*, 515*b* at opposing ends. Each end flange 515*a*, 515*b* has openings therein to receive fasteners 516 therethrough when aligned with an adjacent end flange.

The wheel assembly 530 also includes a segmented inner rim 531 that is segmented into three inner rim segments 531*a*, 531*b*, 531*c*. Each inner rim segment 531*a*, 531*b*, 531*c* has end flanges 518*a*, 518*b* at opposing ends. Each end flange 518*a*, 518*b* has openings therein to receive fasteners 519 therethrough when aligned with an adjacent end flange. The inner rim 531 also includes an inwardly extending flange 525 having fastener receiving passageways 524 therein for coupling to a hub of a vehicle. In some embodiments, the universal mounting ring described above that includes inner and outer openings may be used or coupled to the inner rim 531.

The outer ring 540*a* is coupled to the outer rim 533 and an inner ring 540*b* is coupled to the inner rim 531. The inner ring 540*b* defines a closeable gap 541 with adjacent portions of the outer ring 540*a* to define a mechanical stop to limit relative movement of the inner and outer rims 531, 533.

The outer ring 540*a* has an outer ring body 563*a* and an outer ring edge cap 564*a* carried by an inner edge of the outer ring body. The inner ring 540*b* also includes an inner ring body 563*b* and an inner ring edge cap 564*b* carried by an outer edge of the inner ring body. Also similarly to the embodiments above, the outer ring 540*a* also includes weight-reduction openings 543*a* therein. The inner ring 540*b* also includes weight-reduction openings 543*b* therein.

Gas springs 550 are operatively coupled between the inner rim 531 and the outer rim 533. Each gas spring 550 may be a double-acting gas spring, for example, and include a double-acting gas cylinder 551 and an associated piston 552. Of course, in some embodiments, each gas spring 550 may be a single-acting gas spring. More than one type of gas spring 550 may be used. The gas springs 550 may be air springs and/or nitrogen springs, for example. The gas springs 550 may include other gasses as well. The gas springs 550 are arranged similarly to the embodiments described with respect to FIGS. 34-36, and more particularly, in pairs on opposite sides of the outer ring 540*a*. Illustratively, the gas springs 550 diverge outwardly from the inner rim 531 to the outer rim 533. A respective attachment bracket [553] 553*a*, 553*b* for each gas spring 550 is coupled to the outer and inner rims 533, 531. Accordingly, the gas springs 550 are pivotably coupled between the inner and outer rims 531, 533. Similar to the embodiments described above, as will be appreciated by those skilled in the art, the gas springs 550 provide a gas suspension for relative movement between the inner rim 531 and the outer rim 533.

The wheel assembly 530 also includes inboard lateral stops 544 carried between an inboard side of the outer rim 533 and an inboard side of the inner rim 531, and more particularly, an inboard side of the inner ring 540*b*. The inboard lateral stops 544 are illustratively in the form of hinge retainers or scissor hinges. Each inboard lateral stop 544 includes inboard hinge brackets 546*a*, 546*b*. The hinge brackets 546*a*, 546*b* are coupled together by way of a hinge pin 548. The hinge bracket 546*b* is coupled to a wall portion of the inner ring 540*b* by way of a hinge pin 548.

The hinge bracket 546*a* is coupled to a lateral stop mount 549 that is carried by the inner surface of the outer rim 533. More particularly, the lateral stop mount 549 is coupled to the outer ring 540*a* and the outer rim 533 by flanges 562 that receive fasteners 579 therethrough.

Each lateral stop mount 549 includes an anvil body 561 that is embedded or carried within an elastomeric body 547, and more particularly a cast urethane body, for example, Duro 55 urethane. The elastomeric body 547 may be formed (e.g., extruded or bonded) as two segments or pieces and may have openings 567 within a bottom portion thereof as illustrated (FIGS. 47-49) (e.g., bulge holes). In some embodiments, the elastomeric body 547 may include no openings 567 or another number of openings. The elastomeric body 547 may have a slightly smaller radius than the adjacent or matching inside surface of the outer rim 533 so that the bottom portion of the elastomeric body can bulge downward. The elastomeric body 547 adds flexibility while maintaining strength, as will be appreciated by those skilled in the art. Additional details of an exemplary elastomeric body 547 may be found in U.S. Pat. No. 4,727,695 to Kemeny, U.S. Pat. No. 5,054,251 to Kemeny, U.S. Pat. No. 5,215,382 to Kemeny, and U.S. Pat. No. 5,242,147 to Kemeny, the entire contents of all of which are hereby incorporated by reference.

The anvil body 561 illustratively has an anvil shape with an enlarged base or dovetail adjacent the outer rim 533. The anvil body 561 has an upper opening 566*a* to receive the hinge pin 548 therethrough coupling the hinge bracket 546*b*. The upper opening 566*a* coupling to the hinge pin 548 is exposed from the elastomeric body 547. The anvil body 561 has two further openings 566*b* vertically aligned with the hinge pin opening. The further openings 566*b* may be particularly advantageous as weight reducing openings. There may be any number of further openings 566*b*. The further openings 566*b* are embedded or carried within the elastomeric body 547 so as to not be exposed. The anvil body 561 may be subject to shear and moment forces only as will be appreciated by those skilled in the art. Tension and compression as they relate to the anvil body 561 may be considered negligible.

Each lateral stop mount 549 also includes a stop anchor housing 568 surrounding or over the elastomeric body 547. The anchor housing 568 illustratively may, similarly to the elastomeric body 547, be two-pieces that when coupled together have an opening in the top thereof to permit the anvil body 561 to extend, and more particularly, to permit the upper opening 566a of the anvil body to be exposed for coupling to the hinge bracket 546b. The flanges 562 described above extend from the anchor housing 568 laterally on the inboard side of the outer rim 533 and the respective side of the outer ring 540a.

The wheel assembly 530 also includes outboard lateral stops 545 carried between an outboard side of the outer rim 533 and an outboard side of the inner rim 531, and more particularly, an outboard side of the inner ring 540b. The outboard lateral stops 545 are laterally aligned with the inboard lateral stops 544 on the opposite side of the outer ring 540a. The outboard lateral stops 545 are illustratively in the form of hinge retainers or scissor hinges. More particularly, the outboard lateral stops 545 are structurally similar to the inboard lateral stops 544 and thus need not be further described herein.

The wheel assembly 530 also includes tread assemblies 570 carried by the outer rim 533. Each tread assembly 570 is in the form of an arcuate metal plate coupled to an outer circumference of the outer rim 533 by fasteners 571. Each tread assembly 570 has outwardly folded ends defining a traction feature. Those skilled in the art will appreciate that given the arcuate shape of the tread assembly 570, several tread assemblies are coupled in end-to-end relation around the outer rim 533. Other types and/or configurations of tread assemblies 570 may be used.

Other elements described herein with respect to other embodiments, but not specifically illustrated or described may be used with elements of the present embodiments. These elements, being similar to those described above, need not be further described with respect to the present embodiments. Moreover, one or more method aspects may include a method of making the wheel assembly 530.

Referring now to FIGS. 50-53, in another embodiment, the inner rim 531' includes the mounting ring 590' as described above that extends inwardly from the inner rim 531' and includes inner and outer openings 591', 592' therein. In other words, the wheel assembly 530' includes the universal mount that can adapt to different sized (e.g., diameter) wheels on various sized trucks and loaders, for example.

Additionally, each tread assembly 570' includes weight reducing openings 578' therein. Similar to the tread assemblies described above with respect to FIGS. 41-44, the tread assemblies 570' are the carried by the outer rim 533'. Each tread assembly 570' is in the form of an arcuate metal plate and includes downwardly folded sides 577' for coupling to the inboard and outboard sides of the outer rim 533' by way of fasteners 571'. The downwardly folded sides 577' secure the tread assemblies 570' as opposed to fasteners coupling through the outer circumference of the outer rim. Fasteners through the outer circumference of the outer rim 533' may not be desirable as the present embodiments of the tread assemblies 570' include the weight reducing openings 578' therein. Also, similarly to the tread assemblies 570' described above with respect to FIGS. 41-44, each tread assembly 570' has outwardly folded ends defining a traction feature.

The wheel assembly 530' also includes a rigid inboard cover ring 593' coupled to an inboard side of the outer rim 533', for example, by way of fasteners 507a'. The rigid inboard cover ring 593' is illustratively segmented similar to the inner and outer rings 540a', 540b'. In some embodiments, the rigid inboard cover ring 593' may not be segmented. The rigid inboard cover ring 593' extends radially inward toward the inner rim 531'. More particularly, the rigid inboard cover ring 593' defines a radially and axially extending inboard gap with the inner rim 531'.

A flexible inboard seal 509a', for example, in the form of an inboard bellows seal, is coupled between the rigid inboard cover ring 593' and the inner rim 531', for example, by way of respective fasteners 508a' to couple to the inner rim. More particularly, the rigid inboard cover ring 593' has a relatively thin flanged end to be slideably received within a channel (e.g., U-shaped, matched to the flanged end). The inboard bellows seal 509a' also includes another channel for coupling to (e.g., by slideably receiving a flange of the inner rim 531') to the inner rim. The inboard bellows seal 509a' is also illustratively segmented similar to the rigid inboard cover rim 593' and the inner and outer rims 531', 533'.

The flexible inboard seal 509a' closes the radially and axially extending inboard gap and permits relative movement of the inner rim 531' and the outer rim 533'. Illustratively, the inboard bellows seal 509a' has a W-shaped cross-section. The flexible inboard seal 509a' may be a different kind of flexible seal, for example, and may have a different shaped cross-section. The flexible inboard seal 509a' may include rubber and/or an elastomeric material. The flexible inboard seal 509a' may include other and/or additional materials.

The wheel assembly 530' also includes a rigid outboard cover ring 594' coupled to an outboard side of the outer rim 533', for example by way of fasteners. The rigid outboard cover ring 594' is illustratively segmented similar to the inner and outer rings 540a', 540b'. In some embodiments, the rigid outboard cover ring 594' may not be segmented. The rigid outboard cover ring 594' extends radially inward toward the inner rim 531'. More particularly, the rigid outboard cover ring 594' defines a radially and axially extending outboard gap with the inner rim 531'.

A flexible outboard seal 509b', for example, in the form of an outboard bellows seal, is coupled between the rigid outboard cover ring 594' and the inner rim 531', for example, by way of respective flanges as described above with respect to the flexible outboard seal. Similar to the inboard flexible seal 509a', the outboard flexible inboard seal 509b' closes the radially and axially extending outboard gap and permits relative movement of the inner rim 531' and the outer rim 533'. The outboard bellows seal 509b' similarly has a W-shaped cross-section. The flexible outboard seal 509b' may be a different kind of flexible seal, for example, and may have a different shaped cross-section. The outboard bellows seal 509b' is also illustratively segmented similar to the rigid inboard cover ring 593' and the inner and outer rims 531', 533'.

Elements illustrated, but not specifically described, such as, for example, the gas springs 550' and the lateral stops 544', 545', are similar to those described above with respect to FIGS. 41-49. Accordingly, no further description of these elements is needed. Moreover, one or more method aspects may include a method of making the wheel assembly 530'.

Referring now to FIGS. 52-55, in another embodiment, of a segmented wheel assembly 630, the lateral stop mounts 644, 645 each includes gas springs 647, and does not include an elastomeric body, as will be described in further detail below. The inboard lateral stops 644 are carried between an inboard side of the outer rim 633 and an inboard side of the inner rim 631, and more particularly, an inboard side of the inner ring 640b by way of the gas springs 647.

Each gas spring 647 is coupled to the inboard hinge bracket 646b by way of a hinge pin 648 to permit pivoting thereabout upon inward or outward relative movement. The gas springs 647 restrict lateral movement similarly to any of the lateral stops described herein. The gas springs 647 each includes a gas cylinder 667 and an associated piston 668. The gas springs 647 may be short-stroke air cylinders, for example. The gas springs 647 are operated by the movement of the inboard hinge brackets 646a, 646b. The gas springs 647 each includes a flange 662 extending outwardly (e.g., radially) from the gas cylinder 667 that couples to the inner ring 640b, and more particularly, the inner ring body 663b, by fasteners 679.

The hinge bracket 646a is coupled to a lateral stop mount 649 that is carried by the inner surface of the outer rim 633. Similar to the embodiments described above with respect to FIGS. 41-49, each lateral stop mount 649 includes an anvil body 661. The anvil body, in contrast to other embodiments, is not embedded or carried within an elastomeric body.

The anvil body 661 illustratively has an anvil shape with an enlarged base or dovetail adjacent the outer rim 633. The anvil body 661 has an upper opening to receive the hinge pin 648 therethrough coupling the hinge bracket 646a. The anvil body 661 has a further opening 666 vertically aligned with the hinge pin opening. The further opening 666 may be particularly advantageous as a weight reducing opening. There may be any number of further openings 666.

The wheel assembly 630 also includes outboard lateral stops 645 carried between an outboard side of the outer rim 633 and an outboard side of the inner rim 631, and more particularly, an outboard side of the inner ring 640b. The outboard lateral stops 645 are laterally aligned with the inboard lateral stops 644 on the opposite side of the outer ring 640a. The outboard lateral stops 645 are illustratively in the form of hinge retainers or scissor hinges. More particularly, the outboard lateral stops 645 are structurally similar to the inboard lateral stops 644 and thus need not be further described herein.

Other elements described herein with respect to other embodiments, but not specifically illustrated or described may be used with elements of the present embodiments. These elements, for example, the gas springs 650 including the respective gas cylinders 651 and associated pistons 652 and attachment brackets 653, the inwardly extending flange 625 from the inner rim 631 and having fastener receiving passageways 624 therein for coupling to a hub of a vehicle, end flanges 615a, 615b, 618a, 618b and fasteners 616, inner and outer ring bodies 663a, 663b, inner and outer ring edge caps 664a, 664b, and openings 643a, 643b, are similar to those described above, and need not be further described with respect to the present embodiments. Moreover, one or more method aspects may include a method of making the wheel assembly 630.

Figure 56:
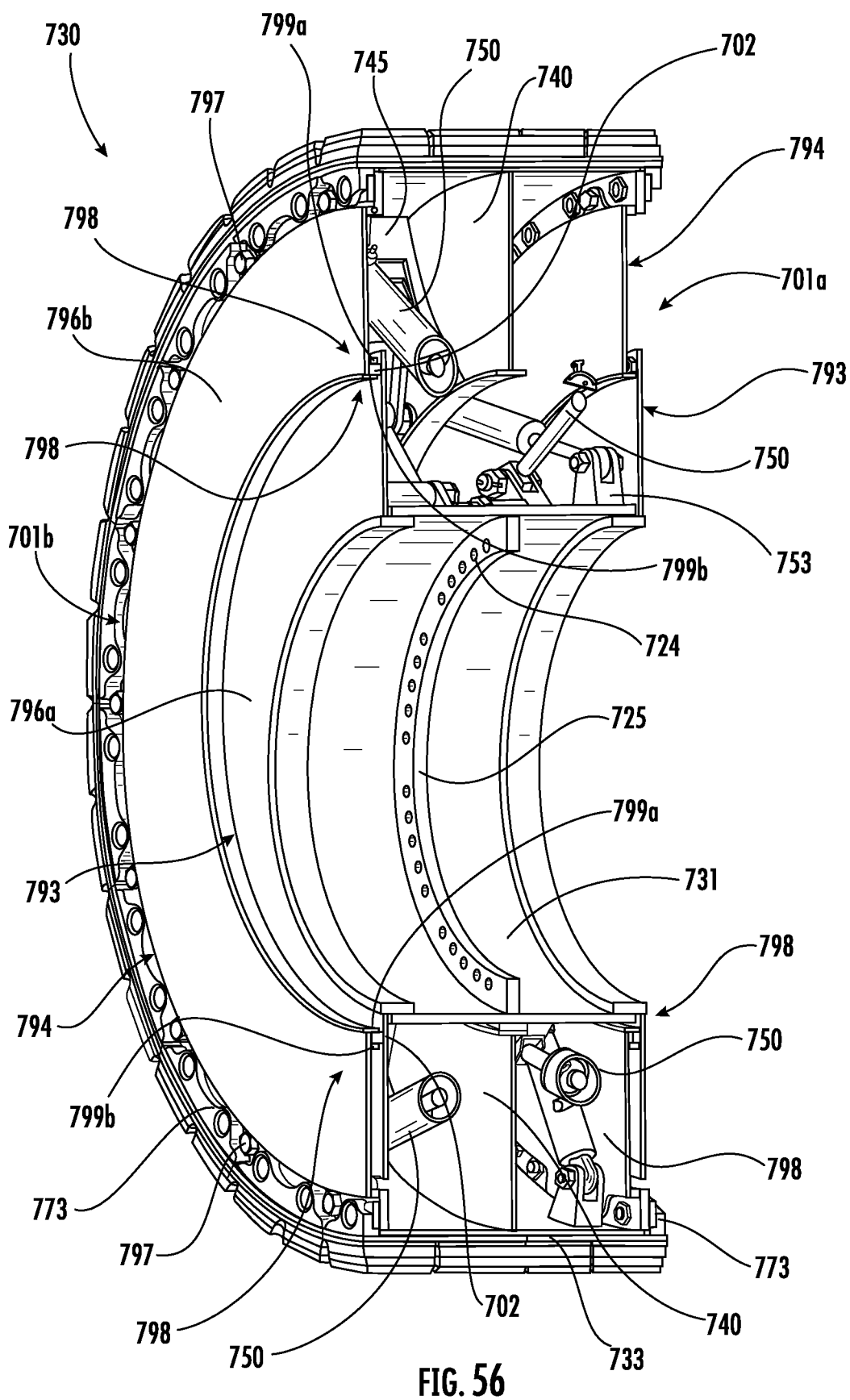
FIG. 56 is a perspective cut-away view of a wheel assembly in accordance with an embodiment.
Figure 57:
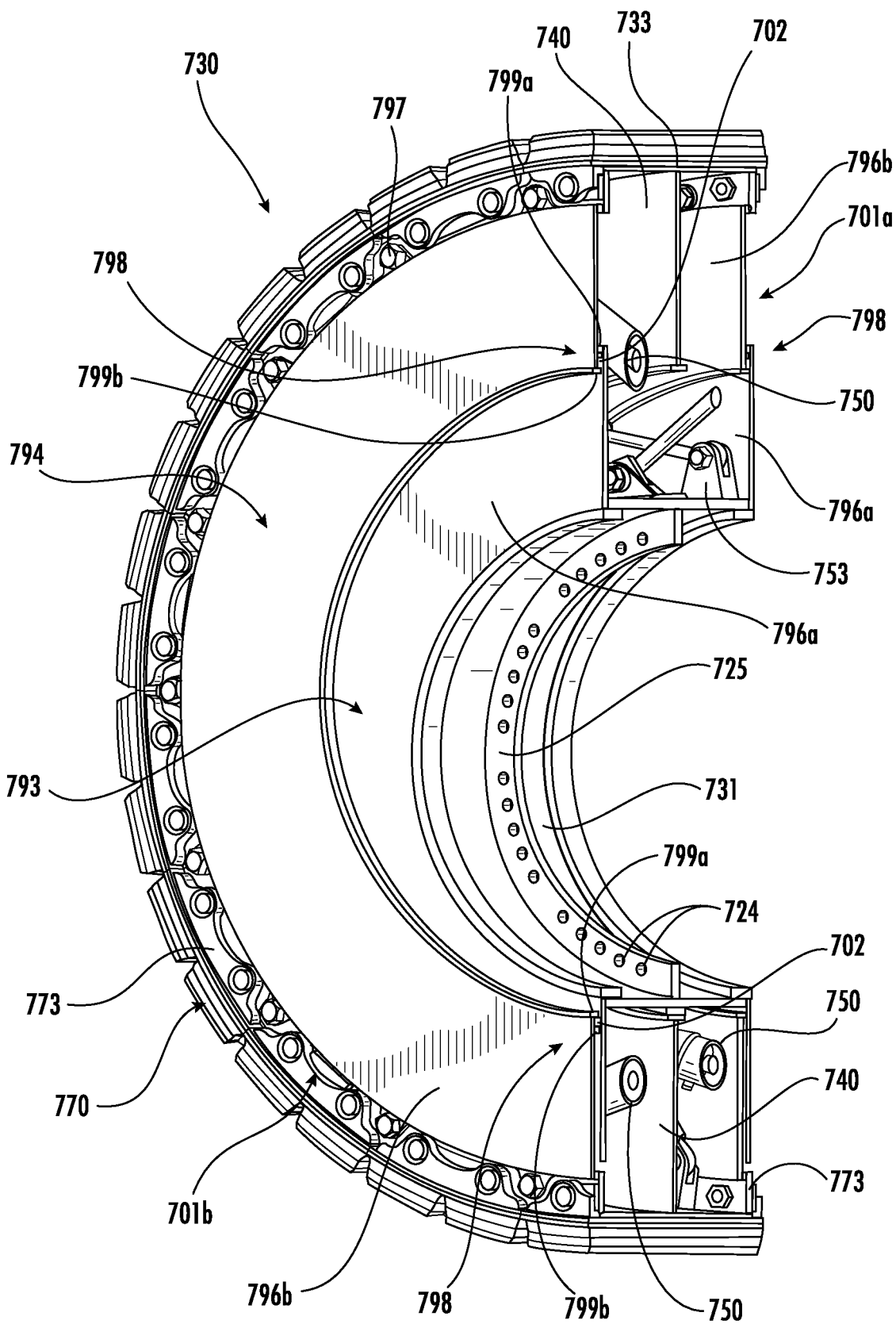
FIG. 57 is another perspective cut-away view of the wheel assembly of FIG. 56.

Referring now to FIGS. 56-57, in another embodiment, the wheel assembly 730 may include inboard and outboard sidewall cover assemblies 701a, 701b. The inboard and outboard sidewall cover assemblies 701a, 701b each include an inner sidewall cover 793 coupled to the inner rim 731. Each inner sidewall cover 793 extends radially outward toward the outer rim 733. Each inner sidewall cover 793 illustratively includes an inner sidewall panel 796a.

The inboard and outboard sidewall cover assemblies 701a, 701b each also includes an outer sidewall cover 794 coupled to the outer rim 733, for example, using fasteners 797. A rubber gasket or seal may be between the outer sidewall cover 794 and the adjacent portions of the outer rim 733. Each outer sidewall cover 794 extends radially inward toward the inner rim 731. Each outer sidewall cover 794 is also in sliding overlapping relation with the inner sidewall cover 793 to thus permit relative movement between the inner sidewall cover and the outer sidewall cover. Illustratively, the outer sidewall cover 794 overlaps (i.e., axially outward) the inner sidewall cover 793 for the outboard sidewall cover assembly 701b, and the inner sidewall cover overlaps (i.e., axially outward) the outer sidewall cover for the inboard sidewall cover assembly.

Each outer sidewall cover 794 illustratively includes an outer sidewall panel 796b and an outer wiper arrangement 798 that extends from the outer sidewall panel toward and in sliding contact with the inner sidewall cover 793. The outer sidewall panel 796b may include steel and/or aluminum, for example, which may depend on the application or environment, as will be appreciated by those skilled in the art.

The outer wiper arrangement 798 is adjacent a radially inward edge of the outer sidewall panel 796b and extends axially inward. The outer wiper arrangement 798 may include spaced apart outer sidewall lips 799a, 799b that are adjacent the radially inward edge of the outer sidewall panel 796b and extend axially inward to define a channel therebetween.

A wiper blade 702, for example, that includes a resilient material may be carried in the channel. The wiper blade 702 may include rubber, for example, a foam rubber that may be foam backed. Of course, other and/or additional materials may be used, for example, polytetrafluoroethylene (PTFE), polyethylene, such as, ultra-high-molecular-weight polyethylene. While relative movement occurs between the outer and inner sidewall covers 794, 793, the interface between the outer wiper arrangement 798 and the inner sidewall panel 796a may be water and/or dust tight.

Figure 58:
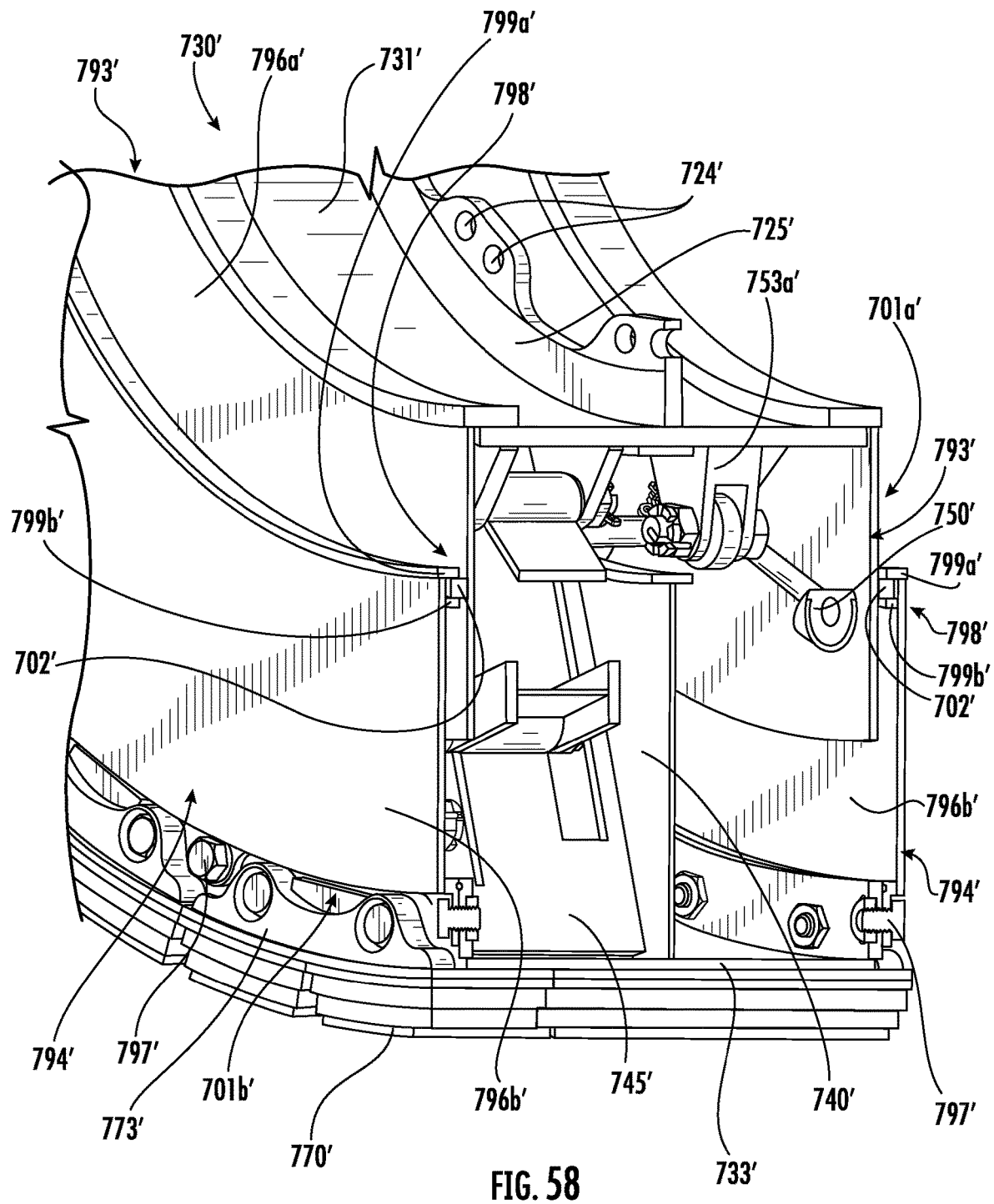
FIG. 58 is a perspective cut-away view of a portion of a wheel assembly in accordance with an embodiment.

Referring now to FIG. 58, in another embodiment of the wheel assembly 730', the outer sidewall cover 794' overlaps (i.e., axially outward) the inner sidewall cover 793' for both the inboard and outboard sidewall cover assemblies 701a', 701b', Accordingly, the outer wiper arrangement 798' includes outer sidewall lips 799b' that are adjacent the radially inward edge of the outer sidewall panel 796b' and extend axially outward to define a channel therebetween. Elements illustrated but not specifically described are similar to those described above, such as for example the inner rim 731', the sidewall lips 799a', 799b', fastener receiving openings 724' within flange ring 725', attachment bracket 753a', gas spring 750', wiper blade 702', fasteners 797', outer ring 740' coupled to the outer rim 733', lateral stops 745', and tread assemblies 770' and associated clamping arrangement 773'.

Figure 59:
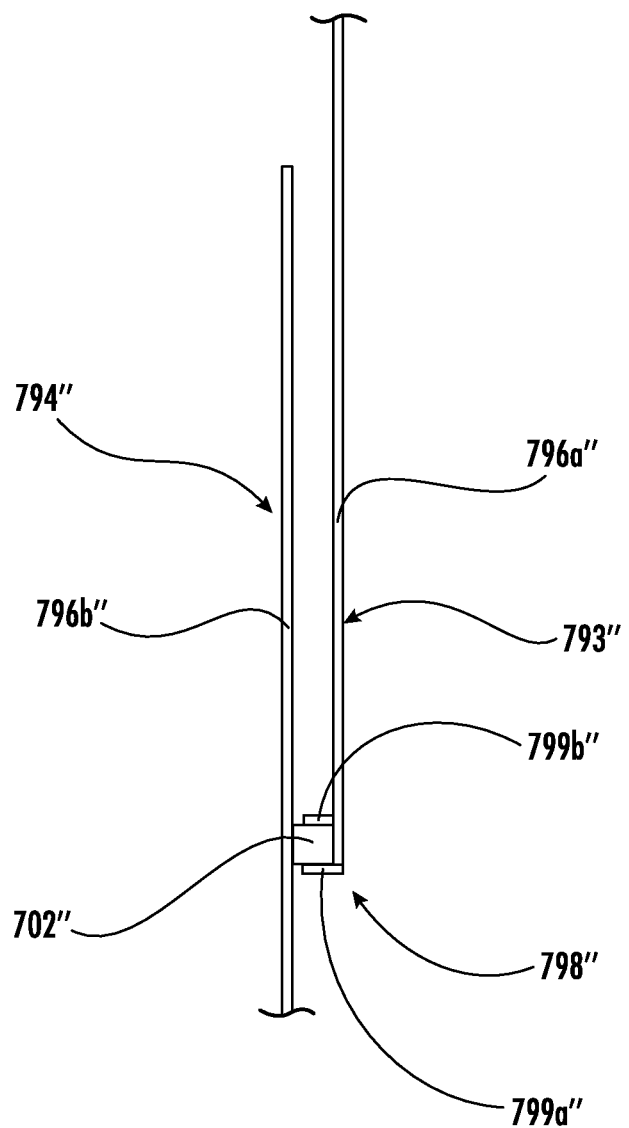
FIG. 59 is a schematic diagram of a sidewall cover assembly in accordance with an embodiment.

Referring briefly to FIG. 59, in another embodiment, each inner sidewall cover 793" may include an inner sidewall panel 796a" and an inner wiper arrangement 798" that extends from the inner sidewall panel toward and in sliding contact with the outer sidewall cover 794". Similarly to the inner sidewall panel 796a", the outer sidewall panel 796b" may include steel and/or aluminum, for example, which may depend on the application or environment, as will be appreciated by those skilled in the art.

The inner wiper arrangement 798" is adjacent a radially outward edge of the inner sidewall panel 796a" and extends axially outward. The inner wiper arrangement 798" may include spaced apart inner sidewall lips 799a", 799b" that are adjacent the radially outward edge of the inner sidewall panel 796a'' and extend axially outward to define a channel therebetween.

A wiper blade 702'', for example, that includes a resilient material may be carried in the channel. The wiper blade 702'' may include rubber, for example, a foam rubber that may be foam backed. Of course, other and/or additional materials may be used, for example, polytetrafluoroethylene (PTFE), polyethylene, such as, ultra-high-molecular-weight polyethylene. Elements illustrated, but not specifically described are similar to those described above.

Figure 60:
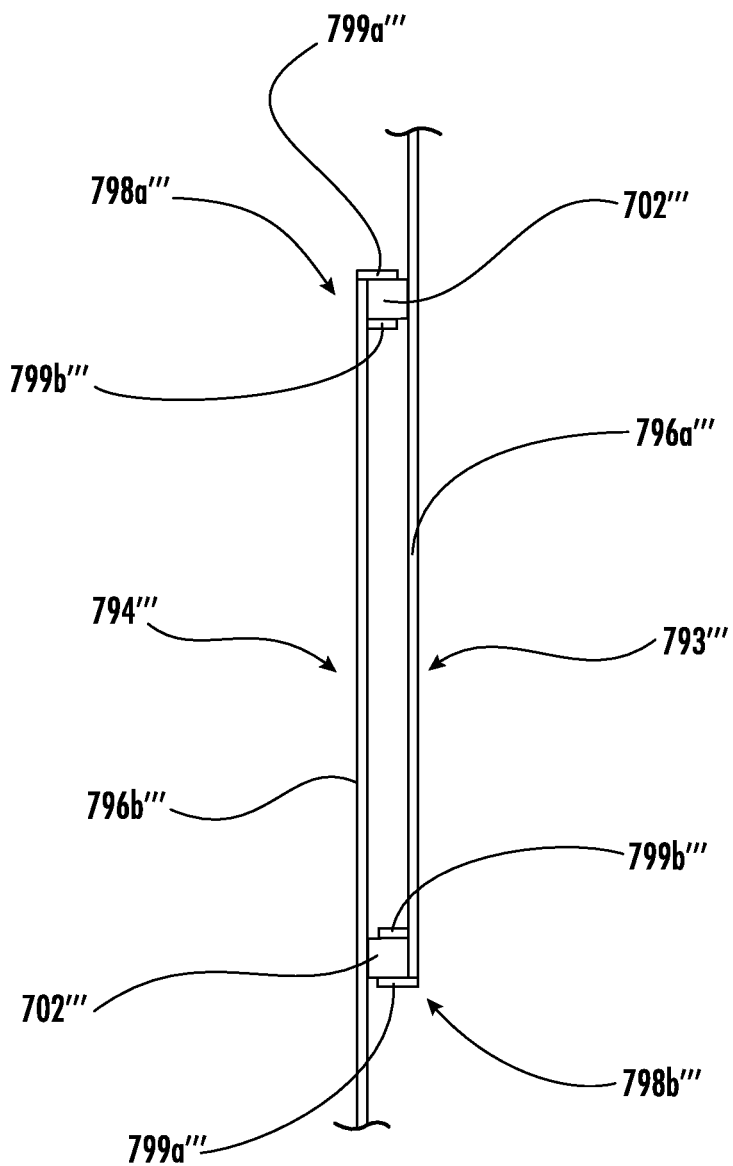
FIG. 60 is a schematic diagram of a sidewall cover assembly in accordance with another embodiment.

Referring now to FIG. 60, in another embodiment, both the inner and outer sidewall covers 793''', 794''' may include respective inner and outer wiper arrangements 798a''', 798b''' as described above. Elements illustrated, but not specifically described are similar to those described above, such as the inner sidewall panel 796a''' and the outer sidewall panel 796b'''.

While an exemplary outer wiper arrangement 798b''' has been described that includes lips 799a''', 799b''', those skilled in the art will appreciate that in some embodiments lips may not be included. For example, the outer sidewall panel 796b''' may have a groove or channel formed therein, and the wiper arrangement 798b''', which may include a resilient material wiper blade 702''', may be carried within the groove or channel. Moreover, while embodiments have been described herein with respect to inboard and outboard sidewall cover assemblies 701a, 701b, those skilled in the art will appreciate that the inboard and outboard sidewall cover assemblies may each have different arrangements with respect to the inner and outer sidewall covers 793''', 794''' and wiper arrangements 798a''', 798b'''.

The wheel assembly 730, similar to embodiments described above, includes an outer ring 740 coupled to the outer rim 733 that extends radially inward from the outer rim. The outer ring 740 may define a closeable gap with adjacent portions of the inner rim 731 to define a mechanical stop to limit relative movement of the inner rim and outer rim, for example, as described above. The gas springs 750, which diverge outwardly from the inner rim 731 to the outer rim 733 and are arranged in pairs on opposite sides of the outer ring 740, may thus have an operating stroke permitting the outer ring to define the mechanical stop. The gas springs 750 are coupled to the inner and outer rims 731, 733 by way of respective attachment brackets 753.

The wheel assembly 730 also includes outboard lateral stops 745, illustratively in the form of scissor hinges or hinge retainers, carried between an outboard side of the outer rim 733 and an outboard side of the inner rim 731, and more particularly, an outboard side of the outer ring 740. The outboard lateral stops 745 are structurally similar to those described above and need not be further described herein. Moreover the wheel assembly 730 may also include inboard lateral stops, which are also similar to the outboard lateral stops and embodiments of the inboard lateral stops described herein.

Other elements illustrated, such as, for example, fastener receiving passageways 724 within an inwardly extending flange ring 725, the tread assemblies 770, and the clamping arrangement 773, are similar to corresponding elements described with respect to the embodiments described above. Accordingly, these elements as they relate to the present embodiments need no further discussion.

Those skilled in the art will appreciate that in some embodiments, the wheel assembly 730 may additionally or alternatively include an inner ring coupled to the inner rim 731 that extends radially outward from the inner rim to define a closeable gap with adjacent portions of the outer ring 740 to define a mechanical stop to limit relative movement of the inner rim and outer rim. In this case, the gas springs 750 may thus have an operating stroke permitting the outer ring 740 and inner ring to define the mechanical stop.

A method aspect is directed to a method of assembling a wheel assembly 730 to be coupled to a hub of a vehicle. The method includes coupling a plurality of gas springs 750 between an inner rim 731 to be coupled to the hub and an outer rim 733 to provide a gas suspension permitting relative movement between the inner rim and the outer rim. The method also includes coupling an inner sidewall cover 793 of a sidewall cover assembly 701a to the inner rim 731 and extending radially outward toward the outer rim 733, and coupling an outer sidewall cover 794 of the sidewall cover assembly 701b to the outer rim and extending radially inward toward the inner rim and in sliding overlapping relation with the inner sidewall cover permitting relative movement between the inner sidewall cover and the outer sidewall cover.

Figure 61:
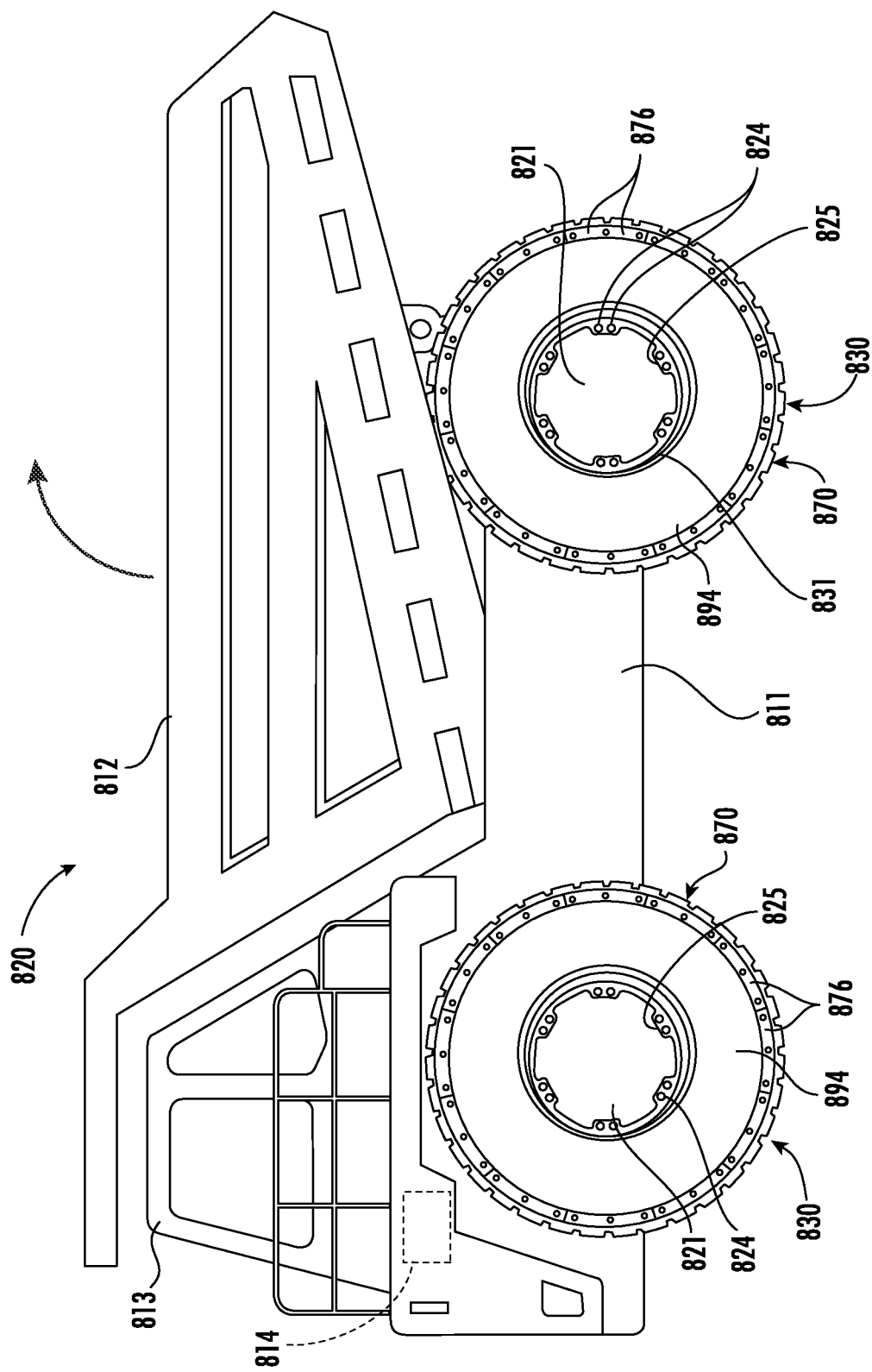
FIG. 61 is a schematic diagram of an off-highway vehicle in accordance with an embodiment.
Figure 62:
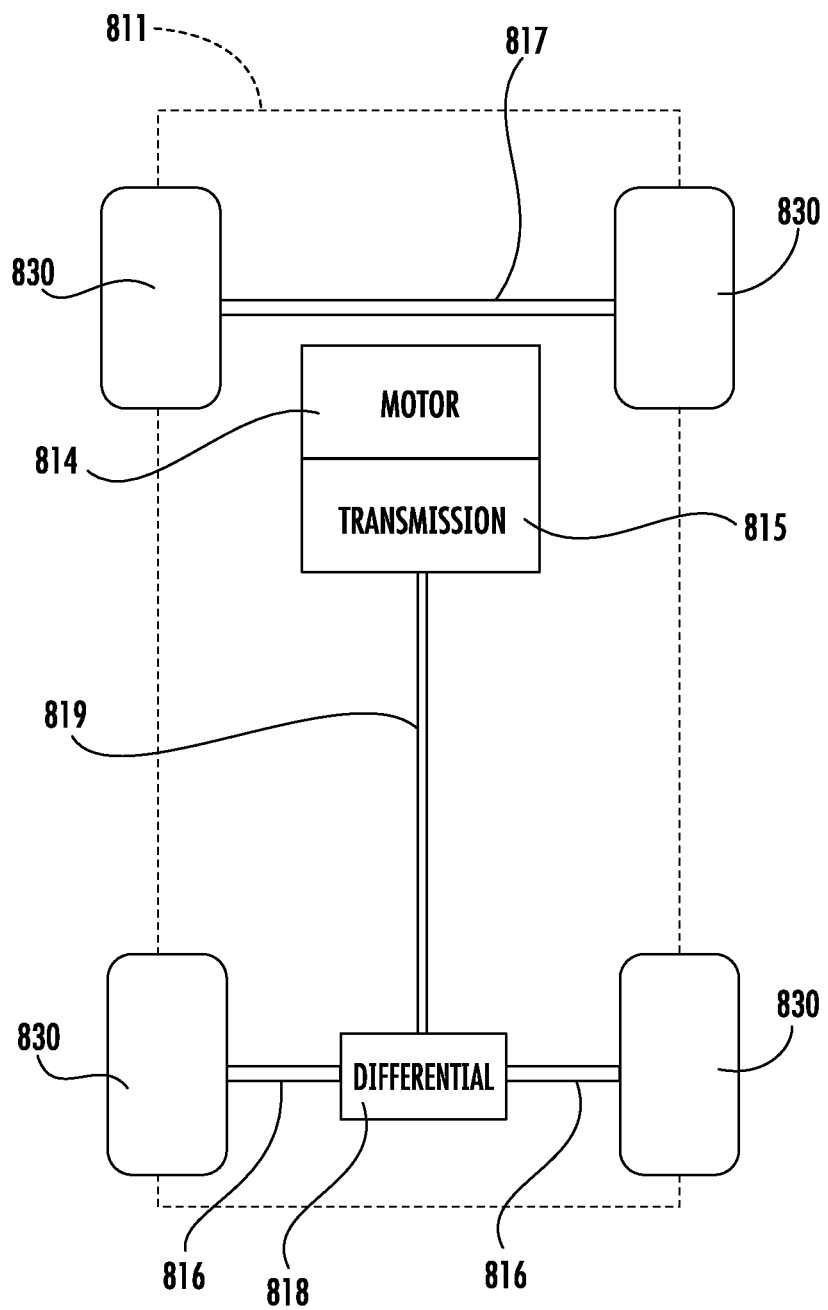
FIG. 62 is a schematic block diagram of a portion of the off-highway vehicle of FIG. 61.
Figure 63:
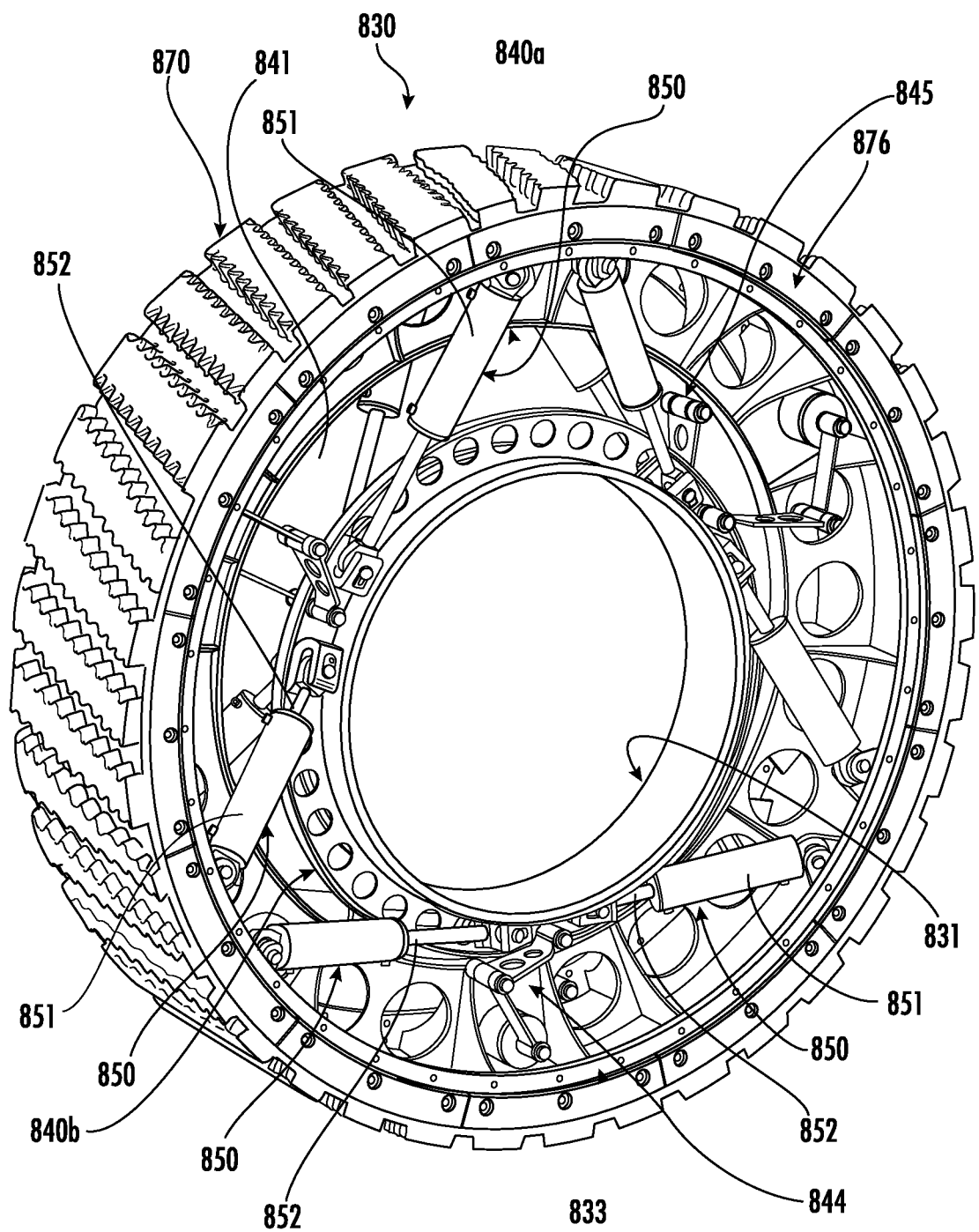
FIG. 63 is a perspective view of a portion of the wheel assembly of FIG. 61.

Referring now to FIGS. 61-63, in another embodiment, one or more of the wheel assemblies 830 described herein may be particularly advantageous for use with an off-highway vehicle 820. In particular, the off-highway vehicle is illustratively in the form of an off-highway, hauling vehicle 820 and includes an off-highway vehicle frame 811, and a truck bed 812 that is carried by the off-highway vehicle frame to haul material. More particularly, the truck bed 812 is pivotally coupled to the off-highway vehicle frame 811 to permit dumping of the material. In other words, the off-highway, hauling vehicle 820 is in the form of a type of dump-truck, and may be particularly advantageous for above-ground mining operations.

The off-highway, hauling vehicle 820 also includes an operator cab 813 that is carried by the off-highway vehicle frame 811. The operator cab 813 typically includes a seat for the vehicle operator and operator controls for driving or operating the off-highway, hauling vehicle 820, for example, such as for selectively pivoting the truck bed relative to the off-highway vehicle frame 811.

The off-highway, hauling vehicle 820 also includes a motor 814 carried by the off-highway vehicle frame 811. The motor may be in the form of a diesel engine 814, for example, and associated transmission 815 and drive shaft 819 to drive the wheel assemblies 830 (FIG. 62). In some embodiments, the motor 814 may be in the form of an electric motor and may direct drive the wheel assemblies 830. Of course, the motor 814 may be another type of motor, for example, a gasoline or other combustion motor or a hybrid combustion/electric motor.

The truck bed 812 may have a capacity of at least or greater than 100 tons. The truck bed 812 may also have a capacity greater than 300 tons or, in some embodiments, greater than 400 tons. Accordingly, the off-highway, hauling vehicle 820 may be a mining vehicle or haul truck. Those skilled in the art will appreciate that a haul truck is an off-highway, rigid dump truck that may be considered to be specifically engineered for use in high-production mining and heavy-duty construction environments. A haul truck, for example, may be used for hauling ore for mining operations.

The wheel assemblies 830 are rotatably coupled to the off-highway vehicle frame 811 without an intervening vehicle suspension. More particularly, the off-highway, hauling vehicle 820 does not include vehicle suspensions that are commonly associated with wheels, for example, springs (e.g., leaf springs, coils springs, torsion bars, air springs, etc.), shock absorbers, and linkages that connect a vehicle frame to the wheels and that allow relative motion between the vehicle frame and wheels. By being rotatably coupled to the off-highway vehicle frame 811 without an intervening vehicle suspension, the off-highway, hauling vehicle 820 may be considered as being suspension-less.

The wheel assemblies 830 are driven by the motor 814, for example, via a transmission 815. Each wheel assembly 830 includes, as described in detail above, an inner rim 831 that is coupled to the off-highway vehicle frame, for example, via a hub 821 coupled to an end of a rear axle 816 (and/or front axle 817). The rear axles 816, are, in turn, coupled to a drive shaft 819 via a differential 818, which is, in turn, coupled to a transmission 815 (FIG. 62). In the illustrated embodiment only the rear wheel assemblies are driven, but in other embodiments the front wheel assemblies may be driven by the motor.

Each wheel assembly 830 also includes an outer rim 833 that surrounds the inner rim 831 (FIG. 63). Gas springs 850 are coupled between the inner rim 831 and the outer rim 833 to provide a gas suspension for relative movement between the inner and outer rims. The gas springs 850 each diverge outwardly from the inner rim 831 to the outer rim 833. Each gas spring 850 may be a double-acting gas spring, for example, and include a double-acting gas cylinder 851 and an associated piston 852.

Each wheel assembly 830 also includes an outer ring 840*a* that is coupled to the outer rim. The outer ring 840*a* extends radially inward from the outer rim 833. An inner ring 840*b* is coupled to the inner rim 831 and defines a closable gap 841 with adjacent portions of the outer ring 840*a* to define a mechanical stop to limit relative movement of the inner and outer rims 831, 833. Illustratively, the gas springs 850 each have an operating stroke the permits the outer ring 840*a* and the inner ring 840*b* to define a mechanical stop. The gas springs 850 are arranged in pairs on opposite sides of the outer ring. Of course in some embodiments, the wheel assemblies 830 may not include inner and/or outer rings, or some or all of the wheel assemblies may not include inner and/or outer rings. Moreover, the wheel assemblies 830 may include any element or elements described in embodiments above, such as sidewalls 894, tread assemblies 870, clamping members 876 or clamping arrangements, through fastener receiving passageways 824 within an inwardly extending flange ring 825, and lateral stops 844, 845. Of course, elements illustrated, but not specifically described are similar to those described above.

As will be appreciated by those skilled in the art, the off-highway, hauling vehicle 820 including the wheel assemblies 830 may be particularly advantageous for above-ground mining operations. By not having an intervening vehicle suspension, the off-highway, hauling vehicle 820 may be subject to decreased maintenance and operational costs, for example. The wheel assemblies 830 advantageously provide a suspension for the off-highway, hauling vehicle 820.

Figure 64:
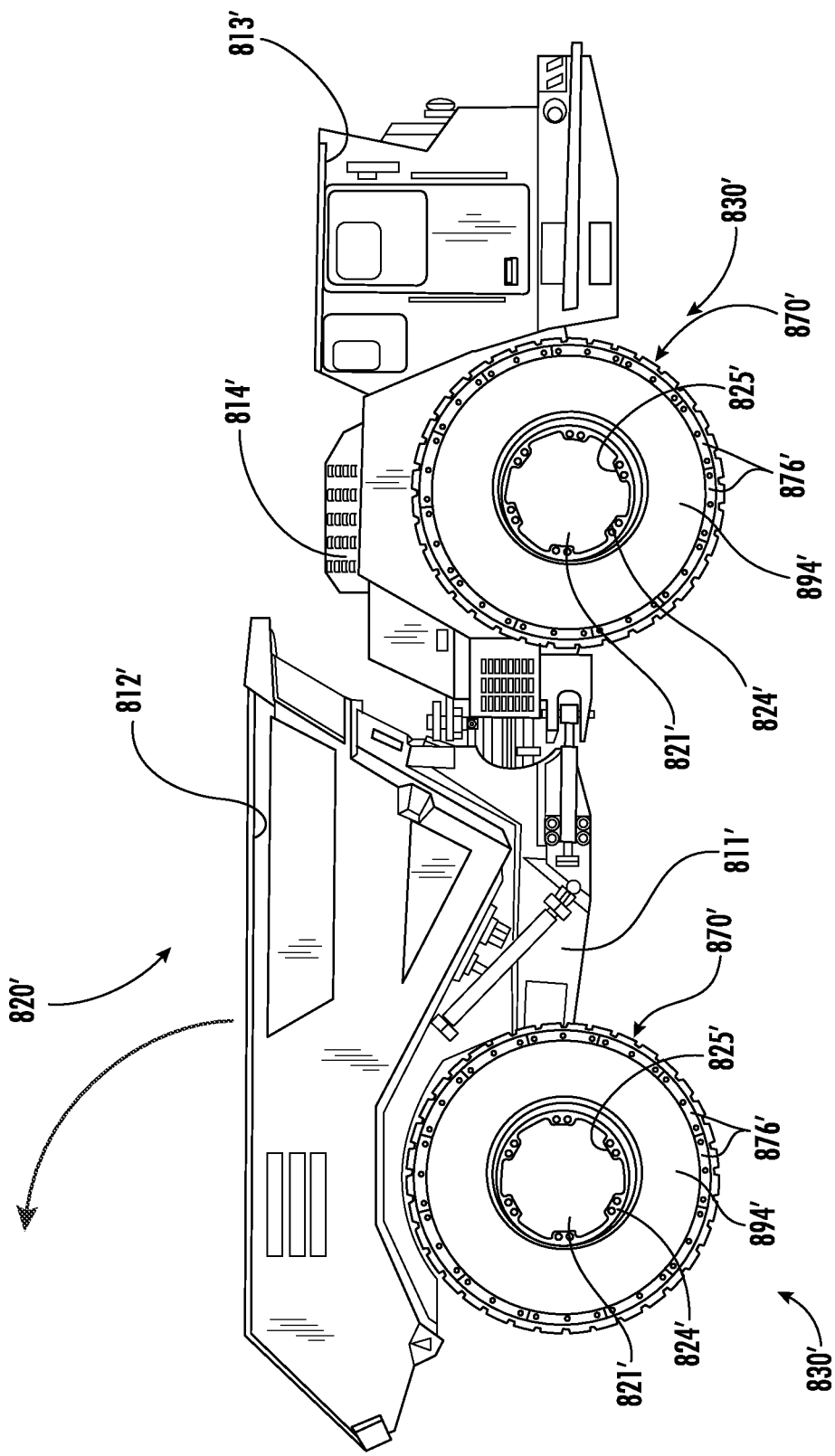
FIG. 64 is a schematic diagram of an off-highway vehicle in accordance with another embodiment.

Referring now to FIG. 64, in another embodiment, the off-highway vehicle 820' may be in the form of an underground or below-ground mining vehicle, for example, similar to an AD30 available from Caterpillar, Inc. of Deerfield, Ill. While the underground mining vehicle 820' includes many of the elements of an above-ground mining vehicle, as described above, the below-ground mining vehicle may have a reduced vertical clearance for navigating relatively tight mine shafts and tunnels. Oftentimes, the reduced vertical clearance of the below-ground mining vehicle makes it relatively difficult to include vehicle suspensions or, as described above, intervening suspensions. Thus, the wheel assemblies 830' may, similarly to the embodiments above with respect to the above-ground mining vehicle, provide the vehicle suspension. Elements 811', 812', 813' 814', 821', 824', 825', 870', 876' and 894' are similar to those elements described above with the same number but without the prime.

Figure 65:
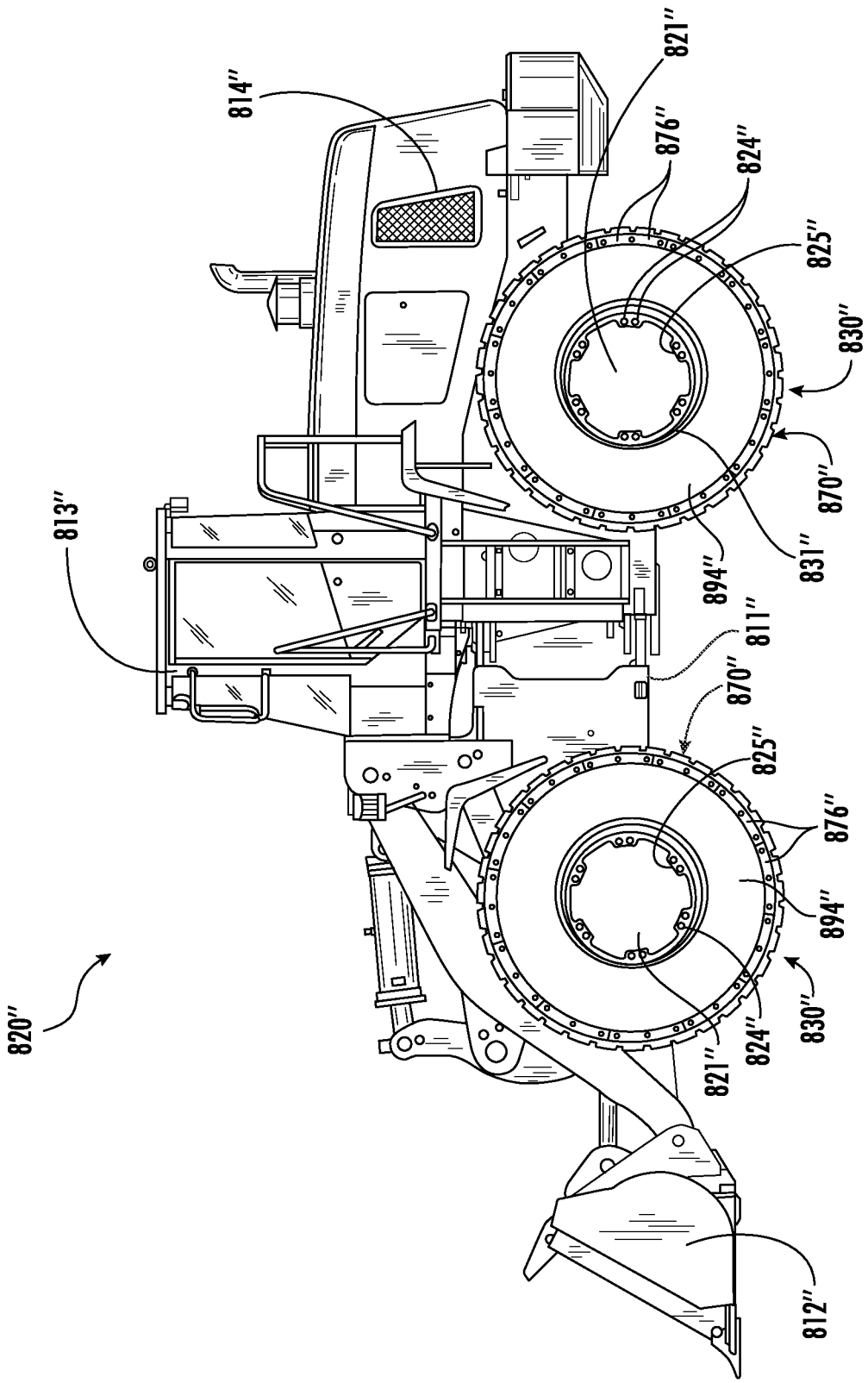
FIG. 65 is a schematic diagram of an off-highway vehicle in accordance with another embodiment.

Referring now to FIG. 65, in another embodiment, the off-highway vehicle 820 may be in the form of a wheel loader. Similarly to the other off-highway vehicles described above, the wheel loader 820" includes an off-highway vehicle frame 811", and a motor 814' and an operator cab 813" carried by the off-highway vehicle frame. However, different from embodiments described above, the wheel loader 820" includes a bucket or scoop 812" that is rotatably or pivotally mounted to a front portion of the off-highway vehicle frame to permit scooping and dumping of material. A typical wheel loader 820", because of its relatively slow speed, may not include a chassis suspension or vehicle suspension, Thus, the wheel assemblies 830" may, similarly to the embodiments above with respect to the above-ground mining vehicle, provide the vehicle suspension. Elements 821", 824", 825", 831", 870", 876" and 894" are similar to those elements described above with the same number but without the double prime.

A method aspect is directed to a method of making an off-highway vehicle 820. The method includes coupling a motor 814 to an off-highway vehicle frame 811. The method also includes rotatably coupling wheel assemblies 830 to the off-highway vehicle frame 811 without an intervening vehicle suspension so that the wheel assemblies are to be driven by the motor 814. Each of the wheel assemblies 830 may include an inner rim 831 coupled to the hub 821, an outer rim 833 surrounding the inner rim, and gas springs 850 coupled between the inner rim and the outer rim to provide a gas suspension for relative movement between the inner and outer rims.

Figure 66:
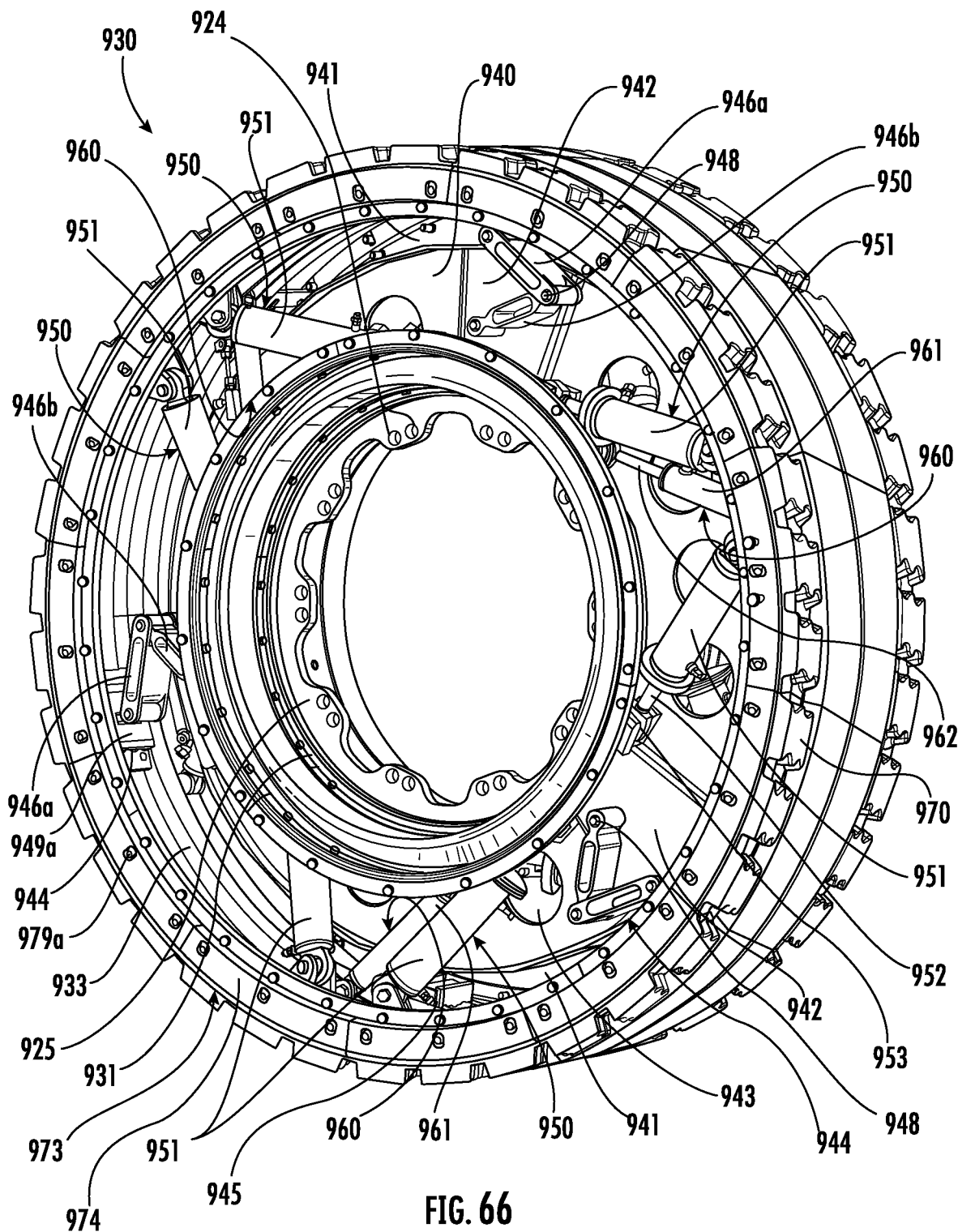
FIG. 66 is a perspective view of a portion of a wheel assembly in accordance with an embodiment.
Figure 67:
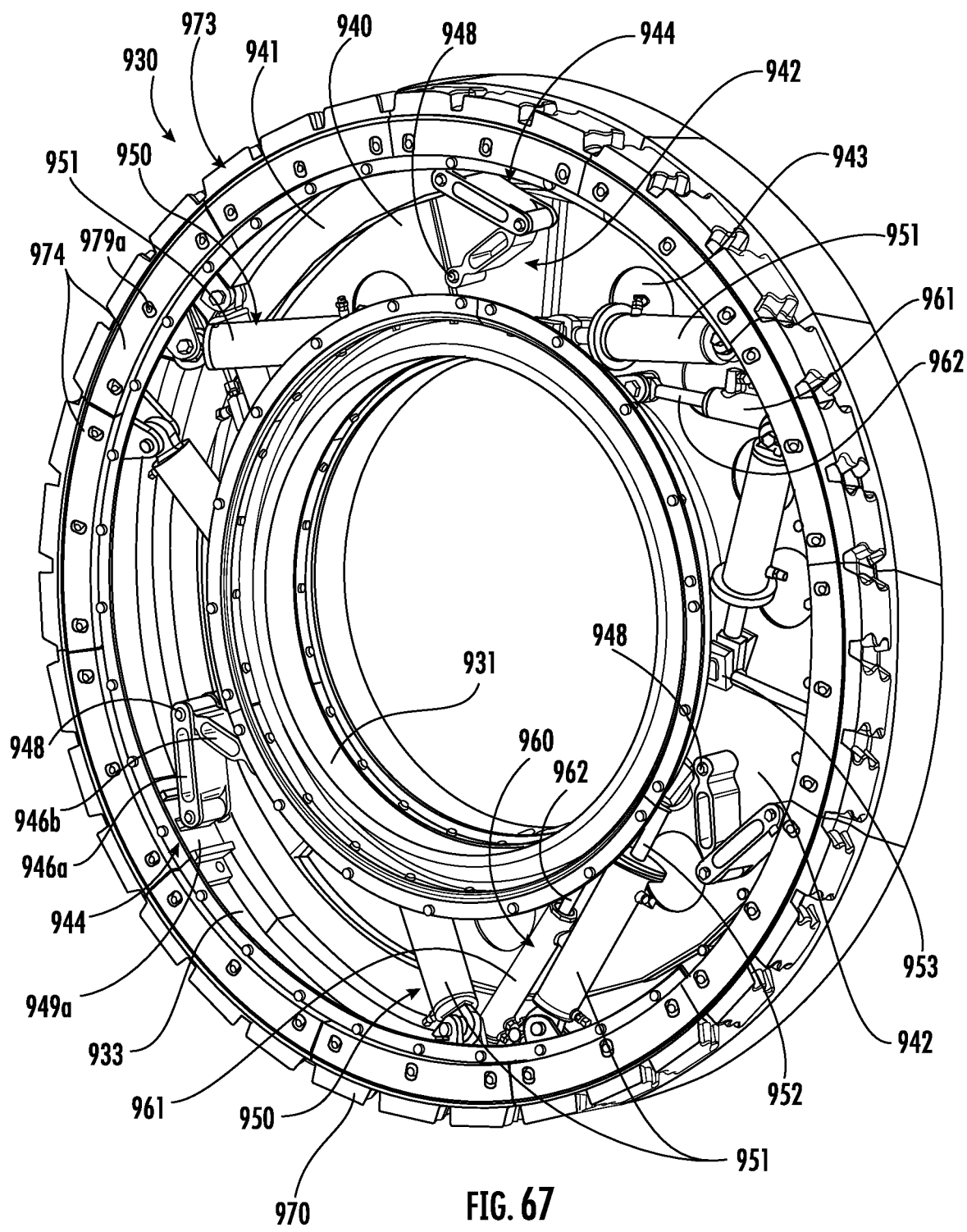
FIG. 67 is a perspective view of a portion of a wheel assembly in accordance with an embodiment.

Referring now to FIGS. 66-67, another embodiment of wheel assemblies 930 that may be used with any of the off-highway vehicles described above will now be described. Each wheel assembly 930 to be coupled to a hub of a vehicle includes an inner rim 931 to be coupled to the hub of the vehicle. The inner rim 931 may be coupled to the hub of the vehicle as described in the embodiments above.

The wheel assembly 930 also includes an outer rim 933 surrounding the inner rim 931. The outer rim 933, similarly to the embodiments described above, may have a diameter of at least 3.5 feet, and more particularly, at least 4 feet.

An inner ring 940 is coupled to the inner rim 931 and defines a closeable gap 941 with adjacent interior portions of the outer rim 933. The inner ring 940, which is similar to the disk described in the above embodiments, also includes weight-reduction openings 943 therein. The weight-reduction openings 943 each illustratively have a generally round or circular shape. The weight-reduction openings 943 may have another shape, such as oblong, hexagonal, and/or contoured for stress reduction, for example. Those skilled in the art will appreciate that having a reduced weight may increase the fuel efficiency of the vehicle and/or may increase the lifespan of the wheel assembly 930.

The inner ring 940 also includes spaced apart thickened wall portions 942. The spaced apart thickened wall portions 942 may be on both the inboard and outboard surfaces of the inner ring 940. Each thickened wall portion 942 may provide increased strength or support as a coupling or attachment point, for example, as described in the embodiments herein.

Gas springs 950 are operatively coupled between the inner rim 931 and the outer rim 933. Each gas spring 950 may be a double-acting gas spring, for example, and include a double-acting gas cylinder 951 and an associated piston 952. Of course, in some embodiments, each gas spring 950 may be a single-acting gas spring. More than one type of gas spring may be used. The gas springs 950 may be air springs and/or nitrogen springs, for example. The gas springs 950 may include other gasses as well.

Illustratively, the gas springs 950 are arranged in pairs on opposite sides of the inner ring 940. More particularly, the gas springs 950 diverge outwardly from the inner rim 931 to the outer rim 933. A respective attachment bracket 953 for each gas spring 950 is coupled to a respective thickened wall portion 942 of the inner ring 940, for example, adjacent the inner rim 931. Similar to the embodiments described herein, each attachment bracket 953 may include a generally U-shaped or V-shaped base bracket that receives an end of the piston 952 therein (e.g., between the arm of the U- or V-shaped bracket). A fastener fastens the end of the piston 952 of the gas spring 950 to the base bracket and thus, each gas spring is coupled adjacent the respective thickened wall portion 942 of the inner ring 940 and adjacent the inner rim 931. A similar attachment bracket 953 is coupled to the outer rim 933 adjacent inboard and outboard surfaces. Accordingly, the gas springs 950 are pivotally coupled between the inner and outer rims 931, 933.

Hydraulic dampers 960 are illustratively operatively coupled between the inner and outer rims 931, 933. The hydraulic dampers 960 may be in the form of oil dampers, for example. Of course, all or some of the dampers may include other, additional, or different fluids therein. Each hydraulic damper 960 includes a double-acting hydraulic cylinder 961 and an associated piston 962.

Figure 68:
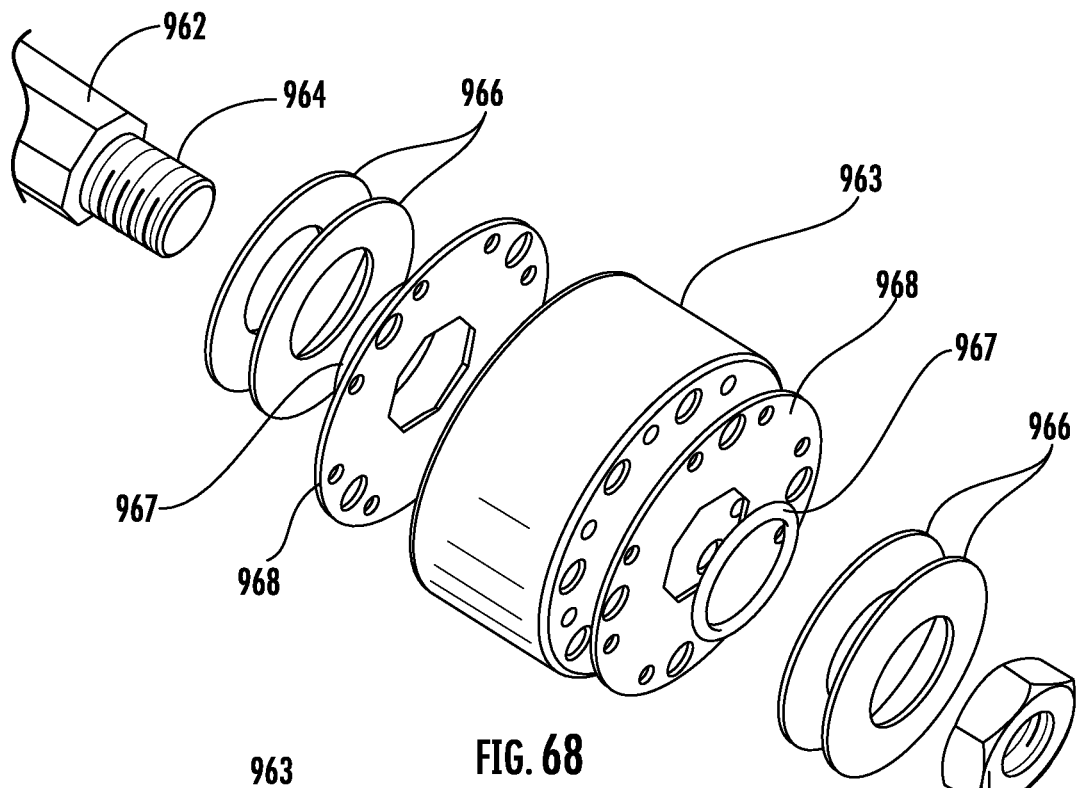
FIG. 68 is an exploded view of a portion of a hydraulic damper of a wheel assembly in accordance with an embodiment.
Figure 69:
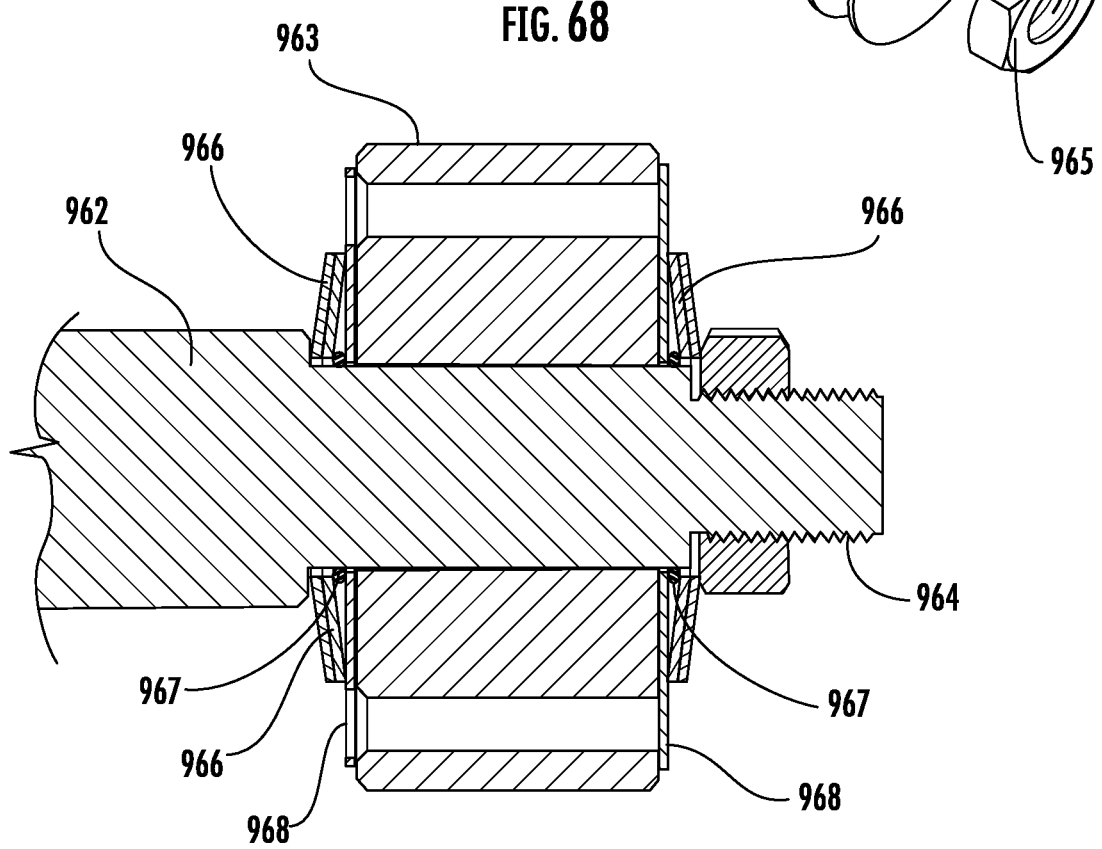
FIG. 69 is a side view of a portion of a hydraulic damper of a wheel assembly in accordance with an embodiment.

Referring now additionally to FIGS. 68 and 69, a piston head 963 is coupled to each piston 962. More particularly, each piston 962 includes a threaded end 964 that extends within an opening in the piston head 963. The piston head 963 is secured to the end of the piston 962 by way of a threaded fastener 965. A reed valve 966, seal (e.g., a gasket) 967 and piston end cap 968 are coupled on the opposing ends of the piston head 963.

A respective hydraulic damper 960 is coupled adjacent a pair of gas springs 950 and staggered or alternatingly on opposing sides of the inner ring 940 (FIGS. 66 and 67). In other words, a first hydraulic damper 960 is coupled on a first side of the inner ring 940 between the inner and outer rims 931, 933 adjacent a first pair of gas springs 950, another hydraulic damper is coupled on a second side of the inner ring between the inner and outer rims adjacent a second pair of gas springs, and so on. Thus, for a wheel assembly 930 that includes six (6) pairs of gas springs 950, there would be six (6) hydraulic dampers 960, three (3) on each side of the inner ring 940.

Each hydraulic damper 960 is coupled to the outer rim 933 adjacent a pair of the gas springs 950 such that a given hydraulic damper is aligned side-by-side (e.g., about the same angle between the gas spring and the inner and outer rims 931, 933 or the coupling location) with one of the pair of gas springs 950. Similarly to the gas springs 950, respective mounting brackets couple each hydraulic damper 960 to the inner and outer rims 931, 933, respectively.

Figure 70:
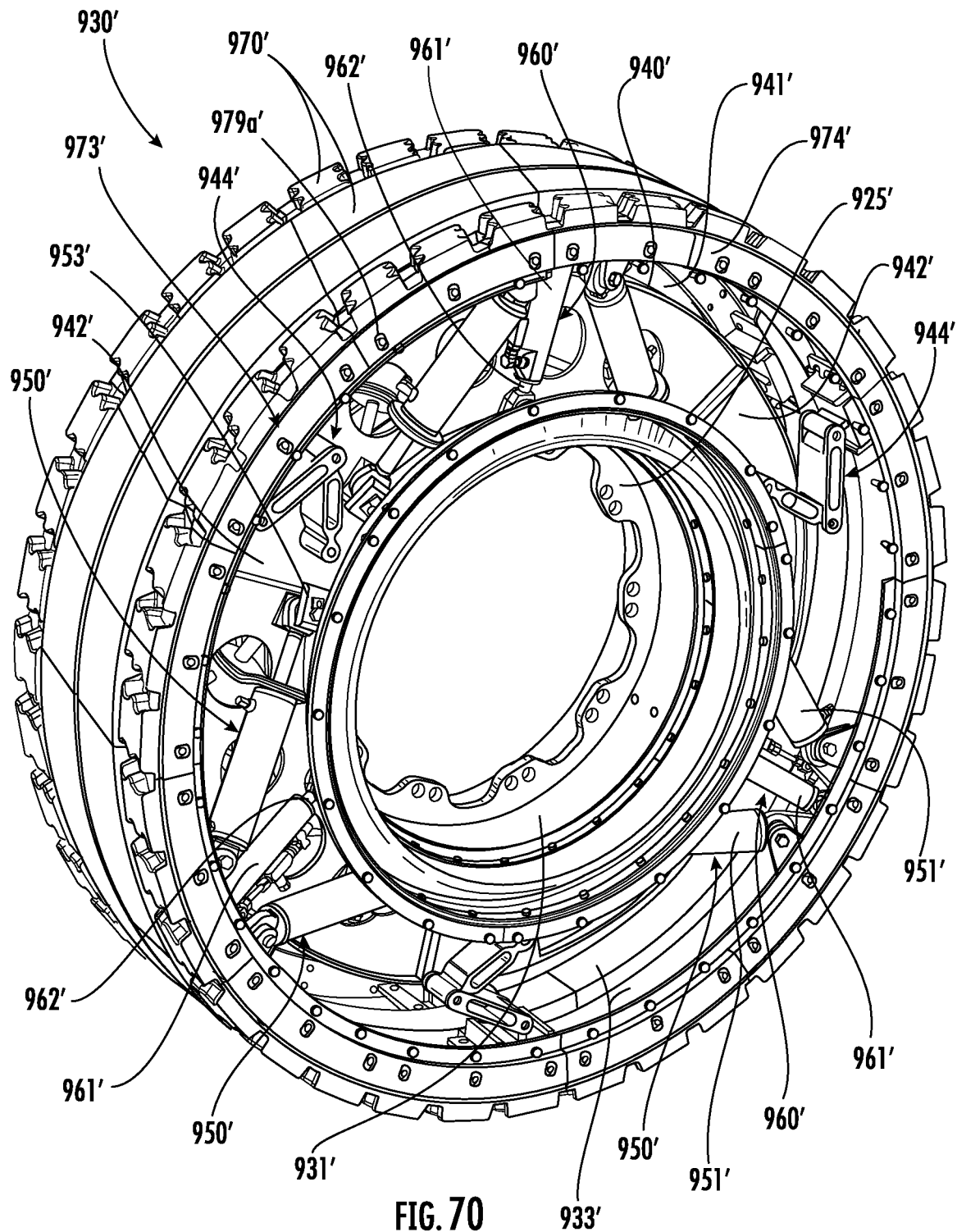
FIG. 70 is a perspective view of a portion of a wheel assembly in accordance with another embodiment.

Referring briefly to FIG. 70, in another embodiment, a given hydraulic damper 960' may be coupled between the gas springs 950' of a given pair thereof so that the given hydraulic damper is not aligned with either of the gas springs (e.g., extends between the given pair of gas springs). Elements 930', 925', 931', 933', 940', 941', 942', 944', 951', 953', 961', 962', 970', 973', 974', and 979a' illustrated but not specifically described are similar to those elements described with respect to embodiments with the same numbers but no primes as illustrated in FIGS. 66-69.

As will be appreciated by those skilled in the art, the hydraulic dampers 960 may dampen or reduce vibrations and movements caused by traversing the ground or by movement of the wheel assembly 930 over the ground. Moreover, as double-acting hydraulic dampers 960, each hydraulic damper advantageously dampens on both extension and compression.

The wheel assembly 930 also includes inboard lateral stops 944 coupled between an inboard side of the outer rim 933 and an inboard side of the inner rim 931, and more particularly, an inboard side of the inner ring 940. More particularly, the inboard lateral stops 944 are illustratively in the form of hinge retainers or scissor hinges. Each inboard lateral stop 944 includes inboard hinge brackets 946a, 946b. An outer lateral stop mounting bracket 949a is coupled to the outer rim 933. The inboard hinge brackets 946a, 946b are coupled by way of a hinge pin 948. In some embodiments, an outer lateral stop mounting bracket 949a may not be used. The hinge bracket 946b is coupled to the inner ring 940 by way of a hinge pin 948 coupled to the inner lateral stop mounting bracket. In some embodiments, for example, as described above, an inner lateral stop mounting bracket may couple the hinge bracket 946b to the inner ring 940.

The wheel assembly 930 also includes outboard lateral stops 945 coupled between an outboard side of the outer rim 933 and an outboard side of the inner rim 931, and more particularly, to an outboard side of the inner ring 940. More particularly, the outboard lateral stops 945 are illustratively in the form of hinge retainers or scissor hinges that are similar to the inboard lateral stops 944. That is, similar to the inboard lateral stops 944, each outboard lateral stop 945 includes outboard hinge brackets and an outer lateral stop mounting bracket coupled to the outer rim 933. The hinge brackets are coupled by way of a hinge pin. In some embodiments, an outer lateral stop mounting bracket may not be used. The hinge bracket is coupled to the inner ring 940 by way of a hinge pin. In some embodiments, the hinge bracket may be coupled to the inner ring 940 by way of an inner lateral stop mounting bracket.

Those skilled in the art will appreciate that the inboard and outboard lateral stops 944, 945, similarly to the lateral stops described with respect to the embodiments above, limit relative movement of the outer rim 933 (and thus the inner ring 940) and the inner rim 931.

Other elements illustrated, such as, for example, fastener receiving passageways 924 within inwardly extending flange ring 925 (FIG. 66), the tread assemblies 970, and the clamping arrangement 973 including the inboard clamping members 974 and fasteners 979a, are similar to corresponding elements described with respect to the embodiments described above. Accordingly, these elements as they relate to the present embodiments need no further discussion.

Figure 71:
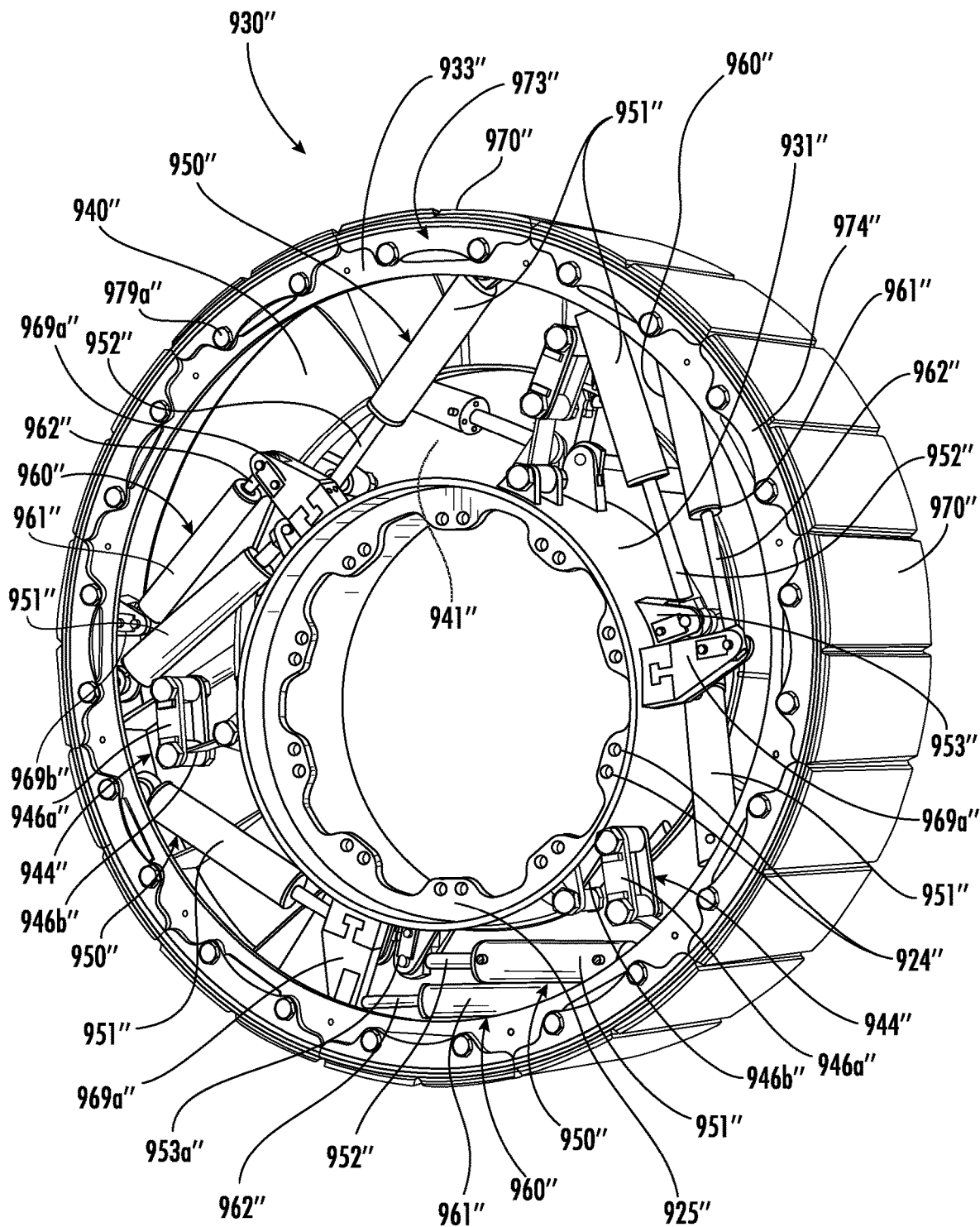
FIG. 71 is a perspective view of a portion of a wheel assembly in accordance with another embodiment.

Referring now to FIG. 71, in another embodiment of a wheel assembly 930" that may be used with any of the off-highway vehicles described herein, an outer ring 940" is coupled to the outer rim 933" and defines a closeable gap 941" with adjacent interior portions of the inner rim 931". Gas springs 950" are operatively coupled between the inner rim 931" and the outer rim 933".

Hydraulic dampers 960" are also illustratively operatively coupled between the inner and outer rims 931", 933". Similar to the embodiments above, the hydraulic dampers 960" may be in the form of oil dampers, for example. Of course, all or some of the dampers may include other, additional, or different fluids therein. Each hydraulic damper 960" includes a double-acting hydraulic cylinder 961" and an associated piston 962".

Each hydraulic damper 960" is coupled to the outer rim. 933" adjacent the gas springs 950" such that a given hydraulic damper is aligned side-by-side (e.g., about the same angle between the gas spring and the inner and outer rims 931", 933" or the coupling location) with one of the pair of gas springs 950". Each gas spring 950" is attached to a respective attachment bracket 953a", and each includes a double-acting gas cylinder 951" and an associated piston 952". Similarly to the gas springs 950", respective mounting brackets 969a", 969b" couple each hydraulic damper 960" to the inner and outer rims 931", 933", respectively.

The wheel assembly 930" also includes lateral stops 944", illustratively in the form of hinge retainers or scissor hinges coupled between the inner and outer rims 931", 933". Each lateral stop 944" includes hinge brackets 946a", 946b" as described above.

Other elements illustrated, such as, for example, fastener receiving passageways 924" within inwardly extending flange ring 925", the tread assemblies 970", and the clamping arrangement 973" including the inboard clamping members 974" and fasteners 979a", are similar to corresponding elements described with respect to the embodiments described above. Accordingly, these elements as they relate to the present embodiments need no further discussion.

While several embodiments have been described herein, those skilled in the art will appreciate that any one or more elements from any one or more embodiments may be used in conjunction with any one or more elements from any other embodiment or embodiments. In alternative embodiments, the wheel assemblies may also be used on other vehicles, such as commercial semi-trailer trucks, and permit such vehicles to benefit from not needing a suspension system.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:
1. An off-highway vehicle comprising:
an off-highway vehicle frame;
a motor carried by said off-highway vehicle frame; and
a plurality of wheel assemblies rotatably coupled to the off-highway vehicle frame without an intervening vehicle suspension and at least some of the wheel assemblies to be driven by the motor, each of said plurality of wheel assemblies comprising
an inner rim coupled to the off-highway vehicle frame,
an outer rim surrounding the inner rim,
a plurality of gas springs coupled between said inner rim and said outer rim to provide a gas suspension for relative movement between said inner and outer rims, and
an outer ring coupled to said outer rim and extending radially inward therefrom to define a closable gap with adjacent portions of said inner rim to define a mechanical stop to limit relative movement between said inner rim and outer rim.
2. The off-highway vehicle of claim 1 further comprising an operator cab carried by said off-highway vehicle frame.

3. The off-highway vehicle of claim 1 wherein said motor comprises a diesel engine and a transmission coupled thereto.
4. The off-highway vehicle of claim 1 further comprising a truck bed carried by said off-highway vehicle frame to haul material.
5. The off-highway vehicle of claim 4 wherein said truck bed is pivotally coupled to said off-highway vehicle frame to permit dumping of the material.
6. The off-highway vehicle of claim 4 wherein said truck bed has a capacity of at least 100 tons.
7. The off-highway vehicle of claim 1 wherein each of said plurality of gas springs has an operating stroke permitting said outer ring to define a mechanical stop.
8. The off-highway vehicle of claim 1 further comprising a plurality of hydraulic dampers operatively coupled between said inner rim and said outer rim.
9. The off-highway vehicle of claim 1 wherein said plurality of gas springs diverge outwardly from said inner rim to said outer rim.
10. An off-highway hauling vehicle comprising:
an off-highway vehicle frame;
a truck bed pivotally coupled to said off-highway vehicle frame to haul material and permit dumping of the material;
a motor carried by said off-highway vehicle frame; and
a plurality of wheel assemblies rotatably coupled to the off-highway vehicle frame without an intervening vehicle suspension and at least some of the wheel assemblies being driven by the motor, each of said plurality of wheel assemblies comprising
an inner rim coupled to the off-highway vehicle frame,
an outer rim surrounding the inner rim,
a plurality of gas springs diverging outwardly from said inner rim to said outer rim to provide a gas suspension for relative movement between said inner and outer rims, and
at least one of an outer ring coupled to said outer rim and extending radially inward therefrom to define a closable gap with adjacent portions of said inner rim to define a mechanical stop to limit relative movement between said inner rim and outer rim, and an inner ring coupled to said inner rim and extending radially outward from said inner rim to define a closeable gap with adjacent portions of said outer rim to define a mechanical stop to limit relative movement between said inner rim and outer rim.
11. The off-highway, hauling vehicle of claim 10 further comprising an operator cab carried by said off-highway vehicle frame.
12. The off-highway, hauling vehicle of claim 10 wherein said motor comprises a diesel engine and a transmission coupled thereto.
13. The off-highway, hauling vehicle of claim 10 wherein said truck bed has a capacity of at least 100 tons.
14. The off-highway, hauling vehicle of claim 10 wherein each of said plurality of gas springs has an operating stroke permitting said at least one of the outer ring and inner ring to define a mechanical stop.
15. The off-highway, hauling vehicle of claim 10 wherein the at least one of the inner and outer rings comprises said outer ring; and wherein said plurality of gas springs is arranged in pairs on opposite sides of said outer ring.

16. A method of making an off-highway vehicle comprising:
   coupling a motor to an off-highway vehicle frame; and
   coupling a plurality of wheel assemblies to the off-highway vehicle frame without an intervening vehicle suspension with at least some of the wheel assemblies to be driven by the motor, each of the plurality of wheel assemblies comprising
      an inner rim coupled to the off-highway vehicle frame,
      an outer rim surrounding the inner rim,
      a plurality of gas springs coupled between the inner rim and the outer rim to provide a gas suspension for relative movement between the inner and outer rims, and
      at least one of an outer ring coupled to said outer rim and extending radially inward therefrom to define a closable gap with adjacent portions of said inner rim to define a mechanical stop to limit relative movement between said inner rim and outer rim, and an inner ring coupled to said inner rim and extending radially outward from said inner rim to define a closeable gap with adjacent portions of said outer rim to define a mechanical stop to limit relative movement between said inner rim and outer rim.

17. The method of claim 16 further comprising coupling an operator cab to the off-highway vehicle frame.

18. The method of claim 16 further comprising coupling a truck bed to the off-highway vehicle frame to haul material.

19. The method of claim 18 wherein coupling the truck bed to the off-highway vehicle frame comprises pivotally coupling the truck bed to the off-highway vehicle frame to permit dumping of the material.

20. The method of claim 18 wherein the truck bed has a capacity of at least 100 tons.

21. An off-highway vehicle comprising:
   an off-highway vehicle frame;
   a motor carried by said off-highway vehicle frame; and
   a plurality of wheel assemblies rotatably coupled to the off-highway vehicle frame without an intervening vehicle suspension and at least some of the wheel assemblies to be driven by the motor, each of said plurality of wheel assemblies comprising
      an inner rim coupled to the off-highway vehicle frame,
      an outer rim surrounding the inner rim,
      a plurality of gas springs coupled between said inner rim and said outer rim to provide a gas suspension for relative movement between said inner and outer rims, and
      an inner ring coupled to said inner rim and extending radially outward from said inner rim to define a closeable gap with adjacent portions of said outer rim to define a mechanical stop to limit relative movement between said inner rim and outer rim.

22. The off-highway vehicle of claim 21 further comprising an operator cab carried by said off-highway vehicle frame.

23. The off-highway vehicle of claim 21 wherein said motor comprises a diesel engine and a transmission coupled thereto.

24. The off-highway vehicle of claim 21 further comprising a truck bed carried by said off-highway vehicle frame to haul material.

25. The off-highway vehicle of claim 21 wherein each of said plurality of gas springs has an operating stroke permitting said inner ring to define a mechanical stop.

26. The off-highway vehicle of claim 21 further comprising a plurality of hydraulic dampers operatively coupled between said inner rim and said outer rim.

27. The off-highway vehicle of claim 21 wherein said plurality of gas springs diverge outwardly from said inner rim to said outer rim.

* * * * *

UNITED STATES PATENT AND TRADEMARK OFFICE
CERTIFICATE OF CORRECTION

PATENT NO. : 11,554,606 B2
APPLICATION NO. : 16/896726
DATED : January 17, 2023
INVENTOR(S) : Kemeny Page 1 of 1

It is certified that error appears in the above-identified patent and that said Letters Patent is hereby corrected as shown below:

In the Claims

Column 35, Line 4   Insert: --rotatably-- before "coupling"

Signed and Sealed this
Eighth Day of August, 2023

Katherine Kelly Vidal
*Director of the United States Patent and Trademark Office*